(12) United States Patent
Takahashi et al.

(10) Patent No.: US 7,700,708 B2
(45) Date of Patent: Apr. 20, 2010

(54) ETHYLENE POLYMER AND APPLICATION THEREOF TO MOLDINGS

(75) Inventors: Mamoru Takahashi, Sodegaura (JP); Masahiko Okamoto, Sodegaura (JP); Tetsuji Kasai, Sodegaura (JP); Yasushi Tohi, Sodegaura (JP); Shiro Otsuzuki, Yamaguchi (JP); Shinichi Nagano, Ichihara (JP); Yasuo Funabara, Ichihara (JP); Takahiro Akashi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 212 days.

(21) Appl. No.: 10/542,756

(22) PCT Filed: Feb. 17, 2004

(86) PCT No.: PCT/JP2004/001689

§ 371 (c)(1), (2), (4) Date: Jul. 20, 2005

(87) PCT Pub. No.: WO2004/083265

PCT Pub. Date: Sep. 30, 2004

(65) Prior Publication Data

US 2006/0189775 A1      Aug. 24, 2006

(30) Foreign Application Priority Data

Feb. 17, 2003  (JP) .............................. 2003-038079

(51) Int. Cl.
*C08F 10/14* (2006.01)
*C08F 4/42* (2006.01)

(52) U.S. Cl. .................. 526/348.2; 526/352; 526/160; 526/943

(58) Field of Classification Search ................. 526/352, 526/348.2, 160, 943
See application file for complete search history.

(56) References Cited

U.S. PATENT DOCUMENTS

| | | | |
|---|---|---|---|
| 4,380,567 A | * | 4/1983 | Shigemoto .................. 428/213 |
| 5,388,501 A | | 2/1995 | Hazan et al. |
| 6,063,871 A | * | 5/2000 | Kishine et al. .............. 525/240 |
| 6,642,340 B1 | | 11/2003 | Takahashi et al. |

FOREIGN PATENT DOCUMENTS

| | | |
|---|---|---|
| EP | 0 783 022 A1 | 7/1997 |
| EP | 1 162 211 A1 | 12/2001 |
| EP | 1 201 711 A1 | 5/2002 |
| JP | 49-51378 A | 5/1974 |
| JP | 59 226012 | * 12/1984 |
| JP | 59-226012 A | * 12/1984 |
| JP | 4-65512 A | 3/1992 |
| JP | 4-231077 A | 8/1992 |
| JP | 6-233723 A | 8/1994 |
| JP | 7-157508 A | 6/1995 |
| JP | 9-183816 A | 7/1997 |
| JP | 10-195260 A | 7/1998 |
| JP | 11-106432 A | 4/1999 |
| JP | 11-228588 A | 8/1999 |
| JP | 2000-212194 A | 8/2000 |
| JP | 2002-53615 A | 2/2002 |
| JP | 2002-265705 A | 9/2002 |
| JP | 2002-275342 A | 9/2002 |
| WO | WO-93/08221 A2 | 4/1993 |
| WO | WO 01/25328 A1 * | 4/2001 |
| WO | WO-01/25328 A1 | 4/2001 |

OTHER PUBLICATIONS

Function & Materials, vol. 21, No. 3 (2001), pp. 55-57.
Hosoda et al., Polymer, vol. 31, Oct. 1990, p. 1999.

* cited by examiner

*Primary Examiner*—Ling-Siu Choi
(74) *Attorney, Agent, or Firm*—Birch, Stewart, Kolasch & Birch, LLP

(57) ABSTRACT

An ethylene polymer containing 0.01 to 1.20 mol % of a constitutional unit derived from α-olefin having 6 to 10 carbon atoms, wherein with respect to cross fractionation chromatography (CFC), either (1) the weight average molecular weight (Mw) of the components eluted at 73 to 76° C. does not exceed 4,000, or (2) the ethylene polymer satisfies the following relationship (Eq-1), provides a molded product having excellent moldability and therefore excellent mechanical strength and appearance:

$$S_x/S_{total} \leq 0.1 \tag{Eq-1}$$

wherein $S_x$ is the sum of the total peak areas related to the components eluted at 70 to 85° C., and $S_{total}$ is the sum of the total peak areas related to the components eluted at 0 to 145° C.

14 Claims, 21 Drawing Sheets

Molecular Weight for the Apex of the Peak
with Lowest Molecular Weight (26,000)

Molecular Weight for the Apex of the Peak with Lowest Molecular Weight (21,000)

Absence of crystalline structure continuous over more than 10 μm

Absence of crystalline structure continuous over more than 10 μm

Presence of crystalline structure continuous over more than 10 μm

Dimensions of ASTM-D1822 Type S tension-impact specimen

ETHYLENE POLYMER AND APPLICATION THEREOF TO MOLDINGS

TECHNICAL FIELD

The present invention relates to an ethylene polymer which has excellent moldability and gives a molded product having excellent mechanical strength and external appearance, and a molded product obtained therefrom.

BACKGROUND ART

High-density polyethylene which is in use in wide applications such as films, pipes, bottles and the like, has been conventionally prepared by using a Ziegler-Natta catalyst or a chromium catalyst. However, because of the nature of such catalysts, there has been limitation on the control over the molecular weight distribution or composition distribution of the polymer.

In recent years, several methods have been disclosed for preparation of an ethylene polymer having excellent moldability and mechanical strength, including an ethylene homopolymer or an ethylene.α-olefin copolymer of relatively small molecular weights and an ethylene homopolymer or an ethylene.α-olefin copolymer of relatively large molecular weights, according to a continuous polymerization technique, using a single-site catalyst which facilitates the control of the composition distribution, or a catalyst having such the single-site catalyst supported on a carrier.

In the publication of JP-A No. 11-106432, disclosed is a composition prepared by melt-blending a low molecular weight polyethylene with a high molecular weight ethylene.α-olefin copolymer, which are obtained by polymerization in the presence of a supported, geometric constraint type single-site catalyst (CGC/Borate-based catalyst). However, since the molecular weight distribution of the composition is not broad, fluidity of the composition may become poor. In addition, although the claims of the above-mentioned patent application do not disclose a preferred range of the carbon number of α-olefin that is to be copolymerized with ethylene, in the case of the carbon number being less than 6, it is expected that sufficient mechanical strength would not be exhibited. Further, because the molecular weight distribution (Mw/Mn) of the single-stage polymerization product is broad, it is also expected that the product's mechanical properties such as impact strength and the like would be insufficient, as compared with the single-stage product of narrower molecular weight distribution. Moreover, the anticipation that a broad composition distribution of the single-stage polymerization product would result in deterioration of the above-mentioned strength is obvious from the cross fractionation chromatography (CFC) data described in "Functional Materials," published by CMC, Inc., March 2001, p. 50, and the cross fractionation chromatography (CFC) data described in FIG. 2 in the publication of JP-A No. 11-106432.

In the publication of WO 01/25328, disclosed is an ethylene polymer which is obtained by solution polymerization in the presence of a catalyst system comprising $CpTiNP(^{t}Bu)_3Cl_2$ and borate or alumoxane. This ethylene polymer has a weak crystalline structure due to the presence of a branch group in the low molecular weight component, and thus the polymer is expected to have poor mechanical strength. Also, since the molecular weight of the low molecular weight component is relatively large, it is expected that the polymer has low fluidity. Moreover, although the claims of the above-mentioned patent application do not disclose the preferred range of the carbon number of α-olefin that is to be copolymerized with ethylene, it is believed that when the carbon number is less than 6, sufficient mechanical strength would not be exhibited.

In the publication of EP 1201711 A1, disclosed is an ethylene polymer which is obtained by slurry polymerization in the presence of a catalyst system comprising ethylene.bis(4,5,6,7-tetrahydro-1-indenyl)zirconium dichloride with methylalumoxane supported on silica. Among such ethylene polymers, a single-stage polymerization product has a wide molecular weight distribution (Mw/Mn), and thus it is expected that the impact strength and the like would be insufficient as compared with a single-stage product of narrower molecular weight distribution. Further, it is inferred that a broad molecular weight distribution means heterogeneity of the active species, and consequently there is a concern that the composition distribution broadens, thereby resulting in deterioration of fatigue strength. Moreover, in some Examples of the above-mentioned patent application, a single-stage polymerization product of small molecular weight and a single-stage polymerization product of large molecular weight are melt-kneaded. In this kneading method, crystalline structures that are continuous over more than 10 µm are often produced, and thus it is expected that sufficient strength would not be exhibited.

In the publication of JP-A No. 2002-53615, disclosed is an ethylene polymer which is obtained by slurry polymerization using a catalyst system comprising methylalumoxane and a zirconium compound having a specific salicylaldimine ligand supported on silica. Although the claims of the patent application do not disclose the preferred range of the carbon number of α-olefin that is to be copolymerized with ethylene, in regard to the ethylene polymer obtained from 1-butene (number of carbon atoms=4) which is used as the α-olefin in Examples of the patent application, the carbon number is small, and it is envisaged that sufficient mechanical strength would not exhibited.

In general, an ethylene polymer shows a multimodal molecular weight distribution. When the intermodal molecular weight differences are large, mixing with melt-kneading is difficult, and thus multistage polymerization is typically employed. Multistage polymerization is in general often carried out in a continuous manner. In the case of such multistage polymerization, a distribution is usually created in the ratio between the residence time in a polymerization vessel which is under a polymerizing environment that would produce a low molecular weight product, and the residence time in a polymerization vessel which is under a polymerizing environment that would produce a high molecular weight product. In particular, in the case of a polymerization method in which the polymer is produced in a particulate form, such as the gas-phase method or slurry method, there may exist differences in the molecular weight among different particles. Such difference in molecular weight has been recognized even in the cases of using the Ziegler catalysts as described in the publication of Japanese Patent No. 821037 or the like. However, the catalyst is multi-sited, whereas the molecular weight distribution is broad. Accordingly, polymer particles are well mixed with each other even upon conventional pelletization by melt-kneading. On the other hand, in the case of using a singe-site catalyst, since the molecular weight distribution is narrow, the polymer particles are often not mixed sufficiently with each other during conventional pelletization by melt-kneading. Thus, in some cases, the history of polymer as having been in a particulate form was reflected in the mixture, and this caused disorder in the fluidity to adversely affect the appearance or sufficient exhibition of mechanical strength. Also, such ethylene polymer showed a tendency that the coefficient of smoothness which is determined from the surface roughness of extruded strands increased.

The ethylene (co)polymer prepared using a Ziegler catalyst as described in Japanese Patent No. 821037 or the like has methyl branch groups in the molecular chain as a result of side production of a methyl branch group during the polymerization reaction. It was found that this methyl branch group was embedded in the crystal, thus weakening the crystal (see, for example, Polymer Vol. 31, p. 1999 (1990)), and this caused deterioration in mechanical strength of the ethylene (co)polymer. Further, in regard to the copolymer of ethylene and α-olefin, when the copolymer contained almost no α-olefin, a tough and brittle component was produced; on the other hand, when an excessive proportion of α-olefin was used in copolymerization, a soft component with weak crystalline structure was produced, and thus it may cause tackiness. Moreover, since the molecular weight distribution was broad, there were problems such as the phenomenon of a low molecular weight product adhering to the surfaces of molded products as a powdery substance, and so on.

The ethylene polymer that is obtained by polymerization using a metallocene catalyst as described in the publication of JP-A No. 9-183816 or the like has methyl branch groups in the molecular chain, as a result of side production of a methyl branch group during the polymerization reaction. This methyl branch group is embedded in the crystals, thereby weakening the crystalline structure. This has been a cause for the lowering of mechanical strength. Also, an ethylene polymer with extremely large molecular weight has not been disclosed heretofore.

An ethylene polymer that is obtained by polymerization in the presence of a chromium-based catalyst exhibits low molecular extension because of the presence of a long-chained branch group, and thus has poor mechanical strength. Further, as a result of side production of a methyl branch group during the polymerization reaction, there exist methyl branch groups in the molecular chain. These methyl branch groups are embedded in the crystals and weaken the crystalline structure. This has been a cause for the lowering of mechanical strength. Further, in regard to the copolymer of ethylene and an α-olefin, when the copolymer contained almost no α-olefin, a tough and brittle product was produced; on the other hand, when α-olefin was copolymerized in an excessive proportion, tackiness was caused or a soft component with weak crystalline structure was produced.

The ethylene polymer that is obtained by polymerization in the presence of a constrained geometry catalyst (CGC) as described in the publication of WO 93/08221 or the like has methyl branch groups in the molecular chain, as a result of side production of a methyl branch group during the polymerization reaction. These methyl branch groups are embedded in the crystals and weaken the crystalline structure. This has been a cause for the lowering of mechanical strength. Further, the molecular extension was low because of the presence of long-chained branch groups, and thus the mechanical strength was insufficient.

An ethylene polymer that is obtained by high pressure radical polymerization has methyl branch groups or long-chained branch groups in the molecular chain, as a result of the side production of methyl branch groups or long-chained branch groups during polymerization. These methyl branch groups are embedded in the crystals, thereby weakening the crystalline strength. This has been a cause for the lowering of mechanical strength. Further, the presence of long-chained branch groups resulted in low molecular extension as well as a broad molecular weight distribution, and thus the mechanical strength was poor.

In regard to the ethylene polymer that is obtained by cold polymerization using a catalyst containing Ta- or Nb-complexes as described in the publication of JP-A No. 6-233723, since the ratio (Mw/Mn) of the weight average molecular weight (Mw) and the number average molecular weight (Mn) as measured by GPC was small, the moldability might be insufficient.

DISCLOSURE OF THE INVENTION

Based on the prior art as reviewed above, the inventors conducted an extensive research on an ethylene polymer which has excellent moldability and which would give a molded product having excellent mechanical strength, and found that an ethylene polymer (E) containing 0.01 to 1.20 mol % of a constitutional unit derived from α-olefin having 6 to 10 carbon atoms, which satisfies at least either of the following requirements (1) and (2) with respect to cross fractionation chromatography (CFC), has excellent moldability and also gives a molded product, especially a blow molded product, a pipe and a fitting, having excellent mechanical strength and excellent external appearance, thus completing the invention:

(1) the weight average molecular weight (Mw) of the components which are eluted at 73° C. to 76° C. is not more than 4,000; and (2) the following relationship (Eq-1) is satisfied:

$$S_x/S_{total} \leq 0.1 \tag{Eq-1}$$

(wherein $S_x$ is the sum of the total peak areas related to the components which are eluted at 70 to 85° C., and $S_{total}$ is the sum of the total peak areas related to the components which are eluted at 0 to 145° C.).

The ethylene polymer (E) according to the present invention preferably satisfies, in addition to the above-mentioned requirements, the following requirements (1') to (7'):

(1') the polymer contains 0.02 to 1.00 mol % of a constitutional unit derived from α-olefin having 6 to 10 carbon atoms;

(2') the density (d) is in the range of 945 to 970 kg/m$^3$;

(3') the intrinsic viscosity ([η]) as measured in decalin at 135° C. is in the range of 1.6 to 4.0 (dl/g);

(4') the ratio (Mw/Mn) of the weight average molecular weight (Mw) and the number average molecular weight (Mn) as measured by GPC is in the range of 5 to 70;

(5') in the cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), ($T_1$-$T_2$) (° C.) is in the range of 0 to 11° C.;

(6') on the GPC curve for the fraction eluted at [($T_2$−1) to $T_2$] (° C.), the molecular weight for the apex of the strongest peak in the region corresponding to molecular weights of 100,000 or more is in the range of 200,000 to 800,000; and (7') in the GPC curve for the components eluted at 95 to 96° C., the molecular weight for the apex of the strongest peak in the region corresponding to molecular weights of 100,000 or less does not exceed 28,000.

Such ethylene polymer may be referred to as an ethylene polymer (E') in the following description.

A more preferred ethylene polymer according to the invention satisfies, in addition to the above-described requirements, the requirement that the polymer has less than 0.1 methyl branch group per 1000 carbon atoms when measured by $^{13}$C-NMR (hereinafter, optionally referred to as Requirement (1")). Such ethylene polymer may be referred to as an ethylene polymer (E") in the following description.

A particularly preferred ethylene polymer according to the invention satisfies, in addition to all of the above-described requirements, the following requirements (1''') and (2''') simultaneously:

(1''') when the GPC curve is divided into two logarithmic normal distribution curves, the ratio (Mw/Mn) of the weight average molecular weight (Mw) and the number average molecular weight (Mn) for each divided curve is from 1.5 to 3.5, and the weight average molecular weight (Mw$_2$) for the divided curve representing the higher molecular weight portion is from 200,000 to 800,000; and (2''') the smoothness coefficient R as determined from the surface roughness of an extruded strand does not exceed 20 μm.

In the following description, such ethylene polymer may be referred to as an ethylene polymer (E''').

In the case of applying the ethylene polymer (E) of the invention to blow molded products, the ethylene polymer (E) preferably satisfies, in addition to the above-described requirements to be fulfilled, the following requirements ($1_B$) to ($3_B$) simultaneously:

($1_B$) the polymer contains 0.02 to 0.20 mol % of a constitutional unit derived from α-olefin having 6 to 10 carbon atoms;

($2_B$) the ratio (Mw/Mn) of the weight average molecular weight (Mw) and the number average molecular weight (Mn) as measured by GPC is in the range of 5 to 30; and ($3_B$) with respect to cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), ($T_1$-$T_2$) (° C.) is in the range of 0 to 5° C.

In the following description, such ethylene polymer may be referred to as an ethylene polymer ($E_B$).

Furthermore, a more preferred ethylene polymer for blow molded products preferably satisfies, in addition to the above-described requirements ($1_B$) to ($3_B$), the following requirements ($1_B$') and ($2_B$') simultaneously [such ethylene polymer may be referred to as an ethylene polymer ($E_B$') in the following description], and particularly preferably the following requirement ($1_B$") [such ethylene polymer may be referred to as an ethylene polymer ($E_B$") in the following description]:

($1_B$') the flexural modulus as measured at 23° C. according to ASTM-D-790 is in the range of 1,500 to 1,800 MPa;

($2_B$') the environmental stress crack resistance ESCR (hr) at 50° C. as measured according to ASTM-D-1693 is 10 hours or longer before failure; and ($1_B$") tan δ (=loss modulus G"/storage modulus G') as measured at 190° C. and at an angular frequency of 100 rad/sec using a dynamic viscoelasticity measuring apparatus, is from 0.7 to 0.9.

Furthermore, as for the ethylene polymers ($E_B$), ($E_B$') and ($E_B$") for blow molded products, the ethylene polymer (E) is preferably an ethylene polymer (E') which also satisfies the above-mentioned requirements (1) to (7); more preferably, the ethylene polymer (E') is an ethylene polymer (E") which also satisfies the above-mentioned requirement (1"); and particularly preferably, the ethylene polymer (E") is an ethylene polymer (E''') which also satisfies the above-mentioned requirements (1''') and (2''').

In the case of applying the ethylene polymer (E) according to the invention to a use in pipes, it is preferable that the polymer satisfy, in addition to the foregoing requirements that should be satisfied by ethylene polymer (E), the following requirements ($1_P$) and ($2_P$) simultaneously:

($1_P$) it contains 0.10 to 1.00 mol % of a constitutional unit derived from α-olefin having 6 to 10 carbon atoms; and ($2_P$) the ratio (Mw/Mn) of the weight average molecular weight (Mw) and the number average molecular weight (Mn) as measured by GPC is in the range of 11 to 70.

In the following description, such ethylene polymer may be referred to as an ethylene polymer ($E_P$').

In addition, a more preferred ethylene polymer for pipes preferably satisfies, in addition to the above-mentioned requirements ($1_P$) and ($2_P$), the following requirements ($1_P$') and ($2_P$') simultaneously [such ethylene polymer may be referred to as an ethylene polymer ($E_P$") in the following description]:

($1_P$') the actual stress obtained when it takes 10,000 cycles to fracture due to the tensile fatigue property as measured at 80° C. according to JIS K-6744, is from 13 MPa to 17 MPa, and the actual stress obtained when it takes 100,000 cycles to fracture is from 12 to 16 MPa; and ($2_P$') the actual stress (S) (MPa) and the density (d) obtained when it takes 10,000 cycles to fracture due to the tensile fatigue property as measured at 23° C. according to JIS K-7118, satisfy the following relationship (Eq-2):

$$(0.12d - 94.84) < S < (0.60d - 550.00) \quad \text{(Eq-2)}$$

Furthermore, as for the ethylene polymers ($E_P$') and ($E_P$") for pipes, the ethylene polymer (E) is preferably an ethylene polymer (E') which also satisfies the above-mentioned requirements (1) to (7); more preferably, the ethylene polymer (E') is an ethylene polymer (E") which also satisfies the above-mentioned requirement (1"); and particularly preferably, the ethylene polymer (E") is an ethylene polymer (E''') which also satisfies the above-mentioned requirements (1''') and (2''').

The ethylene polymer according to the invention may be molded to blow molded products, inflation molded products, cast molded products, laminated extrusion molded products, extrusion molded products such as pipes or various forms, expansion molded products, injection molded products, or the like. Further, the polymer can be used in the form of fiber, monofilament, non-woven fabric or the like. These products include those molded products comprising a portion made of ethylene polymer and another portion made of other resin (laminated products, etc.). Moreover, this ethylene polymer may be used in the state of being crosslinked during the molding process. The ethylene polymer according to the invention shows excellent properties when used in blow molded products and extrusion molded products such as pipes or various forms, among the above-mentioned molded products.

DESCRIPTION OF THE PREFERRED EMBODIMENTS

Figure 1:
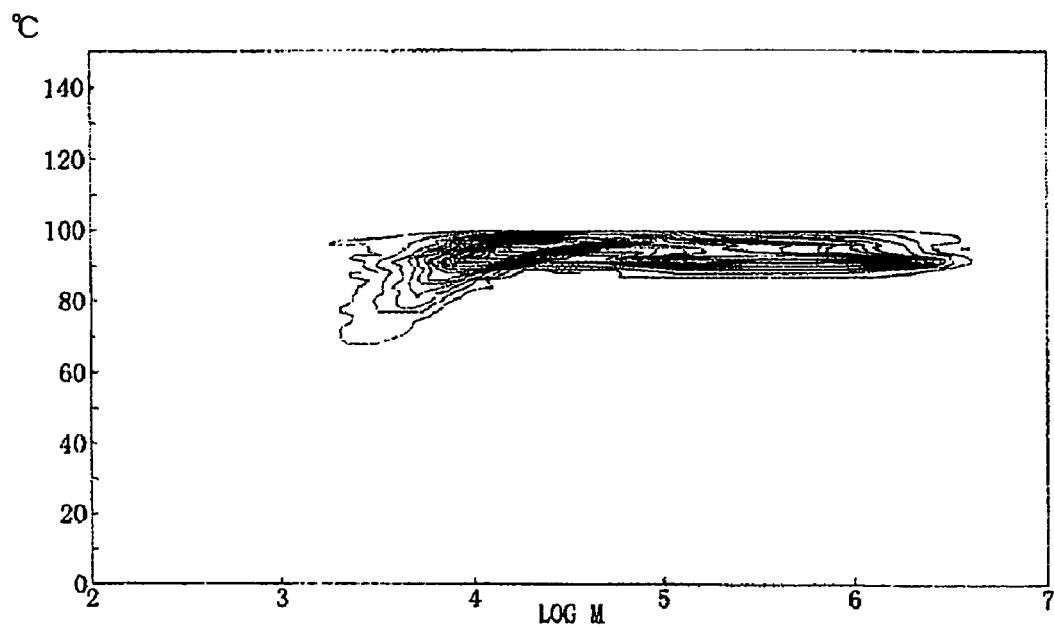
FIG. 1 is a CFC contour diagram for the ethylene polymer obtained in Example 1.

Hereinafter, the best modes to carry out the present invention will be described one after another, regarding the ethylene polymer (E), the ethylene polymer ($E_B$) which is suitably used for blow molded products and the blow molded products prepared therefrom, and the ethylene polymer ($E_P$) which is suitably used in pipes and the pipes or fittings prepared therefrom. Next, a representative process for preparation of the ethylene polymer according to the invention and various methods for measurement according to the invention will be described, and finally Examples will be illustrated.

Ethylene Polymer (E)

The ethylene polymer (E) according to the invention is an ethylene polymer which contains 0.01 to 1.20 mol % of a constitutional unit derived from α-olefin having 6 to 10 carbon atoms, and usually comprises homopolymers of ethylene and copolymers of ethylene/α-olefin having 6 to 10 carbon atoms.

Herein, examples of α-olefin having 6 to 10 carbon atoms (hereinafter, may be simply abbreviated to "α-olefin") include 1-hexene, 4-methyl-1-pentene, 3-methyl-1-pentene, 1-octene, 1-decene and the like. According to the invention, it is preferred to use at least one selected from 1-hexene, 4-methyl-1-pentene and 1-octene among such α-olefins.

The ethylene polymer (E) according to the invention is characterized in that it satisfies either of the following requirements (1) and (2) with respect to cross fractionation chromatography (CFC):

(1) the weight average molecular weight (Mw) of the components eluted at 73 to 76° C. does not exceed 4,000; and (2) the polymer satisfies the following relationship (Eq-1):

$$S_x/S_{total} \leq 0.1 \qquad \text{(Eq-1)}$$

wherein $S_x$ is the sum of the total peak areas related to the components eluted at 70 to 85° C. in CFC, and $S_{total}$ is the sum of the total peak areas related to the components eluted at 0 to 145° C.

Such ethylene polymer (E) is excellent in long-term properties such as fatigue properties when applied to molded products. Next, the requirements (1) and (2) will be explained in detail.

[Requirement (1)]

As for the ethylene polymer (E) according to the invention, the weight average molecular weight (Mw) of the components that are eluted at 73 to 76° C. in cross fractionation chromatography (CFC), as measured by GPC, does not exceed 4,000. More specifically, the weight average molecular weight (Mw) in association with the GPC peaks detected in the region for molecular weight of $10^8$ or less does not exceed 4,000. The weight average molecular weight (Mw) is preferably in the range of 2,000 to 4,000, and more preferably in the range of 2,500 to 3,500. It is meant by such ethylene polymer that the content of the high molecular weight components having a copolymerized α-olefin is small, or that the polymer does not contain any of such components which have relatively small molecular weights and also have a short-chained branch group. In this case, a product molded therefrom is excellent in long-term properties such as fatigue strength. The ethylene.α-olefin copolymer as described in the publication of JP-A No. 11-106432 has a wide composition distribution and thus does not satisfy the above-mentioned scope. The ethylene polymer as described in the publication of WO 01/25328 does not satisfy the above-mentioned scope because even a component with relatively small molecular weight also has a short-chained branch group resulting from copolymerization with an α-olefin. The ethylene polymers of prior art prepared in the presence of a Ziegler catalyst or a chromium catalyst also have wide composition distributions and thus do not satisfy the above-mentioned scope.

By setting the polymerization conditions as described later and using a catalyst system as described later, an ethylene polymer falling within this scope can be prepared. Specifically, when polymerization is carried out under the conditions as described in Example 3 of the invention, the weight average molecular weight (Mw) of the components which are eluted at 73 to 76° C. in temperature rising elution fractionation using a cross fractionation chromatography (CFC) apparatus is 2,900. Further, as long as the catalyst or the polymerization temperature is not changed, also as long as α-olefin is not supplied to the first polymerization vessel, and also as long as the α-olefin supplied to the second polymerization vessel (in this case, 1-hexene) is supplied at a rate no more than 900 g/hr, the above-mentioned weight average molecular weight (Mw) becomes less than 4,000.

[Requirement (2)]

The ethylene polymer (E) according to the invention satisfies the relationship as represented by the following equation (Eq-1):

$$S_x/S_{total} \leq 0.1 \quad (\text{Eq-1})$$

wherein $S_x$ represents the sum of the total peak areas related to the components which are eluted at 70 to 85° C., and $S_{total}$ represents the sum of the total peak areas related to the components which are eluted at 0 to 145° C., in cross fractionation chromatography (CFC).

As it has been explained for the terms in Requirement (1), it is meant by such ethylene polymer which satisfies Requirement (2), that the content of the high molecular weight components having a copolymerized α-olefin is small, or that the polymer does not contain any of such components which have relatively small molecular weights and also have a short-chained branch group. In this case, a product molded therefrom is excellent in long-term properties such as fatigue strength and the like. The ethylene.α-olefin copolymer as described in the publication of JP-A No. 11-106432 does not satisfy the relationship of the above-mentioned equation (Eq-1) because of its wide composition distribution. The ethylene polymer as described in the publication of WO 01/25328 does not satisfy the relationship of the above equation (Eq-1) because even a component with relatively small molecular weight also has a short-chained branch group resulting from copolymerization with an α-olefin. The ethylene polymers of prior art prepared in the presence of a Ziegler catalyst or a chromium catalyst also have wide composition distributions and thus do not satisfy the relationship of the above equation (Eq-1). In addition, since $S_x$ and $S_{total}$ in the above equation (Eq-1) represent the values based on the infrared analysis of elastic oscillation of the C—H bond, the value of $S_x/S_{total}$ is in principle identical with the percentage by weight occupied by the components eluted at 70 to 85° C. in the components eluted at 0 to 145° C. Typically, as for the ethylene polymer of the invention, since all of the components are eluted off by scanning in the region of 0 to 145° C., the value of $S_x/S_{total}$ can be otherwise said to be the percentage by weight occupied by the amount of the components eluted at 70 to 85° C. in the unit weight of the ethylene polymer.

An ethylene polymer falling within this scope can be prepared by setting the polymerization conditions as described later and using a catalyst system as described later. Specifically, when polymerization is carried out under the conditions as described in Example 3 of the invention, the value of the left-hand side of equation (Eq-1) with respect to cross fractionation chromatography (CFC) of the ethylene polymer obtained therefrom, namely, $(S_x/S_{total})$, is 0.042. Further, as long as the catalyst or the polymerization temperature is not changed, also as long as α-olefin is not supplied to the first polymerization vessel, and also as long as the α-olefin supplied to the second polymerization vessel (in this case, 1-hexene) is supplied at a rate no more than 900 g/hr, the value for $(S_x/S_{total})$ satisfies the above relationship (Eq-1).

A more preferred form of the above-mentioned ethylene polymer (E) is ethylene polymer (E') which satisfies the following requirements (1') to (7'):

(1') it contains 0.02 to 1.00 mol % of a constitutional unit derived from α-olefin having 6 to 10 carbon atoms;

(2') the density (d) is in the range of 945 to 970 kg/m$^3$;

(3') the intrinsic viscosity ([η]) as measured in decalin at 135° C. is in the range of 1.6 to 4.0 (dl/g);

(4') the ratio (Mw/Mn) of the weight average molecular weight (Mw) and the number average molecular weight (Mn) as measured by GPC is in the range of 5 to 70;

(5') with respect to cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), $(T_1-T_2)$ (° C.) is in the range of 0 to 11° C.;

(6') with respect to cross fractionation chromatography (CFC), the molecular weight for the apex of the strongest peak in the region corresponding to molecular weights of 100,000 or more is in the range of 200,000 to 800,000 on the GPC curve for the fraction eluted at $[(T_2-1)$ to $T_2]$ (° C.); and (7') on the GPC curve for the fraction eluted at $[(T_2-1)$ to $T_2]$ (° C.), the molecular weight at the apex of the strongest peak in the region corresponding to molecular weights of 100,000 or less does not exceed 28.000 in the GPC curve for the components eluted at 95 to 96° C.

Hereinafter, requirements (1') to (7') will be explained specifically in succession.

[Requirement (1')]

The ethylene polymer (E') according to the invention typically contains 0.02 to 1.00 mol % of a constitutional unit derived from α-olefin having 6 to 10 carbon atoms. When ethylene polymer (E') does not include homopolymers of ethylene, that is, when the polymer includes only copolymers of ethylene and α-olefin having 6 to 10 carbon atoms, the constitutional unit derived from ethylene is preferably present in a proportion of usually from 99 to 99.98 mol %, preferably from 99.5 to 99.98 mol %, and more preferably from 99.6 to 99.98 mol %, and the repeating unit derived from the α-olefin is preferably present in a proportion of usually from 0.02 to 1 mol %, preferably from 0.02 to 0.5 mol %, and more preferably from 0.02 to 0.4 mol %. Further, the ethylene polymer (E') may also include ethylene homopolymers, and in this case, the constitutional unit derived from ethylene in the ethylene.α-olefin copolymer part is preferably present in a proportion of usually from 95 to 99.96 mol %, preferably from 97.5 to 99.96 mol %, and more preferably from 98 to 99.96 mol %, and the repeating unit derived from the α-olefin is preferably present in a proportion of usually from 0.04 to 5 mol %, preferably from 0.04 to 2.5 mol %, and more preferably from 0.04 to 2.0 mol %. In addition, even in the case of ethylene homopolymers being included, the repeating unit derived from the α-olefin occupies a proportion of usually from 0.02 to 1 mol %, preferably from 0.02 to 0.5 mol %, and more preferably from 0.02 to 0.4 mol % of the whole polymer. When the α-olefin has 5 or less carbon atoms, the probability of the α-olefin being incorporated into the crystals increases (see Polymer, Vol. 31, p. 1999 (1990)), and consequently the strength is weakened, which is not desirable. When the α-olefin has more than 10 carbon atoms, the activation energy for fluidity becomes larger, and there occurs a large change in viscosity during molding, which is not desirable. Also, when the α-olefin has more than 10 carbon atoms, the side chain (the branch group originating from the α-olefin copolymerized with ethylene) may sometimes undergo crystallization, thereby resulting in weakening of the non-crystalline part, which is not desirable.

[Requirement (2') and Requirement (3')]

The density (d) of ethylene polymer (E') according to the invention is in the range of 945 to 970 kg/m³, preferably from 947 to 969 kg/m³, and more preferably from 950 to 969 kg/m³, and the intrinsic viscosity ([η]) thereof as measured in decalin at 135° C. is in the range of 1.6 to 4.0 dl/g, preferably from 1.7 to 3.8 dl/g, and more preferably from 1.8 to 3.7 dl/g. The ethylene polymer having its density and intrinsic viscosity within these ranges is well balanced between hardness and moldability. For example, by changing the ratio of the amounts of hydrogen, ethylene and α-olefin fed to the polymerization vessel, the ratio between the polymerization amounts of ethylene homopolymer and of ethylene.α-olefin copolymer, or the like, the values of density and intrinsic viscosity can be increased or decreased within the above-mentioned numerical ranges. Specifically, in the slurry polymerization of Example 3 using hexane as the solvent, when polymerization is carried out under stirring to render the system homogeneous, the density and [η] become 953 kg/m³ and 3.10 dl/g, respectively; when ethylene, hydrogen and 1-hexene are fed to the second polymerization vessel at the rates of 6.0 kg/hr, 0.45 N-liter/hr and 300 g/hr, respectively, the density and [η] become 944 kg/m³ and 3.6 dl/g, respectively; and when ethylene and hydrogen are fed to the first polymerization vessel at the rates of 7.0 kg/hr and 125 N-liters/hr, respectively, and when ethylene, hydrogen and 1-hexene are fed to the second polymerization vessel at the rates of 3.0 kg/hr, 0.07 N-liter/hr, and 30 g/hr, respectively, the density and [η] become 968 kg/m³ and 2.10 dl/g, respectively.

[Requirement (4')]

The ethylene polymer (E') according to the invention has the ratio Mw/Mn (Mw: weight average molecular weight, Mn: number average molecular weight) as measured by gel permeation chromatography (GPC), in the range of usually from 5 to 70, and preferably from 5 to 50. When multistage polymerization as described later is carried out using a catalyst system as described later, an ethylene polymer falling within this scope can be prepared by controlling the molecular weights of the respective components and the ratio of polymerization amounts.

For example, Mw/Mn can be increased by increasing the differences between the molecular weights of the respective components. The polymer having Mw/Mn within the above-mentioned ranges is well balanced between the mechanical strength and moldability. Specifically, when polymerization is carried out under the conditions as described in Example 3 of the invention, Mw/Mn is 14.8. Here, when the amount of ethylene fed to the first polymerization vessel is changed from 5.0 kg/hr to 7.0 kg/hr, and that of hydrogen is changed from 57 N-liters/hr to 125 N-liters/hr, the molecular weight of the ethylene polymer produced in the first polymerization vessel decreases, and thus Mw/Mn becomes about 18. On the other hand, when the amount of ethylene fed to the second polymerization vessel is changed from 4.0 kg/hr to 3.3 kg/hr, and that of hydrogen is changed from 0.2 N-liter/hr to 0.07 N-liter/hr, the molecular weight of the ethylene polymer produced in the second polymerization vessel increases, and thus Mw/Mn becomes about 22. Or else, when hydrogen is fed to the first polymerization vessel at 52 N-liters/hr, and ethylene, hydrogen and 1-hexene are fed to the second polymerization vessel at 6.0 kg/hr, 0.45 N-liter/hr and 200 g/hr, respectively, Mw/Mn becomes about 12.

[Requirement (5')]

Figure 2:
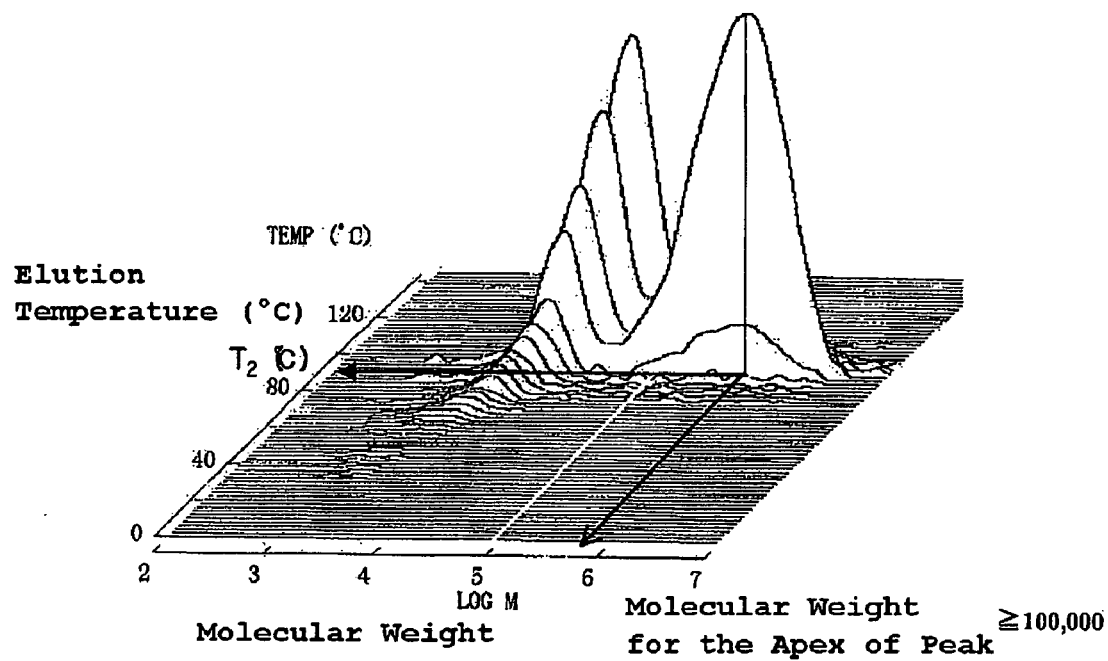
FIG. 2 is a three-dimensional GPC chart (bird's eye view) with $T_2$, as viewed from the lower temperature side, for the ethylene polymer obtained in Example 1.

In temperature rising elution fractionation of the ethylene polymer according to the invention using a cross fractionation chromatography (CFC) apparatus, when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), $(T_1-T_2)$ (° C.) is in the range of 0 to 11° C., preferably in the range of 0 to 10° C., and more preferably in the range of 0 to 9° C. In addition, in the CFC analysis according to the invention, the term "peak" as explained with reference to, for example, FIG. 2, indicates the distribution (chromatogram) of the solute, that is, the entire peak form; the term "the strongest (or the peak intensity is the strongest)" means that the height of the peak is the highest; and the term "apex of the peak" means the point where the differential value becomes zero (i.e., the top of the peak). Furthermore, if the peak does not have an apex, it indicates the portion where the differential value is closest to zero (i.e., shoulder).

Such ethylene polymer can be prepared to fall within the above-mentioned scope by setting the polymerization conditions as described later and using a catalyst system as described later.

The value of $(T_1-T_2)$ can be increased or decreased within these ranges, by increasing or decreasing the amount of the copolymerized α-olefin within a specific range. Specifically, when polymerization is carried out under the conditions as described in Example 3, there exist two peaks with different molecular weights in temperature rising elution fractionation using a cross fractionation chromatography (CFC) apparatus, and the temperature difference $(T_1-T_2)$ (° C.) between the temperature $(T_1)$ for the peak with the strongest peak intensity in the region corresponding to the eluted components having molecular weights of less than 100,000, and the temperature $(T_2)$ for the peak with the strongest peak intensity in the region corresponding to the eluted components having molecular weights of 100,000 or more, becomes 6° C. When the amount of 1-hexene fed to the second polymerization vessel is changed from 130 g/hr to 50 g/hr, $(T_1-T_2)$ (° C.) becomes 1° C., and when the same is changed to 200 g/hr, $(T_1-T_2)$ (° C.) becomes 11° C.

[Requirement (6')]

In cross fractionation chromatography (CFC) of ethylene polymer (E') according to the invention, on the GPC curve for the fraction eluted at the above-mentioned $T_2$ (° C.), the molecular weight for the apex of the strongest peak in the region corresponding to molecular weights of 100,000 or more is in the range of from 200,000 to 800,000. In addition, the fraction eluted at $T_2$ (° C.) indicates the fraction of the components eluted at $[(T_2-1)$ to $T_2]$ (° C.). Such ethylene polymer is well balanced between the long-term properties such as fatigue property and the like and moldability. An ethylene polymer falling within this scope can be prepared by setting the polymerization conditions as described later and using a catalyst system as described later. By means of increases or decreases in the amounts of the α-olefin, hydrogen, ethylene and the like supplied to a polymerization environment which would result in the preparation of a copolymer, the molecular weight for the apex of the peak corresponding to the highest molecular weight on the GPC curve for the fraction eluted at $T_2$ (° C.), can be increased or decreased within a specific range. Specifically speaking, when polymerization is carried out under the conditions as described in Example 3, in the GPC curve for the above-mentioned fraction eluted at $[(T_2-1)$ to $T_2]$ (° C.) in temperature rising elution fractionation using a cross fractionation chromatography (CFC) apparatus, the molecular weight for the apex of the strongest peak in the region corresponding to molecular weights of 100,000 or more is 493,000. When the amount of 1-hexene fed to the second polymerization vessel is changed from 130 g/hr to 200 g/hr, that of ethylene is changed from 4.0 kg/hr to 6.0 kg/hr, and that of hydrogen is changed from 0.2 N-liter/hr to 0.45 N-liter/hr, the molecular weight for the apex of the strongest peak in the region corresponding to molecular weights of 100,000 or more in the GPC curve for the above-mentioned fraction eluted at $[(T_2-1)$ to $T_2]$ (° C.) in temperature rising elution fractionation using a cross fractionation chromatography (CFC) apparatus, becomes 361,000. When the amount of hydrogen fed to the second polymerization vessel is changed from 0.2 N-liter/hr to 0.1 N-liter/hr, the molecular weight for the apex of the peak corresponding to the highest molecular weight in the GPC curve for the above-mentioned fraction eluted at $[(T_2-1)$ to $T_2]$ (° C.) in temperature rising elution fractionation using a cross fractionation chromatography (CFC) apparatus, becomes 680,000. With those metallocene catalysts conventionally known, it has been impossible to obtain an ethylene copolymer having a narrow molecular weight distribution and such high molecular weight.

[Requirement (7')]

In the GPC curve for the components of the ethylene polymer according to the invention, which are eluted at 95 to 96° C. in cross fractionation chromatography (CFC), the molecular weight for the apex of the strongest peak does not exceed 28,000. It is usually in the range of 15,000 to 27,000. It is meant by such ethylene polymer that it does not contain any of such components which have low molecular weights and also have a short-chained branch group, and in this case, the polymer is excellent in long-term properties such as fatigue strength.

Such ethylene polymer falling within this scope can be prepared by setting the polymerization conditions as described later and using a catalyst system as described later. Specifically speaking, when polymerization is carried out under the conditions as described in Example 3, the molecular weight for the apex of the strongest peak in the GPC curve for the components eluted at 95 to 96° C. in temperature rising elution fractionation using a cross fractionation chromatography (CFC) apparatus, is 22,000. Further, as long as the catalyst or the polymerization temperature is not changed, also as long as α-olefin is not supplied to the first polymerization vessel, and also as long as the amount of hydrogen supplied to the second polymerization is not set to 10 N-liters/hr or more, Mw lies within this range. When a branch group is present even in a low molecular weight component as described in WO 01/25328, since the crystallinity of the low molecular weight component is deteriorated, components having larger molecular weights are eluted off even at the same elution temperature, thus the requirement being not satisfied.

A more preferred form of the above-mentioned ethylene polymer (E') is ethylene polymer (E") in which less than 0.1, preferably less than 0.08, methyl branch group as measured by $^{13}$C-NMR is present per 1000 carbon atoms. Since such polymer has a strong crystalline structure, the mechanical strength is excellent. As for the ethylene polymer prepared by using a catalyst system as illustrated below, the methyl branch group is not detected because the quantity of the group is beyond the detection limit (0.08 per 1000 carbon atoms).

A particularly preferred form of ethylene polymer (E") as described above is the ethylene copolymer (E''') which satisfies the following requirements (1''') and (2''') simultaneously:

(1''') when the GPC curve is divided into two logarithmic normal distribution curves, the ratio (Mw/Mn) of the weight average molecular weight (Mw) and the number average molecular weight (Mn) for each divided curve is in the range of 1.5 to 3.5, and the weight average molecular weight for the divided representing the high molecular weight side (Mw$_2$) is from 200,000 to 800,000; and (2''') the smoothness coefficient R as determined from the surface roughness of an extruded strand does not exceed 20 μm.

Hereinafter, the requirements (1''') and (2''') will be specifically explained.

[Requirement (1''')]

As for the ethylene polymer (E''') according to the invention, when the molecular weight curve (GPC curve) measured by gel permeation chromatography (GPC) is divided into two logarithmic normal distribution curves, the weight average molecular weight (Mw)/number average molecular weight (Mn) for each divided curve is in the range of usually from 1.5 to 3.5, and preferably from 1.5 to 3.2. An ethylene polymer falling within this scope can be prepared by performing multistage polymerization as described later using a catalyst system as described later, and by controlling the type of the catalyst compound, the number of stages required for the multistage polymerization process, and the molecular weights of the respective components, which are selected for the process. It is possible to obtain a large value for Mw/Mn when polymerization is carried out in a gas phase, whereas it is possible to obtain a small value for Mw/Mn when polymerization is carried out in a slurry phase, because heat removal or monomer diffusion occurs more uniformly. Moreover, when a catalyst component is used without being supported on a carrier, the system approaches closely to a homogeneous system, and therefore the Mw/Mn becomes smaller. When slurry polymerization is carried out using a supported, geometric constraint type single-site catalyst (CGC/Borate) as described in the publication of JP-A No. 11-106432, or when slurry polymerization is carried out using a catalyst system comprising methylalumoxane and ethylene.bis(4,5,6,7-tetrahydro-1-indenyl) zirconium chloride supported on silica as described in the publication of EP 1201711 A1, the Mw/Mn for single-stage polymerization becomes 4 or more, thus the products not satisfying the claimed scope of the invention. Moreover, the Mw/Mn of the ethylene polymer that can be obtained by single stage slurry polymerization at 80° C. using the catalyst described in Example 1 of the invention, is approximately 2.3.

Furthermore, when the GPC curve for ethylene polymer (E''') according to the invention is divided into two logarithmic normal distribution curves, the weight average molecular weight ($Mw_2$) for the divided curve representing the high molecular weight side is in the range of 200,000 to 800,000. An ethylene polymer with its $Mw_2$ falling within the above-mentioned range can be prepared by appropriately selecting the proportions of hydrogen, ethylene and α-olefin used in the preparation of ethylene polymer. Specifically speaking, when polymerization is carried out under the conditions as described in Example 3, the weight average molecular weight ($Mw_2$) for the divided curve representing the high molecular weight side upon division of the GPC curve into two logarithmic normal distribution curves, becomes 416,000. When ethylene, hydrogen and 1-hexene are fed to the second polymerization vessel at the rates of 6.0 kg/hr, 0.35 N-liter/hr, and 200 g/hr, respectively, $Mw_2$ becomes 312,000; and when ethylene and hydrogen are fed to the second polymerization vessel at the rates of 3.0 kg/hr and 0.07 N-liter/hr, respectively, and 1-hexene is fed to the second polymerization vessel at the rate of 30 g/hr, $Mw_2$ becomes 539,000. The ethylene polymer having its $Mw_2$ within this range is well balanced between the strength and moldability.

[Requirement (2''')]

As for the ethylene polymer (E''') according to the invention, the smoothness coefficient R as determined from the surface roughness of an extruded strand does not exceed 20 μm, and preferably 15 μm. When the ethylene polymer obtained by polymerization such as gas phase polymerization or slurry polymerization is in a particulate form, the polymer particles may not be intermixed and dispersed completely even after being subjected to post-treatment such as melt-kneading and the like, and there may remain portions with different viscosities looking like mottles. In this case, when the molten resin is extruded to a shape of tube or strand, the surface would have rough skin. In such case, a product molded therefrom would also have similar rough skin. The extent can be determined from the smoothness coefficient R as determined by the measurement of surface roughness. In general, the size of an ethylene polymer particle prepared by gas phase polymerization or slurry polymerization is about a few tens of micrometers to 2 millimeters. When the morphological history of the polymer particle lingers on, the surface of an extruded product would have rough skin, resulting in the R value to increase to over 20 μm, and for example, when a polymerization method as described later is selected, an ethylene polymer having an R value not exceeding 20 μm, and usually not exceeding 15 μm, can be prepared. If R does not exceed 20 μm, a fluctuation in the range of 0 to 20 μm may occur due to incorporation of foreign substances or scratches in the die upon film formation, measurement error or the like, regardless of the essential nature. Therefore, it is meaningful only when R does not exceed 20 μm. In regard to an ethylene polymer having an R value which would exceed 20 μm, for example, when the ethylene polymer powder obtained in Example 3 is melt-kneaded at 190° C. and 25 rpm for a very long time such as 15 minutes or the like using a Labo-Plastmil (a batch-type counter rotating twin screw kneader) manufactured by Toyo Seiki Seisakusho, Ltd., an ethylene polymer having an R less than 20 μm can be obtained. It is possible to make R smaller by lengthening the time for kneading, but this may cause structural changes that are associated with decomposition or crosslinking. Further, when an ethylene polymer having an R which would exceed 20 μm is dissolved in a good solvent such as para-xylene to a proportion of about 5 g to 500 ml of the solvent, subsequently precipitated in a poor solvent, such as ice-cooled acetone, of a volume five times the solution volume at a rate of about 10 ml/min, and then dried and melt-kneaded, an ethylene polymer having an R value 10 μm or less can be obtained. Since a polymer having an R that does not exceed the above-mentioned value is homogeneous without reflectance of the polymer history as particle, the mechanical strength is particularly excellent, and fluidity becomes uniform. Thus, the surface of a molded product becomes smooth with excellent appearance. As shown in Example 1 of the invention, when batch-type two-stage polymerization is carried out, R does not exceed 20 μm, even without performing melt-kneading for a long time. Furthermore, when an ethylene polymer which is obtained by withdrawing an ethylene homopolymer from a first polymerization vessel and subjecting it to single-stage slurry polymerization under the conditions of a separate second polymerization vessel, among the ethylene polymers obtainable by Example 3, is melt-kneaded, an ethylene polymer with its R not exceeding 20 μm may be obtained.

Ethylene polymers (E), (E'), (E'') and (E''') according to the invention are characterized in that when a Microtome slice of a 0.5 mm-thick pressed sheet of one of the polymers obtained after melting at 190° C. and cooling at 20° C. is observed under a polarized microscope, a crystalline structure continuous over more than 10 μm is not observed.

Specifically speaking, when a Microtome slice of a 0.5 mm-thick pressed sheet obtained by melting at 190° C. and cooling at 20° C. is observed by polarized microscopy, a crystalline structure continuous over more than 10 μm is not observed. Such ethylene polymer has excellent mechanical strength. For example, when the ethylene polymer powder obtained in Example 3 is melt-kneaded using a Labo-Plastmil (a batch-type counter rotating twin screw kneader) manufactured by Toyo Seiki Seisakusho, Ltd., at 190° C. and 25 rpm for a long time to some extent such as 10 minutes or more, or the like, an ethylene polymer in which a crystalline structure continuous over more than 10 μm is not observed can be obtained. Also, as described in Example 1, when batch-type two-stage polymerization is carried out, an ethylene polymer in which a crystalline structure continuous over more than 10 μm is not observed can be obtained only with melt-kneading for a very short time. On the other hand, when an ethylene polymer which is obtained by withdrawing an ethylene homopolymer from a first polymerization vessel and subjecting it to single-stage slurry polymerization under the conditions of a separate second polymerization vessel, among the ethylene polymers obtainable by Example 3, is melt-kneaded, even though the kneading time is extended, a crystalline structure continuous over more than 10 μm is observed.

In addition, the polymerization process to obtain ethylene polymers (E) to (E''') of the invention is preferably carried out in the slurry phase or in the gas phase. When polymerization, preferably multistage polymerization, is carried out in the slurry phase or gas phase, two ethylene polymers with significantly different molecular weights are intermixed in the order of primary particles (nanometer order), which correspond to a single active site of catalyst, during polymerization, and thus it is desirable.

Ethylene Polymer ($E_B$) Suitably Used in Blow Molded Products

Among the ethylene polymers (E), preferably (E'), more preferably (E''), and particularly preferably (E'''), according to the invention, the ethylene polymer ($E_B$) which is suitably used in blow molded products is preferably defined as in the following ($1_B$), ($2_B$) and ($3_B$), in terms of the concentration of the constitutional unit derived from α-olefin having 6 to 10 carbon atoms, of the value of Mw/Mn, and of the value of ($T_1$-$T_2$) with respect to cross fractionation chromatography (CFC), respectively:

($1_B$) the polymer contains 0.02 to 0.20 mol % of a constitutional unit derived from α-olefin having 6 to 10 carbon atoms;

($2_B$) the ratio (Mw/Mn) of the weight average molecular weight (Mw) and the number average molecular weight (Mn) as measured by GPC is in the range of 5 to 30; and ($3_B$) with respect to cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), ($T_1$-$T_2$) (° C.) is in the range of 0 to 5° C.

Hereinafter, supplementary explanation on requirement ($1_B$) and requirement ($3_B$) will be given.

[Requirement ($1_B$)]

The ethylene polymer ($E_B$) according to the invention which is suitably used in blow molded products usually contains 0.02 to 0.2 mol % of a constitutional unit derived from α-olefin having 6 to 10 carbon atoms. When ethylene polymer ($E_B$) of the invention does not include ethylene homopolymers, that is, when the polymer consists only of copolymers of ethylene and α-olefin having 6 to 10 carbon atoms, it is desirable that the constitutional unit derived from ethylene is present typically in a proportion of 99.80 to 99.98 mol %, and the repeating unit derived from the α-olefin is present typically in a proportion of 0.02 to 0.20 mol %. Further, the ethylene polymer ($E_B$) may occasionally include ethylene homopolymers, and in this case, it is desirable that the constitutional unit derived from ethylene in the ethylene.α-olefin copolymer part is present typically in a proportion of 99.00 to 99.96 mol %, and the repeating unit derived from the α-olefin is present in a proportion of 0.04 to 1.00 mol %. In addition, even in the case of including ethylene homopolymers, the repeating unit derived from the α-olefin normally occupies 0.02 to 0.20 mol % of the whole polymer.

[Requirement ($3_B$)]

The ethylene polymer ($E_B$) according to the invention which is suitably used in blow molded products is such that in temperature rising elution fractionation using a cross fractionation chromatography (CFC) apparatus, when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), ($T_1$-$T_2$) (° C.) is in the range of 0 to 5° C., preferably from 0 to 4° C., and more preferably from 0 to 3° C. Here, the term apex of the strongest peak refers to the part where the differential value is zero (i.e., the top of the peak), and when there is no apex in the peak, the term refers to the part where the differential value is closest to zero (i.e., shoulder part). Such ethylene polymer has high toughness as well as excellent environmental stress crack resistance and the like. An ethylene polymer falling in this scope can be prepared by setting the polymerization conditions as described later and using a catalyst system as described later. ($T_1$-$T_2$) can be increased or decreased within the above-mentioned ranges by increasing or decreasing the amount of the copolymerized α-olefin in a specific range. Specifically, when polymerization is carried out under the conditions as described in Example 14 using hexane as the solvent, there exist two peaks with different molecular weights in temperature rising elution fractionation using a cross fractionation chromatography (CFC) apparatus, and the temperature difference ($T_1$-$T_2$) (° C.) between the temperature ($T_1$) for the peak with the strongest peak intensity in the region representing the eluted components with molecular weights of less than 100,000, and the temperature ($T_2$) for the peak with the strongest peak intensity in the region representing the eluted components with molecular weights of 100,000 or more, becomes 1° C. When the amount of 1-hexene fed to the second polymerization vessel is changed from 50 g/hr to 130 g/hr, ($T_1$-$T_2$) (° C.) can be adjusted to 5° C.

The ethylene polymer ($E_B$) according to the invention preferably satisfies, in addition to the above-mentioned requirements ($1_B$) to ($3_B$), the following requirements ($1_B'$) and ($2_B'$) [this ethylene polymer may be referred to as an ethylene polymer ($E_B'$)], and more preferably satisfies the following requirement ($1_B''$) [this ethylene polymer may be referred to as an ethylene polymer ($E_B''$)]:

($1_B'$) the flexural modulus as measured at 23° C. according to ASTM-D-790 is in the range of 1,500 to 1,800 MPa;

($2_B'$) the environmental stress crack resistance ESCR (hr) at 50° C. as measured according to ASTM-D-1693 is 10 hours or longer before failure; and ($1_B''$) tan δ (=loss modulus G''/storage modulus G') as measured at 190° C. and at an angular frequency of 100 rad/sec using a dynamic viscoelecticity measuring apparatus, is from 0.7 to 0.9.

Hereinafter, requirements ($1_B'$), ($2_B'$) and ($1_B''$) will be described in detail.

[Requirements ($1_B'$) and ($2_B'$)]

The ethylene polymer ($E_B'$) according to the invention is such that the flexural modulus as measured at 23° C. is in the range of 1,500 to 1,800 MPa, and the environmental stress crack resistance ESCR (hr) as measured at 50° C. is 10 hours or longer before failure, preferably 50 hours or longer before failure. An ethylene polymer having the flexural modulus and ESCR values within these ranges is hard and tough, and thus the molded product obtained therefrom can be made thinner than conventional ones upon use. When multistage polymerization as described later is carried out using a catalyst system as described later, an ethylene polymer with its [η] falling in the above range can be prepared by changing the proportions of hydrogen, ethylene and α-olefin fed to the polymerization vessel and thereby controlling the molecular weights and the proportions of polymerized amounts of the respective components. Specifically, when an ethylene polymer which has been polymerized under the conditions as described in Example 14 using hexane as the solvent, is kneaded at 190° C. and 50 rpm for 10 minutes using a Labo-Plastmil (batch volume of the unit=60 cm³) manufactured by Toyo Seiki Seisakusho, Ltd., the flexural modulus obtained is 1,650 MPa, and the ESCR is 600 hours before failure. When the amount of 1-hexene fed to the second polymerization vessel is changed from 50 g/hr to 30 g/hr, and the amount of ethylene fed to the second polymerization vessel is reduced from 4.0 kg/hr to 3.0 kg/hr, the flexural modulus becomes 1,780 MPa, and the ESCR becomes 233 hours before near 50% failure.

When the amount of 1-hexene fed to the second polymerization vessel is changed from 50 g/hr to 65 g/hr, the flexural modulus becomes 1,520 MPa, and the ESCR becomes 600 hours before failure.

[Requirement ($1_B''$)]

The above-mentioned ethylene polymer ($E_B'$) according to the invention is preferably such that tan δ (loss modulus G''/storage modulus G') as measured at 190° C. and at an angular frequency of 100 rad/sec using a dynamic viscoelasticity measuring apparatus is 0.7 to 0.9. When tan δ falls within this range, the pinch-weldability of the blow molded product is excellent. As the molecular weight of the low molecular weight ethylene polymer is increased, and as the molecular weight of the high molecular weight ethylene.α-olefin copolymer is decreased, tan δ tends to increase. In addition, pinch-weldability refers to the ability of a resin being well attached to the welded parts with a bulge when molten resin extruded in the shape of tube from an extruder is welded between the molds. Large tan δ means stronger viscosity, and in this case, the resin is thought to be susceptible to bulging.

Moreover, ethylene polymers ($E_B$), ($E_B'$) and ($E_B''$) according to the invention for use in blow molded products are preferably soluble in decane at 140° C. This means that the polymers are not crosslinked, and when the polymers are not crosslinked, it is possible to recycle them after re-dissolving them. Therefore, the preparation process for molded products is more convenient and desirable.

Further, with regard to ethylene polymers ($E_B$), ($E_B'$) and ($E_B''$) for use in blow molded products, the ethylene polymer (E) is preferably the ethylene polymer (E') which satisfies the above-mentioned requirements (1') to (7'); more preferably, the ethylene polymer (E') is the ethylene polymer (E'') which satisfies the above-mentioned requirement (1''); and particularly preferably, the ethylene polymer (E'') is the ethylene polymer (E''') which satisfies the above-mentioned requirements (1''') and (2'''). In other words, as for the ethylene polymer of the invention for use in blow molded products, the ethylene polymer (E''') which satisfies all of the above-mentioned requirements ($1_B'$), ($2_B'$) and ($1_B''$) is most suitably used.

Ethylene Polymer ($E_P$) Suitably Used in Pipes

Among the ethylene polymers (E), preferably (E'), more preferably (E'') and particularly preferably (E'''), according to the invention, the ethylene polymer that is suitably used in pipes is preferably defined as in the following ($1_P$) and ($2_P$) in terms of the concentration of the constitutional unit derived from α-olefin having 6 to 10 carbon atoms and of the value of Mw/Mn, respectively. An ethylene polymer defined as such may be referred to as an ethylene polymer ($E_P$) in the following description.

($1_P$) The polymer contains 0.10 to 1.00 mol % of a constitutional unit derived from α-olefin having 6 to 10 carbon atoms; and ($2_P$) the ratio (Mw/Mn) of the weight average molecular weight (Mw) and the number average molecular weight (Mn) as measured by GPC is in the range of 11 to 70.

Hereinafter, requirement ($1_P$) and requirement ($2_P$) will be explained.

[Requirement ($1_P$)]

The ethylene polymer ($E_P$) according to the invention that is suitably used in pipes contains usually 0.10 to 1.00 mol % of a constitutional unit derived from α-olefin having 6 to 10 carbon atoms. When ethylene polymer ($E_P$) of the invention does not include ethylene homopolymers, that is, when the polymer includes only copolymers of ethylene and α-olefin having 6 to 10 carbon atoms, it is preferred that the constitutional unit derived from ethylene is usually present in a proportion of 99.00 to 99.90 mol %, and the repeating unit derived from the α-olefin is usually present in a proportion of 0.10 to 1.00 mol %. Further, the ethylene polymer ($E_P$) may occasionally include ethylene homopolymers, and in this case, it is desirable that the constitutional unit derived from ethylene is usually present in a proportion of 95.00 to 99.80 mol %, and the repeating unit derived from the α-olefin is present in a proportion of 0.20 to 5.00 mol % in the ethylene.α-olefin copolymer part. In addition, even when the polymer includes ethylene homopolymers, the repeating unit derived from the α-olefin usually occupies 0.10 to 1.00 mol % of the whole polymer.

[Requirement ($2_P$)]

The ethylene polymer ($E_P$) according to the invention is such that the ratio Mw/Mn (Mw: weight average molecular weight, Mn: number average molecular weight) as measured by gel permeation chromatography (GPC) is usually in the range of 11 to 70, and preferably in the range of 11 to 50. When multistage polymerization as described later is carried out using a catalyst system as described later, an ethylene polymer falling in this scope can be prepared by controlling the molecular weights and the ratio of polymerized amounts of the respective components. For example, when the difference in the molecular weights of the respective components is increased, the ratio Mw/Mn is increased. A polymer having Mw/Mn within the mentioned ranges is well balanced between mechanical strength and moldability. Specifically, when polymerization is carried out under the conditions as described in Example 1 using hexane as the solvent, the ratio Mw/Mn obtained is 14.8. Here, when the amount of ethylene fed to the first polymerization vessel is changed from 5.0 kg/hr to 7.0 kg/hr, and that of hydrogen is changed from 57 N-liters/hr to 125 N-liters/hr, the molecular weight of the ethylene polymer produced in the first polymerization vessel decreases, and thus Mw/Mn becomes about 18. On the other hand, when the amount of ethylene fed to the second polymerization vessel is changed from 4.0 kg/hr to 3.3 kg/hr, and that of hydrogen is changed from 0.2 N-liter/hr to 0.07 N-liter/hr, the molecular weight of the ethylene polymer produced in the second polymerization vessel increases, and thus Mw/Mn becomes about 22. Further, when hydrogen is fed to the first polymerization vessel at the rate of 52 N-liters/hr, and ethylene, hydrogen and 1-hexene are fed to the second polymerization vessel at the rates of 6.0 kg/hr, 0.45 N-liter/hr and 200 g/hr, respectively, Mw/Mn becomes about 12.

The ethylene polymer ($E_P$) of the invention preferably satisfies, in addition to the above-described requirements ($1_P$) and ($2_P$), the following requirements ($1_P'$) and ($2_P'$) [this ethylene polymer may be referred to ethylene polymer (($E_P'$)]:

($1_P'$) the actual stress obtained when it takes 10,000 cycles to fracture due to the tensile fatigue property as measured at 80° C. according to JIS K-6744, is from 13 MPa to 17 MPa, and the actual stress obtained when it takes 100,000 cycles to fracture is from 12 to 16 MPa; and ($2_P'$) the actual stress (S) (MPa) and density (d) obtained when it takes 10,000 cycles to fracture due to the tensile fatigue property as measured at 23° C. according to JIS K-7118, satisfy the following relationship (Eq-2):

$$(0.12d - 94.84) < S < (0.60d - 550.00) \quad \text{(Eq-2)}$$

Hereinafter, requirement ($1_P'$) and requirement ($2_P'$) will be discussed in detail.

[Requirement ($1_P'$)]

Figure 29:
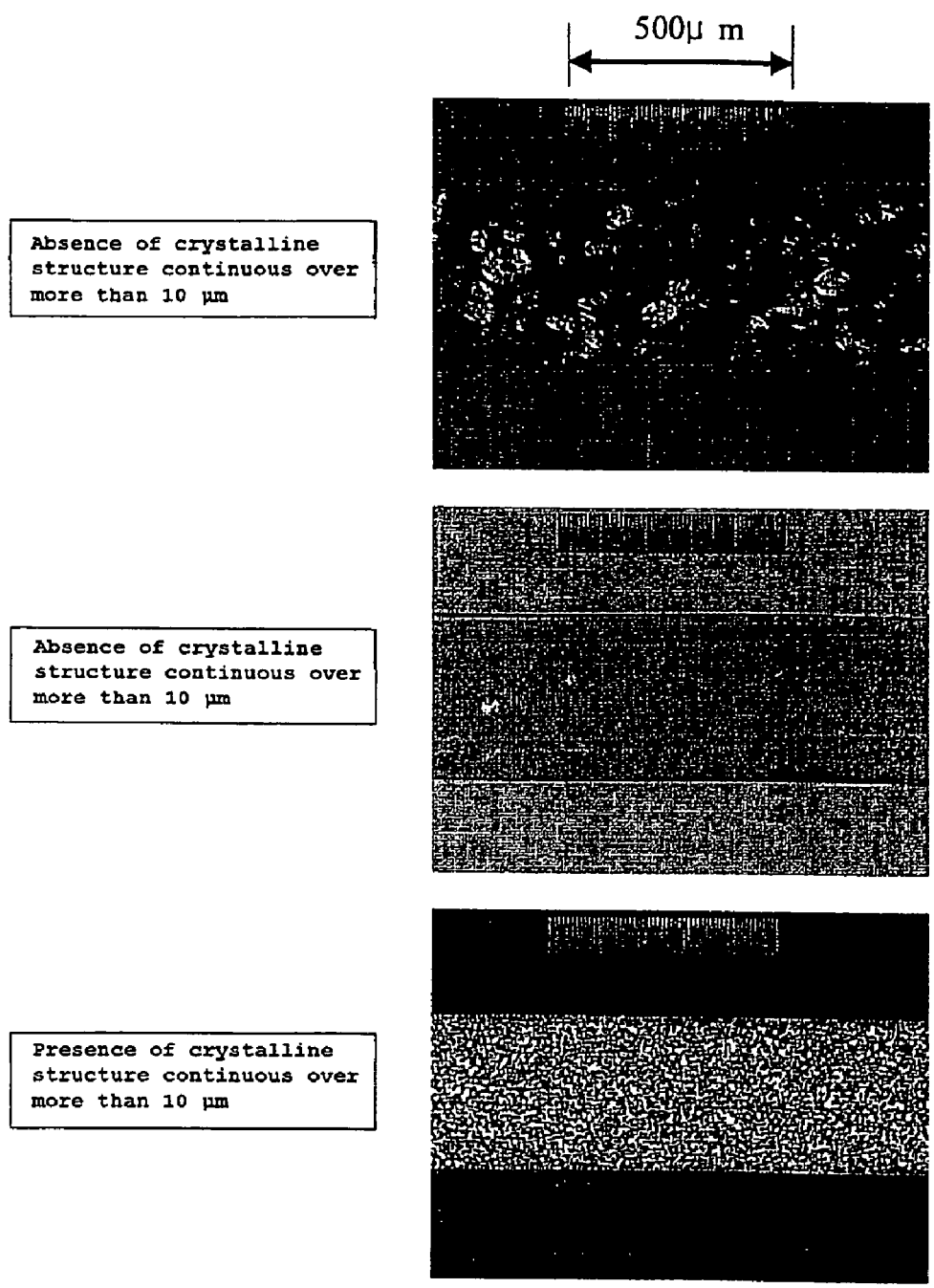
FIG. 29 shows exemplary results (75 times) for the measurement of the crystalline structure of an ethylene polymer.
Figure 30:
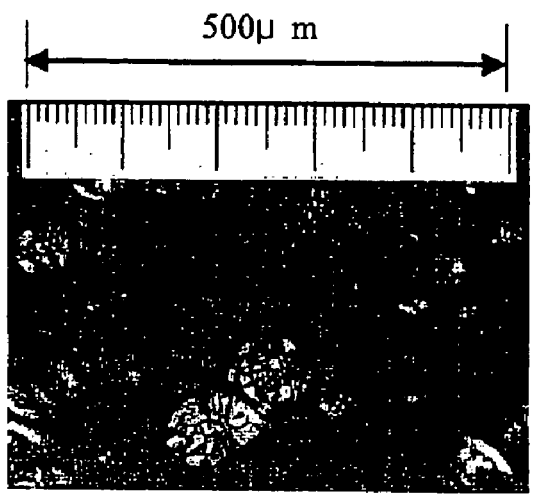
FIG. 30 shows exemplary results (150 times) for the measurement of the crystalline structure of an ethylene polymer.
Figure 30:
Figure 30:
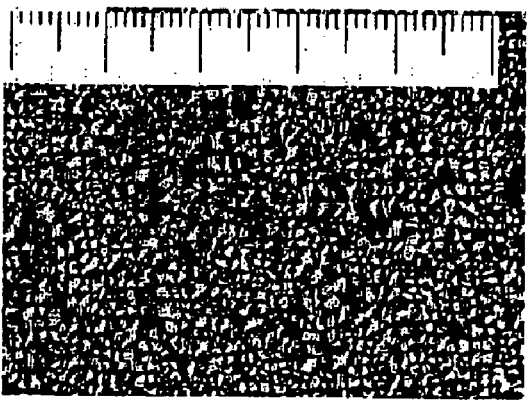

The ethylene polymer ($E_P'$) according to the invention is such that the actual stress obtained when it takes 10,000 cycles to fracture due to the tensile fatigue property as measured at 80° C. with a notched specimen, is from 13 MPa to 17 Mpa, and preferably from 14 MPa to 16 MPa, and the actual stress obtained when it takes 100,000 cycles to fracture is in the range of 12 MPa to 17 MPa, and preferably in the range of 13 MPa to 16 MPa. An ethylene polymer with the tensile fatigue strength as measured at 80° C. with a notched specimen falling in the above-mentioned ranges, exhibits a brittle failure mode and has excellent long-term life properties. When multistage polymerization as described later is carried out using a catalyst system as described later, an ethylene polymer falling within this scope can be prepared by controlling the molecular weights of the respective components, the amount of the α-olefin copolymerized with ethylene, the composition distribution, the ratio of polymerized amounts, and compatibility. For example, fatigue strength can be enhanced within the scope of the claims, by increasing the value of [η] within the claimed scope using a specific single-site catalyst, by selecting α-olefin having 6 to 10 carbon atoms as the α-olefin to be copolymerized, by selecting the amount of α-olefin in the copolymer from a range of 0.1 to 5.0 mol %, and by selecting the polymerization conditions that would narrow the composition distribution. Specifically, when polymerization is carried out under the conditions as described in Example 3 using hexane as the solvent, and granulation is carried out under the conditions as described in Example 3, the actual stress obtained when it takes 10,000 cycles to fracture due to the tensile fatigue property as measured at 80° C., is 13.7 MPa, and the actual stress obtained when it takes 100,000 cycles to fracture is 13.1 MPa. When granulation is carried out using a 20 mmφ single-screw extruder (L/D=28, compression ratio=3) manufactured by Thermoplastics Inc. which is set at 230° C., 100 rpm and at an output rate of 50 g/min with a full flight screw, the actual stress obtained when it takes 10,000 cycles to fracture due to the tensile fatigue as measured at 80° C. is 12.3 MPa, and the actual stress obtained when it takes 100,000 cycles to fracture is 11.3 MPa, thus the polymer not satisfying the claimed scope. It is inferred that this is because compatibility of the polymerized particles is poor. Further, during polymerization, when ethylene and hydrogen are fed to the second polymerization vessel at the rates of 3.3 kg/hr and 0.07 N-liter/hr, respectively, and granulation is carried out under the conditions as described in Example 3, the actual stress obtained when it takes 10,000 cycles to fracture due to the tensile fatigue property as measured at 80° C. is 13.9 MPa, and the actual stress obtained when it takes 100,000 cycles to fracture is 13.4 MPa. Also, when the polymerization conditions as described in Comparative Example 1 are employed, the actual stress obtained when it takes 10,000 cycles to fracture due to the tensile fatigue property as measured at 80° C. is 12.1 MPa, and the actual stress obtained when it takes 100,000 cycles to fracture is 11.2 MPa, thus the polymer not satisfying the claimed scope. In contrast, when [η] of the resin is brought close to the upper limit defined in the claims, 3.7 dl/g, by having the same amount of the comonomer as used in Example 1 and reducing the amount of hydrogen during copolymerization with the comonomer, there occur increases in the actual stress values obtained when it takes 10,000 cycles and 100,000 cycles to fracture. Also, even with the same molecular structure, when a low molecular weight ethylene homopolymer prepared by single-stage polymerization and a high molecular weight ethylene.α-olefin copolymer prepared by single-stage polymerization are melt-blended, there exists a crystalline structure continuous over more than 10 μm, that is, there also exists a structure continuous over more than 10 μm which is formed from the low molecular weight ethylene homopolymer and which is susceptible to destruction. Thus, the polymer does not show the tensile fatigue strength as measured at 80° C. with notch. Moreover, if the polymer contains a component whose molecular structure is likely to weaken the crystalline part, in other words, if the polymer contains a low molecular weight component having a short-chained branch group, or a high molecular weight component having too many short-chained branch groups, generation of strong tie molecules which bind crystals to crystals becomes difficult, thereby the non-crystalline part being weakened. Thus, the tensile fatigue strength which is measured with a notched specimen at 80° C. is not exhibited. In addition, the phrase "a crystalline structure continuous over more than 10 μm is not observed" as used herein is understood from the fact that when a Microtome slice of a 0.5 mm-thick pressed sheet obtained by melting at 190° C. and cooling at 20° C. is observed under a polarized microscope, a crystalline structure continuous over more than 10 μm is not observed. That is to say, it is understood from the fact that when a 0.5 mm-thick pressed sheet is prepared by melting an ethylene polymer at 190° C., then molding it into a sheet form under a pressure of 10 MPa and compressing into a sheet by a cold press set at 20° C., using a hydraulic press molding machine manufactured by Shinto Metal Industries, Ltd.; then the pressed sheet is cut into a size of approximately 0.5 mm (thickness of the pressed sheet)×10 to 20 μm using a Microtome or the like; subsequently, a small amount of glycerin is applied on this cut specimen, which is then adhered to a preparation glass with a cover glass placed thereon to provide a sample for observation; and this sample is loaded on the polarized plate of a cross Nicol prism and observed with an optical microscope at about 75 magnifications and about 150 magnifications. FIGS. 29 and 30 illustrate examples of the case where crystalline structure is observed only in parts of the visual field, indicating that a crystalline structure continuous over more than 10 μm is absent, and examples of the case where the crystalline structure is observed over the entire visual field, indicating that a crystalline structure continuous over more than 10 μm is present. Here, the scale bar indicates that the whole length corresponds to 0.5 mm. FIG. 29 shows photographs of about 75 magnifications, and FIG. 30 shows those of about 150 magnifications.

[Requirement ($2_P'$)]

The ethylene polymer ($E_P'$) according to the invention is characterized in that the actual stress (S) (MPa) obtained when it takes 10,000 cycles to fracture due to the tensile fatigue property as measured at 23° C. with an unnotched specimen, is in the range of 19.4 to 27.2 MPa, and preferably in the range of 19.6 to 27.2 MPa, or ethylene polymer ($E_P'$) according to the invention is characterized in that the actual stress (S) (MPa) obtained when it takes 10,000 cycles to fracture due to the tensile fatigue property as measured at 23° C. with an unnotched specimen, and the density (d) (kg/m$^3$) of a specimen which has been annealed at 120° C. for 1 hour and then cooled linearly to room temperature over 1 hour, as measured by means of a density gradient column, satisfy the following relationship (Eq-2):

$$(0.12d-94.84)<S<(0.60d-550.00) \quad \text{(Eq-2)}$$

and preferably the following relationship (Eq-3):

$$(0.20d-170.84)<S<(0.60d-550.00) \quad \text{(Eq-3)}.$$

Figure 35:
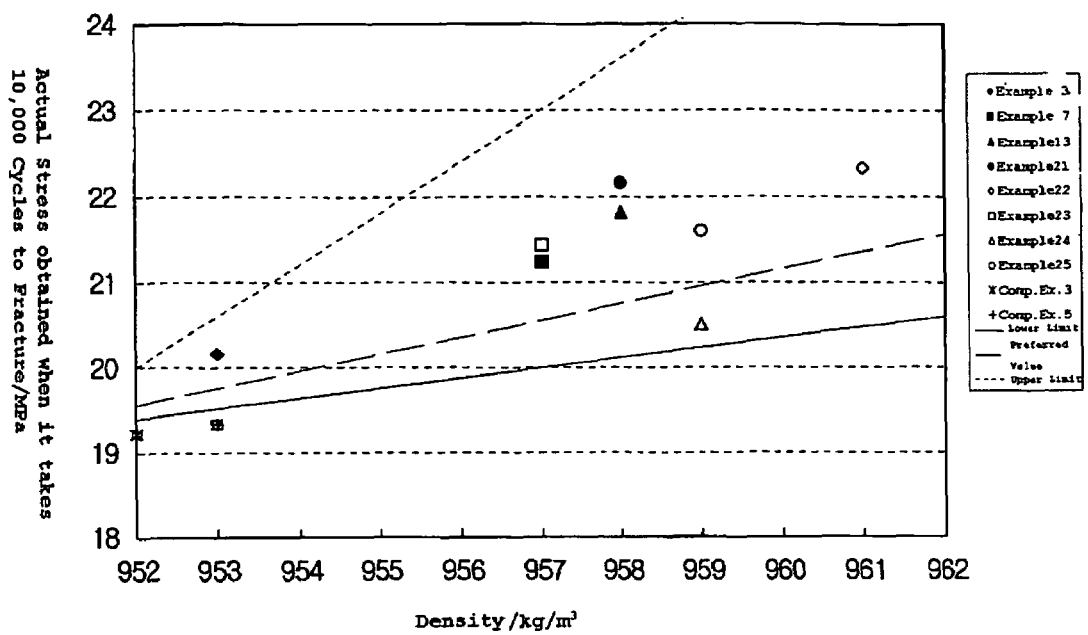
FIG. 35 is a chart indicating the results of the tensile fatigue test at 23° C. for Examples and Comparative Examples, as plotted against the density of the sample.

The tensile fatigue property as measured at 23° C. with an unnotched specimen may be improved by increasing the density, that is, by hardening the polymer; however, since there may be changes in the mechanical properties in addition to the change of density, this is implied in the relationship with the density. Therefore, this relationship indicates that even though the density (hardness) is the same, the tensile fatigue property as measured at 23° C. with an unnotched specimen is superior to those obtained in the prior art. Further, the expression defining the lower limit of S (MPa) is based on the expression obtained in order to distinguish between the two relationships as follows, when the relationship between the tensile fatigue property as measured at 23° C. with an unnotched specimen and the density of an ethylene polymer obtained by a conventional technique, and the relationship between the tensile fatigue property as measured at 23° C. with an unnotched specimen and the density as obtained in the invention are plotted. The plot is shown in FIG. 35. The expression defining the upper limit of S (MPa) is based on the expression obtained in order to distinguish between the region indicating actual measurement values and the region with no actual measurement values higher than the above-mentioned values, when the relationship between the tensile fatigue property as measured at 23° C. with an unnotched specimen and the density as obtained in the invention is plotted. The plot is shown in FIG. 35. When multistage polymerization as described later is carried out using a catalyst system as described later, an ethylene polymer falling within this scope can be prepared by controlling the molecular weights of the respective components, the amount of α-olefin to be copolymerized with ethylene, the composition distribution, the ratio of polymerized amounts, and compatibility. For example, the fatigue strength can be enhanced within the claimed scope, by increasing the value of [η] within the claimed scope using a specific single-site catalyst, by selecting α-olefin having 6 to 10 carbon atoms as the α-olefin to be copolymerized, by decreasing the proportion of the α-olefin in the copolymer to the range of 0.1 to 2.0 mol %, and by selecting the polymerization conditions that would narrow the composition distribution. Specifically, when polymerization is carried out under the conditions as described in Example 3 using hexane as the solvent, and granulation is carried out under the conditions as described in Example 3, the density (d) is 953 kg/m³, and the actual stress (S) obtained when it takes 10,000 cycles to fracture due to the tensile fatigue property as measured at 23° C. is 20.2 MPa. When the density (d) is 953 kg/m³, (s) is in the range of 19.5 to 21.8 MPa.

Moreover, the ethylene polymers ($E_P$), ($E_P'$) and ($E_P''$) according to the invention for use in pipes are preferably soluble in decane at 140° C. This means that the crosslinking process is not performed, and when crosslinking process is not performed, it is possible to recycle the polymers after re-dissolving them. Thus, the process for preparation of molded products is more convenient and desirable.

Further, with regard to ethylene polymers ($E_P$), (($E_P'$) and ($E_P''$) for use in pipes, the ethylene polymer (E) is preferably an ethylene polymer (E') which satisfies the above-mentioned requirements (1') to (7'); more preferably, the ethylene polymer (E') is an ethylene polymer (E'') which satisfies the above-mentioned requirement (1''); and particularly preferably, the ethylene polymer (E'') is an ethylene polymer (E''') which satisfies the above-mentioned requirements (1''') and (2'''). In other words, as for the ethylene polymer of the invention for use in pipes, the ethylene polymer (E''') which satisfies both the above-mentioned requirements ($1_P'$) and ($2_P'$) is most suitably used.

Process for Preparation of Ethylene Polymer

The ethylene polymer according to the invention can be obtained by, for example, homopolymerizing ethylene or copolymerizing ethylene with α-olefin having 6 to 10 carbon atoms, using a catalyst for olefin polymerization that is formed from:

(A) a transition metal compound in which a cyclopentadienyl group and a fluorenyl group are bonded to each other via a covalent bond bridge containing an atom of Group 14;

(B) at least one compound selected from:

(B-1) an organic metal compound, (B-2) an organic aluminum oxy compound, and (B-3) a compound which forms an ion pair by reacting with a transition metal compound; and (C) a carrier. More specifically speaking, components (A), (B) and (C) used in Examples of the invention are as follows.

* (A) Transition Metal Compound

The transition metal compound (A) is a compound represented by the following formulas (1) and (2):

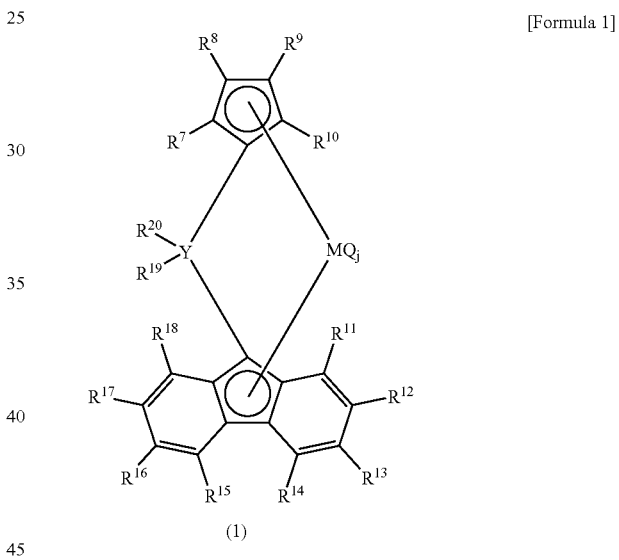

[Formula 1]

(1)

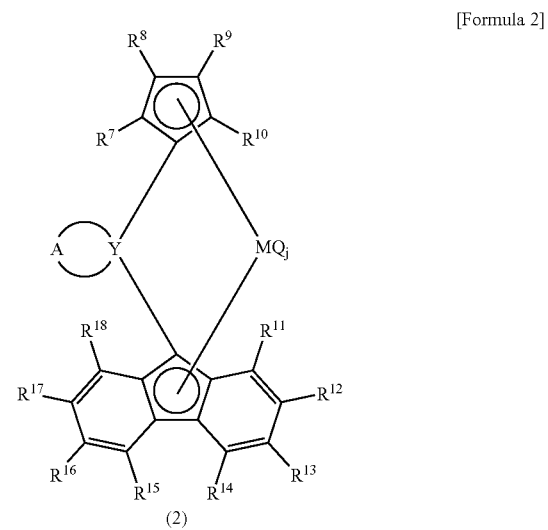

[Formula 2]

(2)

in which formulas, $R^7, R^8, R^9, R^{10}, R^{11}, R^{12}, R^{13}, R^{14}, R^{15}, R^{16}, R^{17}, R^{18}, R^{19}$ and $R^{20}$ are selected from hydrogen, a hydrocarbon group, and a silicon-containing hydrocarbon group and may be the same or different from each other, while the adjacent substituents $R^7$ to $R^{18}$ may be joined together to form a ring; A is a divalent hydrocarbon group having 2 to 20 carbon atoms which may partly contain an unsaturated bond and/or an aromatic ring, and A may form a ring structure together with Y, thus containing two or more ring structures including the ring formed by A together with Y; Y is carbon or silicon; M is a metal selected from the atoms of Group 4 in the Periodic Table of Elements; Q may be selected from the same or different combinations of halogen, a hydrocarbon group, an anionic ligand, or a neutral ligand which can coordinate to an electron lone pair; and j is an integer between 1 and 4.

Specifically, $R^7$ to $R^{10}$ are hydrogen, Y is carbon, M is Zr, and j is 2.

The transition metal compound (A) used in the Examples of the present application as described later is specifically represented by the following formulas (3) and (4), but the invention is not limited to these transition metal compounds.

Figure 3:
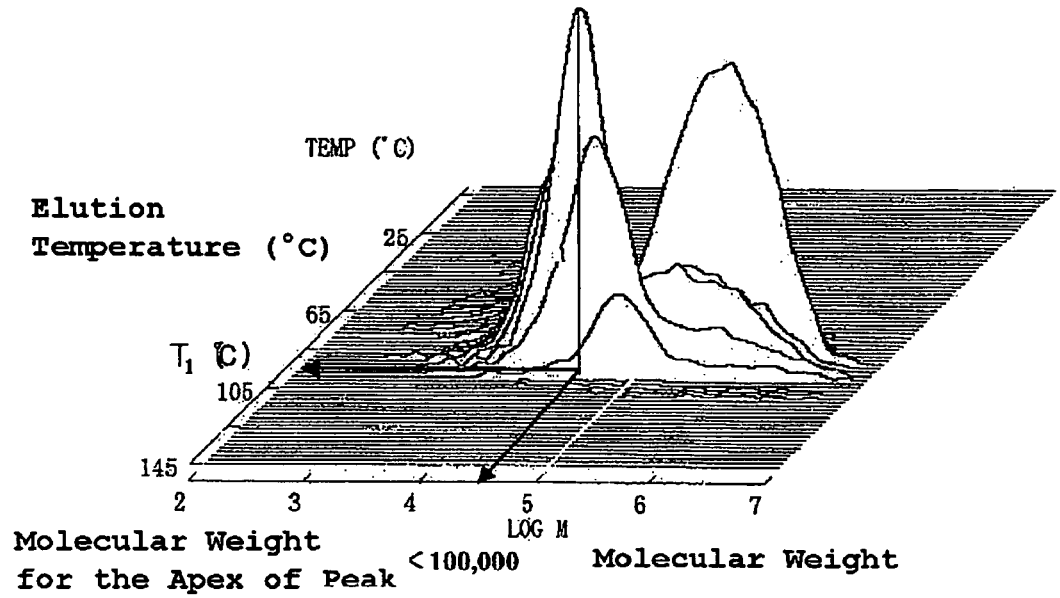
FIG. 3 is a three-dimensional GPC chart (bird's eye view) with $T_1$, as viewed from the higher temperature side, for the ethylene polymer obtained in Example 1.

[Figure 3]
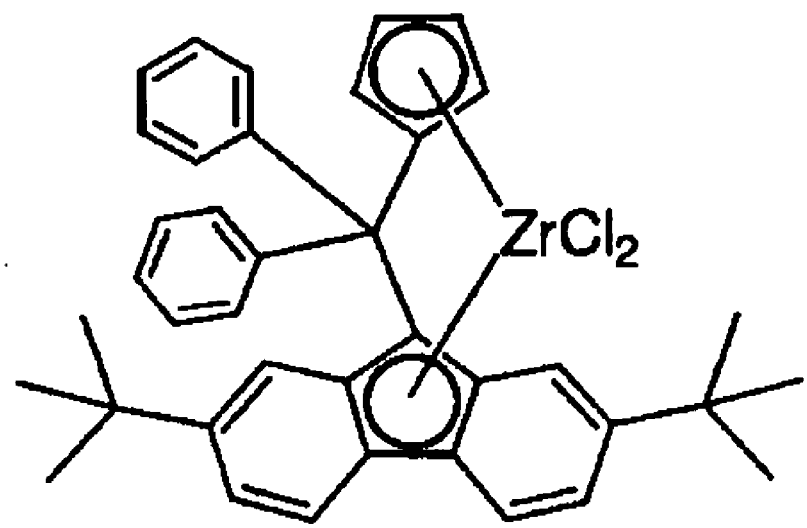

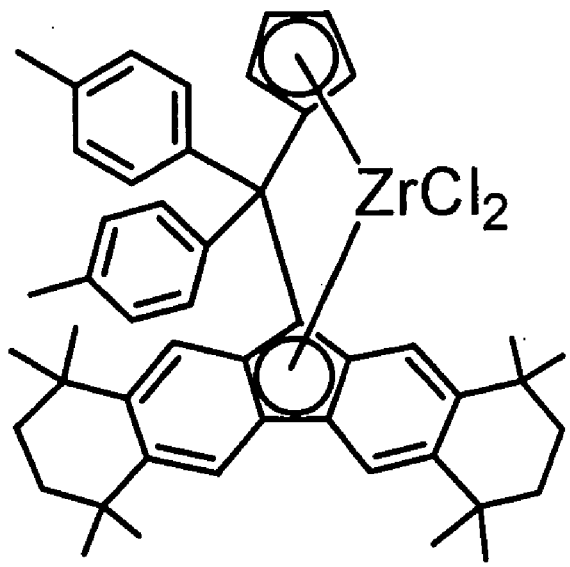
⋯(4)

In addition, the structures of the transition metal compounds represented by the above formulas (3) and (4) were determined by 270 MHz $^1$H-NMR (JEOL, GSH-270) and FD-mass analysis (JEOL, SX-102 A).

* (B-1) Organic Metal Compound

As for the organic metal compound (B-1) used in the invention as needed, mention may be made specifically of the following organic metal compounds having the metals from Groups 1, 2, 12 and 13 of the Periodic Table of Elements. It is an organic aluminum compound represented by the following formula:

$$R^a{}_m Al(OR^b)_n H_p X_q \qquad \text{[General Formula]}$$

wherein $R^a$ and $R^b$ may be the same or different and each represent a hydrocarbon group having 1 to 15, preferably 1 to 4, carbon atoms; X represents a halogen atom; m is a number such that $0<m\leq3$, n is a number such that $0\leq n<3$, p is a number such that $0\leq p<3$, and q is a number such that $0\leq q<3$, while m+n+p+q=3.

The aluminum compound used in the below-described Examples of the invention is triisobutylaluminum or triethylaluminum.

* (B-2) Organic Aluminum Oxy Compound

The organic aluminum oxy compound (B-2) used in the invention as needed may be a conventionally known aluminoxane, or a benzene-insoluble organic aluminum oxy compound as illustrated in the publication of JP-A No. 2-78687.

The organic aluminum oxy compound used in the below-described Examples of the invention is a commercially available MAO (=methylalumoxane)/toluene solution manufactured by Nippon Aluminum Alkyls, Ltd.

* (B-3) Compound Forming an Ion Pair by Reacting with a Transition Metal Compound The compound (B-3) which forms an ion pair by reacting with the bridged metallocene compound (A) of the invention (hereinafter, referred to as "ionizing ionic compound") may include the Lewis acids, ionic compounds, borane compounds, carborane compounds and the like described in the publications of JP-A No. 1-501950, JP-A NO. 1-502036, JP-A NO. 3-179005, JP-A NO. 3-179006, JP-A NO. 3-207703, JP-A NO. 3-207704, U.S. Pat. No. 5,321,106 and the like. It may further include heteropoly compounds and isopoly compounds. Such ionizing ionic compounds (B-3) are used independently or in combination of two or more species. In addition, as for compound (B), the above-described two compounds (B-1) and (B-2) are used in the below-described Examples of the invention.

* (C) Microparticulate Carrier

The microparticulate carrier (C) used in the invention as needed is a solid product in the form of granules or microparticles consisting of an inorganic or organic compound. Among such compounds, preferred as the inorganic compound are porous oxides, inorganic halides, clay, clay minerals or ion-exchangeable lamellar compounds. The porous oxides vary in the nature and state depending on the kind and method of preparation, but the carrier which is preferably used in the invention has a particle size of from 1 to 300 μm, preferably from 3 to 200 μm, a specific surface area ranging from 50 to 1000 m$^2$/g, preferably from 100 to 800 m$^2$/g, and a pore volume ranging from 0.3 to 3.0 cm$^3$/g. Such carrier is used after being calcined at a high temperature of from 80 to 1000° C., and preferably from 100 to 800° C., if necessary. Further, if not specified otherwise, the carrier used in the below-described Examples of the invention was SiO$_2$ manufactured by Asahi Glass Co., Ltd., which has an average particle size of 12 μm, a specific surface area of 800 m$^2$/g and a pore volume of 1.0 cm$^3$/g.

The catalyst for olefin polymerization according to the invention may contain a specific organic compound component (D) as described later, if necessary, together with the bridged metallocene compound (A), at least one compound (B) selected from (B-1) an organic metal compound, (B-2) an organic aluminum oxy compound and (B-3) an ionizing ionic compound, and optionally the microparticulate carrier (C) of the invention, and if desired, a specific organic compound component (D) as described below.

* (D) Organic Compound Component

According to the invention, the organic compound component (D) is used for the purpose of improving the polymerization performance and the properties of produced polymer, if necessary. Such organic compound may be exemplified by alcohols, phenolic compounds, carboxylic acids, phosphorous compounds and sulfonic acid salts, without being limited to these.

* Polymerization

The ethylene polymer according to the invention can be obtained by homopolymerizing ethylene or copolymerizing ethylene with α-olefin having 6 to 10 carbon atoms as described above, using a catalyst for olefin polymerization as described above.

Upon polymerization, the usage and order of addition for the respective components are arbitrarily selected, but methods (P1) to (P10) such as the following may be illustrated.

(P1) A method of adding Component (A) and at least one Component (B) selected from (B-1) an organic metal compound, (B-2) an organic aluminum oxy compound and (B-3) an ionizing ionic compound (hereinafter, simply referred to as "Component (B)") to the polymerization vessel in an arbitrary order.

(P2) A method of adding a catalyst in which Component (A) has been preliminarily brought into contact with Component (B), to the polymerization vessel.

(P3) A method of adding Component (B) and a catalyst component in which Component (A) has been preliminarily brought into contact with Component (B), to the polymerization vessel in an arbitrary order. In this case, the respective Components (B) may be the same or different.

(P4) A method of adding Component (B) and a catalyst component having Component (A) supported on the microparticulate carrier (C) to the polymerization vessel in an arbitrary order.

(P5) A method of adding a catalyst having Component (A) and Component (B) supported on microparticulate carrier (C) to the polymerization vessel.

(P6) A method of adding Component (B) and a catalyst component having Component (A) and Component (B) supported on microparticulate carrier (C) to the polymerization vessel in an arbitrary order. In this case, the respective Components (B) may be the same or different.

(P7) A method of adding Component (A) and a catalyst component having Component (B) supported on microparticulate carrier (C) to the polymerization vessel in an arbitrary order.

(P8) A method of adding Component (A), Component (B) and a catalyst component having Component (B) supported on microparticulate carrier (C) to the polymerization vessel in an arbitrary order. In this case, the respective Components (B) may be the same or different.

(P9) A method of adding a catalyst component that has been formed by preliminarily contacting Component (B) with a catalyst having Component (A) and Component (B) supported on microparticulate carrier (C), to the polymerization vessel. In this case, the respective Components (B) may be the same or different.

(P10) A method of adding Component (B) and a catalyst component that has been formed by preliminarily contacting Component (B) with a catalyst having Component (A) and Component (B) supported on microparticulate carrier (C), to the polymerization vessel in an arbitrary order. In this case, the respective Components (B) may be the same or different.

With respect to each of the above-described methods (P1) to (P10), the catalyst component may have at least two or more of the respective components preliminarily brought into contact.

The above-mentioned solid catalyst component having Component (A) and Component (B) supported on microparticulate carrier (C) may be prepolymerized with an olefin. This prepolymerized solid catalyst component has a constitution in which polyolefin is usually prepolymerized in a proportion of from 0.1 to 1000 g, preferably from 0.3 to 500 g, and particularly preferably from 1 to 200 g, relative to 1 g of the solid catalyst component.

Also, for the purpose of facilitating polymerization, an antistatic agent or an anti-fouling agent may be used in combination or supported on the carrier.

Polymerization can be carried out either by liquid-phase polymerization such as solution polymerization, suspension polymerization or the like, or by gas-phase polymerization, and particularly suspension polymerization and gas-phase polymerization are preferably employed.

As for an inactive hydrocarbon medium used in liquid-phase polymerization, mention may be specifically made of aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures thereof, and the olefin itself can be also used as the solvent.

When (co)polymerization is carried out using a catalyst for olefin polymerization as described above, Component (A) is typically used in an amount of from $10^{-12}$ to $10^{-2}$ mole, and preferably from $10^{-10}$ to $10^{-3}$ mole, relative to 1 liter of the reaction volume.

Component (B-1) which is used if necessary, is used in an amount such that the molar ratio [(B-1)/M] of component (B-1) and the transition metal atom (M) in Component (A) would be typically from 0.01 to 100,000, and preferably from 0.05 to 50,000.

Component (B-2) which is used if necessary, is used in an amount such that the molar ratio [(B-2)/M] of the aluminum atom in component (B-2) and the transition metal atom (M) in Component (A) would be typically from 10 to 500,000, and preferably from 20 to 100,000.

Component (B-3) which is used if necessary, is used in an amount such that the molar ratio [(B-3)/M] of component (B-3) and the transition metal atom (M) in Component (A) would be typically from 1 to 100, and preferably from 2 to 80.

Component (D) which is used if necessary, is used in an amount such that when Component (B) is component (B-1), the molar ratio [(D)/(B-1)] would be typically from 0.01 to 10, preferably from 0.1 to 5, and when Component (B) is component (B-2), the molar ratio [(D)/(B-2)] would be typically from 0.001 to 2, and preferably from 0.005 to 1, and when Component (B) is component (B-3), the molar ratio [(D)/(B-3)] would be typically from 0.01 to 10, and preferably from 0.1 to 5.

Further, the temperature for the polymerization process using such catalyst for olefin polymerization is typically in the range of −50 to 250° C., preferably 0 to 200° C., and particularly preferably 60 to 170° C. The polymerization pressure is typically from ambient pressure to 100 kg/cm$^2$, and preferably from ambient pressure to 50 kg/cm$^2$, and the polymerization reaction can be carried out in either of the batch mode, semi-continuous mode and continuous mode. Polymerization is usually carried out in a gas phase or in a slurry phase in which polymer particles are precipitated out in a solvent. Furthermore, polymerization is carried out in two or more stages with different reaction conditions. In this case, it is preferably carried out in the batch mode. Also, in the case of slurry polymerization or gas phase polymerization, the polymerization temperature is preferably from 60 to 90° C., and more preferably from 65 to 85° C. Via polymerization within this temperature range, an ethylene polymer with narrower composition distribution can be obtained. A polymer obtained as such is in the form of a particle with a diameter of tens to thousands of μmφ. In the case of polymerization in the continuous mode in two or more polymerization vessels, there is needed an operation such as precipitation in a poor solvent after dissolution in a good solvent, sufficient melt-kneading in a specific kneader, or the like.

When the ethylene polymer according to the invention is prepared in, for example, two stages, an ethylene homopolymer having an intrinsic viscosity of 0.3 to 1.8 dl/g is prepared in the first stage, and a (co)polymer having an intrinsic viscosity of 3.0 to 10.0 dl/g is prepared in the second stage. This order may be reversed.

Since the catalyst for olefin polymerization has extremely high polymerization performance even for the α-olefin (e.g., 1-hexene) to be copolymerized with ethylene, there would be needed a devisal not to produce a copolymer with excessively high α-olefin content, after completion of predetermined polymerization. For example, mention may be made of methods such as, when the content of the polymerization vessel is withdrawn from the polymerization vessel, simultaneously or as immediately as possible, (1) separating the polymer, solvent and unreacted α-olefin with a solvent separator, (2) adding an inert gas such as nitrogen and the like to the content to discharge the solvent and unreacted α-olefin out of the system, (3) controlling the pressure applied to the content to discharge the solvent and unreacted α-olefin out of the system, (4) adding a large quantity of solvent to the content to dilute the unreacted α-olefin to a concentration at which substantially no polymerization takes place, (5) adding a substance which deactivates the catalyst for polymerization, such as methanol and the like, (6) cooling the content to a temperature at which substantially no polymerization takes place, or the like. These methods may be carried out independently or in combination of several methods.

The molecular weight of the obtained ethylene polymer can be controlled by adding hydrogen to the polymerization system or by changing the polymerization temperature. It can be also controlled by means of the difference in Components (B) used.

The polymer particles obtained by polymerization reaction may be also pelletized by the following methods:

(1) a method of mechanically blending the ethylene polymer particles with other components that are added as needed in an extruder, a kneader or the like, and cutting into predetermined sizes; and (2) a method of dissolving the ethylene polymer and other components that are added as needed in a suitable good solvent (e.g., hydrocarbon solvents such as hexane, heptane, decane, cyclohexane, benzene, toluene, xylene and the like), subsequently removing the solvent, then mechanically blending the components using an extruder, kneader or the like, and cutting into predetermined sizes.

The ethylene polymer according to the invention may be blended, as desired, with additives such as a weather-resistant stabilizer, a heat-resistant stabilizer, antistatic agent, an anti-slipping agent, an anti-blocking agent, an anti-clouding agent, a lubricant, a dye, a nucleating agent, a plasticizer, an anti-aging agent, a hydrochloric acid absorbent, an anti-oxidizing agent and the like, carbon black, titanium oxide, Titanium Yellow, phthalocyanine, isoindolinone, a quinacridone compound, a condensed azo compound, a pigment such as ultramarine blue, cobalt blue and the like without adversely affecting the purpose of the invention.

The ethylene polymer according to the invention can be molded into a blow molded product, an inflation molded product, a cast molded product, a laminated extrusion molded product, an extrusion molded product such as a pipe or other forms, an expansion molded product, an injection molded product or the like. Further, the polymer can be used in the form of a fiber, a monofilament, a non-woven fabric or the like. These products include those molded products comprising a portion consisting of an ethylene polymer and another portion consisting of another resin (laminated products, etc.). Moreover, this ethylene polymer may be used in the state of being crosslinked during molding. The ethylene polymer according to the invention gives excellent properties when used in a blow molded product and an extrusion molded product such as a pipe and various forms, among the above-mentioned molded products, thus it being desirable.

The ethylene polymer ($E_B$) for use in blow molded products according to the invention can be molded into bottles, industrial chemical canisters, gasoline tanks or the like by blow molding. Such molded products include those molded products comprising a portion consisting of ethylene polymer ($E_B$) and a portion consisting of another resin (laminated products, etc.). Further, when ethylene polymer ($E_B$) contains pigments, the concentration is typically from 0.01 to 3.00% by weight.

The ethylene polymer ($E_P$) for use in pipes according to the invention can be molded into pipes, or fittings that are molded by injection molding. Such molded products include those molded products (laminated products, etc.) comprising a portion consisting of ethylene (co)polymer and a portion consisting of another resin. Further, when ethylene polymer ($E_B$) contains pigments, the concentration is typically from 0.01 to 3.00% by weight.

Measuring Methods for Various Properties

* Preparation of Sample for Measurement

To 100 parts by weight of an ethylene polymer in the microparticulate form, 0.1 part by weight of tri(2,4-di-t-butylphenyl)phosphate as a secondary anti-oxidizing agent, 0.1 part by weight of n-octadecyl-3-(4'-hydroxy-3',5'-di-t-butylphenyl)propionate as a heat-resistant stabilizer, and 0.05 part by weight of calcium stearate as a hydrochloric acid absorbent are blended. Then, using a Labo-Plastmil (a twin screw batch-type melt-kneading apparatus) manufactured by Toyo Seiki Seisakusho, Ltd., a feed amount 40 g (unit batch volume=60 cm$^3$) of the ethylene polymer was melt-kneaded at a set temperature of 190° C. and at 50 rpm for 5 minutes or at 50 rpm for 10 minutes, then taken out to be molded into a sheet form by a cold press at 20° C., and cut into a suitable size to yield a sample for measurement. It is also possible to granulate using a conventional extruder. Yet, in the case of granulating the microparticulate ethylene polymer obtained by continuous two-stage polymerization, there would be needed a devisal such as using a twin screw extruder with long L/D in order to homogenize the polymer particles sufficiently, or the like.

* Measurement of Ethylene Content and α-olefin Content

The number of methyl branch groups per 1,000 carbons in the molecular chain of the ethylene polymer was measured by $^{13}$C-NMR. Measurement was made using a Lambda 500-type nuclear magnetic resonance unit ($^1$H: 500 MHz) manufactured by JEOL, Ltd, with an integral number of 10,000 to 30,000. Further, the peak for the main chain methylene (29.97 ppm) was used as the reference for chemical shift. A commercially available quartz glass tube for NMR measurement with a diameter of 10 mm was charged with 250 to 400 mg of the sample and 2 ml of a mixed solution of ultra pure grade o-dichlorobenzene (Wako Pure Chemicals Industry, Ltd.):benzene-d$_6$ (ISOTEC)=5:1 (volume ratio), and the content was heated at 120° C. and uniformly dispersed to a solution, which was subjected to NMR measurement. The assignment of each absorption in the NMR spectrum was based on "NMR—Introduction and Guidelines to Experimentation," Region of Chemistry, extra edition No. 141, pp. 132-133. The composition of the ethylene.α-olefin copolymer is determined typically by preparing a sample having 250 to 400 mg of the copolymer uniformly dissolved in 2 ml of hexachlorobutadiene in a test tube of 10 mmφ, and measuring the $^{13}$C-NMR spectrum of the sample under the measurement conditions such as measurement temperature of 120° C., measurement frequency of 125.7 MHz, spectrum width of 250,000 Hz, pulse repetition time of 4.5 seconds and 45° pulse.

* Cross Fractionation Chromatography (CFC)

The following measurement was made using a CFC T-150A type manufactured by Mitsubishi Chemical Co., Ltd. The separation column consisted of three Shodex AT-806 MS, the eluent was o-dichlorobenzene, the sample concentration was 0.1 to 0.3 wt/vol %, the feed amount was 0.5 ml, and the flow rate was 1.0 ml/min. The sample was heated at 145° C. for 2 hours, subsequently cooled to 0° C. at a rate of 10° C./hr and further maintained at 0° C. for 60 min to coat the sample. The capacity of the temperature rising elution column was 0.86 ml, and the line capacity was 0.06 ml. As for the detector, an infrared spectrometer MIRAN 1A CVF type (CaF$_2$ cell) manufactured by FOXBORO, Inc. set in the absorbance mode with a response time of 10 seconds, was used to detect an infrared ray of 3.42 μm (2924 cm$^{-1}$). The elution temperature was such that the range of 0° C. to 145° C. was divided into 35 to 55 fractions, and particularly in the vicinity of an elution peak, the temperature was divided into fractions corresponding to 1° C. each. The indication of the temperature is all in integers, and for example, an elution fraction at 90° C. indicates a component eluted at 89° C. to 90° C. The molecular weights of the components not coated even at 0° C. and the fraction eluted at each temperature were measured, which were converted to the molecular weights in terms of PE using a standard calibration curve. The SEC temperature was 145° C., the amount of introduction to the inner mark was 0.5 ml, the position of introduction was at 3.0 ml, and the data sampling time interval was 0.50 second. Furthermore, when there occurred pressure abnormality due to the presence of too many eluted components within a narrow temperature range, the sample concentration would be set to less than 0.1 wt/vol %. Data processing was carried out by means of an analysis program attached to the apparatus, "CFC Data Processing (version 1.50)." In addition, although cross fractionation chromatography (CFC) per se is said to be an analytic method of reproducing the results with high analytic precision as the conditions for measurement are strictly maintained constant, it is preferable to perform several measurements and to take the average.

* Weight Average Molecular Weight (Mw), Number Average Molecular Weight (Mn) and Molecular Weight Curve Measurement was carried out as follows using a GPC-150C manufactured by Waters Corp. The separating columns used were TSKgel GMH6-HT and TSKgel GMH6-HTL, the column size was each an inner diameter of 7.5 mm and a length of 600 mm, the column temperature was 140° C., the mobile phase was o-dichlorobenzene (Wako Pure Chemicals Industry, Ltd.) containing 0.025% by weight of BHT (Takeda Pharmaceutical Co., Ltd.) as the anti-oxidizing agent, at a flow rate of 1.0 ml/min, the sample concentration was 0.1% by weight, the amount of sample introduced was 500 µl, and the detector used was a differential refractometer. For the standard polystyrene, a product by Tosoh Corporation was used for the molecular weight of $Mw<1,000$ and $Mw>4\times10^6$, and a product by Pressure Chemical Co. for the molecular weight of $1,000 \leq Mw \leq 4\times10^6$. The molecular weight was a value determined in terms of polyethylene by means of universal calibration.

* Division of the Molecular Weight Curve

Figure 28:
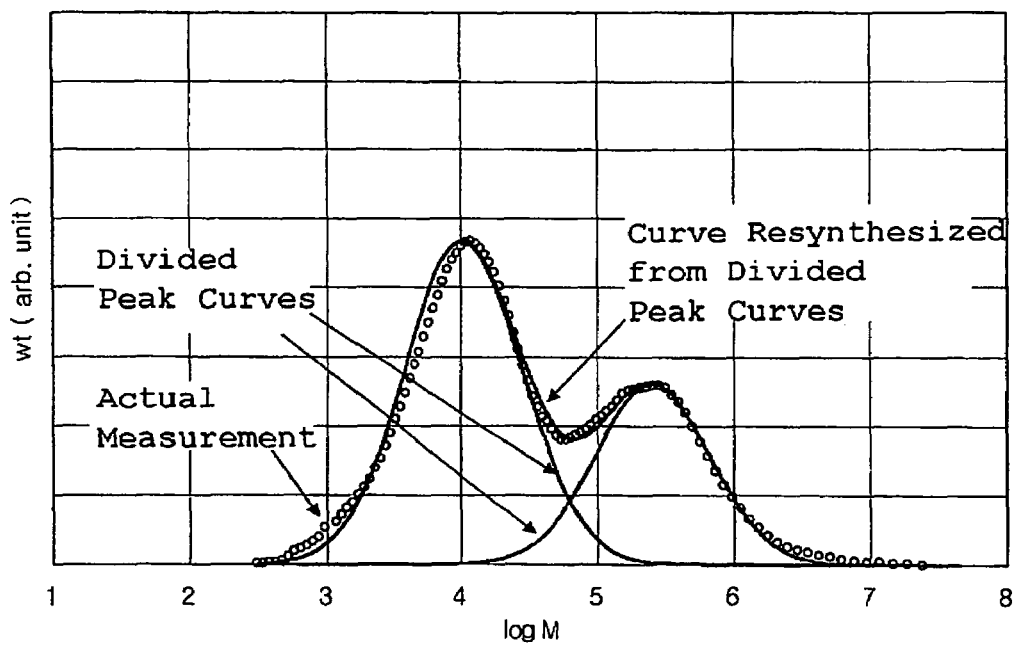
FIG. 28 is a GPC chart illustrating an example of the analysis of GPC separation.

A computational program was created using the Visual Basic macros of Excel® 97 manufactured by Microsoft Corp. The two curves to be divided indicated logarithmic normal distribution, and the molecular weight distribution curve was divided into two curves with different molecular weights by convergent calculation. While comparing the curve resynthesized from the divided two curves with the molecular weight curve obtained by actual GPC measurement, calculation was performed by changing the initial values in order for the two curves to closely match with each other. Calculation was performed by partitioning the value of Log(molecular weight) into an interval of 0.02. The intensities were normalized so that the area under the molecular weight curve actually measured and the area under the curve resynthesized from the two divided curves become unity, respectively, and the calculation for curve division was repeated until the value obtained by dividing the absolute value of the difference between the intensity (height) of the actual measurement and the intensity (height) of the resynthesized curve for each molecular weight by the absolute value of the intensity (height), became 0.4 or less, preferably 0.2 or less, and more preferably 0.1 or less, for the molecular weight ranging from 10,000 to 1,000,000, and also 0.2 or less, and preferably 0.1 or less, at the maximum site of the peak divided into two. Here, the difference between the ratio Mw/Mn of the peak assigned to the lower molecular weight and the ratio Mw/Mn of the peak assigned to the higher molecular weight should be 1.5 or less. An exemplary calculation is shown in FIG. 28.

* Smoothness Coefficient R

The resin is extruded using a Capillograph 1B, a capillary flow characteristics testing machine manufactured by Toyo Seiki Co., Ltd., at a resin temperature of 200° C. and a flow rate of 50 mm/min (3.6 cm³/min). The machine is equipped with a nozzle having a length L=60 mm and a diameter D=1 mm, or with a cylindrical die (outer diameter=4 mmφ, slit=1 mm, length=10 mm) which can extrude a tube-shaped product, instead of a capillary die. The polymer product may be pelletized, and if the polymer particles polymerized in the gas phase or in the slurry phase are not sufficiently intermixed, there would be skin roughness on the surface of the melt extruded product. The exterior of thus obtained strand or tube is taken as the surface for measurement in measuring the surface roughness. A Surfcom 1400D manufactured by Tokyo Seimitsu Co., Ltd. was used for the measurement. The roughness as the average of 10 points calculated according to the calculation standard JIS B0601-1982 under the following conditions: measured length=10 mm, measurement rate 0.06 mm/sec, sampling time=0.01 sec, sampling pitch=0.6 µm, material of the measuring needle=diamond, and tip of the measuring needle=5 µmφ, is referred to as Rz. Rz is the value of the difference between the average value of the peak heights of the highest to the fifth highest peaks and the average value of the valley heights of the deepest to the fifth deepest valleys, with respect to the average line of a measured length of 10 mm. Measurement is performed three times at different sites, and the average value is taken as the dispersion coefficient R. Here, a standard deviation of the Rz values obtained from three measurements was determined. When the standard deviation value is larger than one half of the R value which is the average of Rz values measured three times, measurement is carried out again. When R exceeds 20 µm, the polymer particles do not intermix sufficiently. As a result, even when a thick molded product such as pipe or blow bottle is formed, the flow becomes poor, resulting in not smooth surface skin, or stress concentration between polymer particles may lead to insufficient expression of the mechanical strength. Meanwhile, when R is 20 µm or less, it can be viewed that the history of polymer particles does not remain behind.

* Measurement of a Crystalline Structure Continuous Over More than 10 µm

A pressed sheet with a thickness of 0.5 mm was prepared by melting an ethylene polymer at 190° C., molding it into a sheet form at a pressure of 10 MPa, and compressing into a sheet by a cold press set at 20° C. using a hydraulic press molding machine manufactured by Shinto Metal Industries, Ltd. Then, the sheet was cut into a size of approximately 0.5 mm (thickness of pressed sheet)×10 to 20 µm using a Microtome or the like. After then, a small amount of glycerin was applied onto the cut specimen, and the specimen was then adhered to a preparation glass with a cover glass placed thereon to provide a sample for observation. This sample was loaded on the polarized plate of a cross Nicol prism and observed with an optical microscope at about 75 magnifications and about 150 magnifications. FIGS. 29 and 30 illustrate examples of the case where crystalline structure is observed only in parts of the visual field, indicating that a crystalline structure continuous over more than 10 µm is absent, and examples of the case where the crystalline structure is observed over the entire visual field, indicating that a crystalline structure continuous over more than 10 µm is present. Here, the scale bar indicates that the whole length corresponds to 0.5 mm.

* Measurement of Methyl Branch Group

The number of methyl branch groups per 1,000 carbon atoms in the polyethylene molecular chain was measured by $^{13}$C—NMR. Measurement was carried out using an EPC500 type nuclear magnetic resonance unit ($^{1}$H: 500 MHz) manufactured by JEOL, Ltd. with an integral number of 10,000 to 30,000. Further, the peak for the main chain methylene (29.97 ppm) was used as the reference for chemical shift. A commercially available quartz glass tube for NMR measurement with a diameter of 10 mm was charged with 250 to 400 mg of the sample and 3 ml of a mixed solution of ultra pure grade o-dichlorobenzene (Wako Pure Chemicals Industry, Ltd.): benzene-$d_6$ (ISOTEC)=5:1 (volume ratio), and the content was heated at 120° C. and uniformly dispersed to a solution which was then subjected to measurement. The assignment of each absorption in the NMR spectrum was based on "NMR—Introduction and Guidelines to Experimentation [I]," Region of Chemistry, extra edition No. 141, pp. 132-133. The number of methyl branch groups per 1,000 carbon atoms was calculated from the ratio of the integrated strength of the absorption of the methyl group derived from a methyl branch group (19.9 ppm) to the integral sum of the absorption appearing in the region of 5 to 45 ppm. When the number of methyl branch groups per 1,000 carbon atoms is less than 0.08, the number is below the detection limit and is not detectable.

* Intrinsic Viscosity ([η])

This is a value measured at 135° C. using decalin as the solvent. That is, about 20 mg of granulated pellets is dissolved in 15 ml of decalin, and the specific viscosity $\eta_{sp}$ is measured in an oil bath at 135° C. This decalin solution is diluted by further adding 5 ml of the decalin solvent, and then the specific viscosity $\eta_{sp}$ is measured in the same manner. This dilution procedure is further repeated two times to determine the value of $\eta_{sp}/C$ as the intrinsic viscosity (see the following formula), with the concentration (C) being extrapolated to zero.

$$[\eta]=lim(\eta_{sp}/C) \ (C \rightarrow 0)$$

* Density (d)

A specimen for measurement was prepared by molding a sheet having a thickness of 0.5 mm (spacer-shaped; 9 sheets of 45×45×0.5 mm obtained from a sheet of 240×240×0.5 mm) under a pressure of 100 kg/cm² using a hydraulic thermal press machine manufactured by Shinto Metal Industries, Ltd. set at 190° C., and cooling the obtained sheet via compressing it under a pressure of 100 kg/cm² using another hydraulic thermal press machine manufactured by Shinto Metal Industries, Ltd. set at 20° C. The heating plate used was a SUS plate with a thickness of 5 mm. This pressed sheet was subjected to heat treatment at 120° C. for one hour and gradual cooling to room temperature linearly over 1 hour, and then the density was measured using a density gradient column.

* Solubility in Decane

Measurement of the gel content is performed according to JIS K 6796, except that the solvent used is decane maintained at 140° C., the sample is either specimens cut from the 0.5 mm-thick pressed sheet or granulated pellets, and the concentration set to 1 mg/ml. The sample is referred to be soluble in decane at 140° C. when the proportion of gel is 1% by weight or less.

* Environmental Stress Crack Resistance Test for Pressed Sheet: ESCR (hr)

A specimen for measurement was prepared by molding a sheet having a thickness of 2 mm (spacer-shaped; 4 sheets of 80×80×2 mm from a sheet of 240×240×2 mm) under a pressure of 100 kg/cm² using a hydraulic thermal press machine manufactured by Shinto Metal Industries, Ltd. set at 190° C., and cooling the obtained sheet via compressing it under a pressure of 100 kg/cm² using another hydraulic thermal press machine manufactured by Shinto Metal Industries, Ltd. set at 20° C. The heating plate used was a SUS plate with a thickness of 5 mm. From the above pressed sheet of 80×80×2 mm, a dumbbell-shaped specimen with a size of 13 mm×38 mm was punched out to provide a sample for evaluation.

The test for the property of environmental stress crack resistance ESCR was performed according to ASTM D1693. The conditions for evaluation (bent strip method) are summarized in the following:

Shape of sample: Press molding method C

Specimen: 38×13 mm, Thickness: 2 mm (HDPE)

Notch length: 19 mm, Depth: 0.35 mm

Testing temperature: 50° C., constant temperature water bath: capable of controlling at 50.0±0.5° C.

Storage of sample: The sample is set using a clinching device exclusively used for a specimen holder with an inner dimension of 11.75 mm and a length of 165 mm.

Surfactant: Nonylphenyl polyoxyethylene ethanol (commercially available under the product name of Antarox CO-630) is diluted with water to a concentration of 10% for use.

Method of evaluation: time to fracture F50 (time to 50% fracture) is determined using logarithmic probability paper.

* Flexural Modulus of Pressed Sheet

From a pressed sheet having a size of 80×80×2 mm, a specimen for measurement of the ESCR property with a width of 12.7 mm and a length of 63.5 mm was punched out, and the flexural modulus was measured according to ASTM D-790 under the conditions of testing temperature of 23° C., bending rate of 5.0 mm/min and bending span distance of 32.0 mm.

* tan δ (=Loss Modulus G"/Storage Modulus G')

Detailed information on tan δ is described in, for example, "Lecture on Rheology", by Japan Society of Rheology, Kobunshi Kankokai, pp. 20-23. The measurement was carried out by measuring the angular frequency (ω (rad/sec)) dispersion of the storage modulus G'(Pa) and the loss modulus G"(Pa) using a rheometer RDS-II manufactured by Rheometrics, Inc. The sample holder used was a pair of parallel plates with 25 mmφ, and the sample thickness was about 2 mm. Under the measuring temperature of 190° C., G' and G" were measured within the range of $0.04 \leq \omega \leq 400$. The measurement was obtained at five points per one digit of ω. The amount of strain was suitably selected within the range of 2 to 25%, under the conditions that the torque is detectable within the range for measurement, and no torque-over occurs.

* Preparation of Bottle for the Measurement of Buckling Strength and Environmental Stress Crack Resistance ESCR Property and the Observation of Pinch-Off Property of Bottle Using an extrusion blow molding machine (model: 3B 50-40-40) manufactured by Placo Co., Ltd., blow molding was carried out under the following conditions: set temperature: 180° C., die diameter: 23 mmφ, core diameter: 21 mmφ, amount extruded: 12 kg/hr, mold temperature: 25° C., rate of forming: 1.4 sec, forming pressure: 5.5 t, and blow air pressure: 5 kg/cm². Thus, a cylindrical bottle having a capacity of 1,000 cc and a net weight of 50 g was obtained.

* Buckling Strength of Bottle

Thus prepared bottle was subjected to measurement of the buckling strength of bottle under the condition of a crosshead speed of 20 mm/min in a universal testing machine manufactured by Instron, Inc.

* Environmental Stress Crack Resistance (ESCR) Property of Bottle

The bottle prepared as in the above was charged with 100 cc of Kitchen Hiter manufactured by Kao Corp., and then was sealed at the opening resin. The bottle and the content were maintained in an oven at 65° C. to observe the time to fracture. Thus, the time to fracture F50 was determined using logarithmic probability paper.

* Pinch-Off Property of Bottle (Measurement of the Thickness Ratio of Pinched Part)

Figure 31:
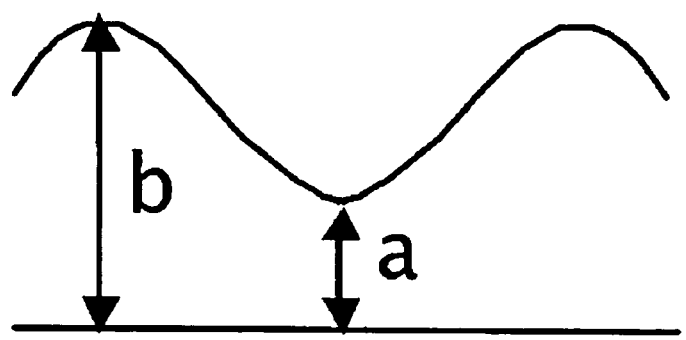
FIG. 31 is a schematic diagram of the pinch-off part.

When the bottom of the bottle obtained by blow molding as in the above was cut in the direction perpendicular to the matching surface of the mold, the thickness ratio of the pinched part is represented by (a/b), wherein a represents the thickness at the central part of the bottle, and b represents the thickness at the thickest part. As this value is larger, the state of pinching is good (see FIG. 31).

* Tensile Fatigue Strength at 80° C.

A specimen for the measurement of tensile fatigue strength at 80° C. was prepared by molding a 2 mm-thick sheet and a 6 mm-thick sheet (spacer-shaped: 4 specimens of a size of 80×80×2 mm obtained from a sheet of a size of 240×240×2 mm, and 4 specimens of a size of 30×60×6 mm obtained from a sheet of a size of 200×200×6 mm) at a pressure of 100 kg/cm² using a hydraulic thermal press machine manufactured by Shinto Metal Industries, Ltd. set at 190° C., and by cooling the sheets via compressing under a pressure of 100 kg/cm² using another hydraulic thermal press machine manufactured by Shinto Metal Industries, Ltd. set at 20° C. From the pressed sheet having a size of 30×60×6 mm, a rectangular column with a size of length 5 to 6 mm×width 6 mm×height 60 mm was cut out for use as a specimen for the evaluation of actual measurement.

The tensile fatigue strength (specimen form) was measured according to JIS K-6774 using a Servo-Pulser of the EHF-ER1KN×4-40L type manufactured by Shimazu Seisakusho, Ltd. (Full-notch type, notch depth=1 mm). Summary of the evaluation conditions are as follows: several points were measured under the conditions of specimen form: 5-6×6×60 mm, notched rectangular column; waveform and frequency for testing: rectangular wave, 0.5 Hz; temperature for testing: 80° C.; and actual stress in the range of 10 to 18 MPa. The oscillation frequency upon fracture of the specimen was taken as the fatigue strength. Further, at least three points of different actual stress values were measured, for a three or more digit number of cycles to fracture, or under an actual stress in the range of 3 MPa or greater, in order to provide an approximation formula by means of the least square method with logarithmic approximation. Thus, the actual stress values with the numbers of cycles to fracture corresponding to 10,000 cycles and 100,000 cycles were determined.

* Tensile Fatigue Strength at 23° C.

Figure 32:
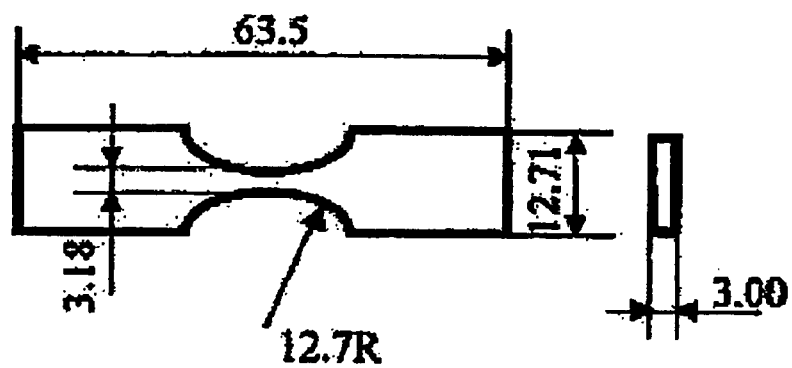
FIG. 32 shows a specimen for the tensile fatigue test at 23° C.

A 3 mm-thick dumbbell (ASTM-D-1822 Type S) as shown in FIG. 32 was prepared by molding (spacer-shaped: the form of ASTM-D-1822 Type S was provided from the sheet having a size of 240×240×3 mm) under a pressure of 100 kg/cm² using a hydraulic thermal press machine manufactured Shinto Metal Industries, Ltd. set at 190° C., and cooling it via compressing under a pressure of 100 kg/cm² using a hydraulic thermal press machine manufactured by Shinto Metal Industries, Ltd. set at 20° C. The specimen taken out from the spacer was used as the evaluation sample for actual measurement.

The tensile fatigue strength at 23° C. was measured according to JIS K-7118 using a Servo-Pulser of the EHF-FG10KN-4 LA type manufactured by Shimazu Seisakusho, Ltd.

Summary of the evaluation conditions are presented below.

Specimen shape: ASTM-D-1822 Type S (Dumbbell as described in FIG. 32, no notches)

Waveform and frequency or testing: sinusoidal wave 4 Hz

Temperature for testing: 23° C.

The tensile fatigue strength test was carried out by measuring at several points under the above-mentioned conditions (testing temperature, waveform and frequency for testing), further with a constant minimum load of the load cell of 4.9 N (0.5 kgf) and an actual stress with the maximum corrected at the central cross-section of the specimen prior to testing, in the range of 17 to 25 MPa. A 50% elongation of the specimen was defined as fracture, and the oscillation frequency at this occasion was taken as the fatigue strength for the actual stress loaded. The actual stress corresponding to 10,000 cycles to fracture was determined by performing measurement for at least one digit number of cycles to fracture or to obtain an actual stress in the range of 1 MPa or greater, and providing an approximation formula by means of the least square method with logarithmic approximation.

BEST MODE FOR CARRYING OUT THE INVENTION

Hereinafter, the invention will be explained more specifically with reference to Examples, which are not intended to limit the invention.

Synthetic Example 1

[Preparation of Solid Catalyst Component (α)]

A suspension was prepared from 8.5 kg of silica dried at 200° C. for 3 hours and 33 liters of toluene, and then 82.7 liters of a methylaluminoxane solution (Al=1.42 mol/liter) was added dropwise over 30 minutes. Then, the temperature of the mixture was elevated to 115° C. over 1.5 hours, and the mixture was allowed to react at that temperature for 4 hours. Subsequently, the reaction mixture was cooled to 60° C., and the supernatant liquid was removed by decantation. Thus obtained solid catalyst component was washed with toluene three times and resuspended in toluene to yield a solid catalyst component (α) (total volume 150 liters).

[Preparation of Supported Catalyst]

In a two-necked 100 ml-flask which had been sufficiently purged with nitrogen, 20.39 mmol (in terms of aluminum) of the solid catalyst component (α) suspended in 20 ml of toluene was added, and under stirring, 45.2 ml (0.09 mmol) of a toluene solution of diphenylmethylene(cyclopentadienyl)(2,7-di-t-butylfluorenyl)zirconium dichloride at a concentration of 2 mmol/liter was added to the suspension at room temperature (23° C.), the resulting mixture being stirred for another 60 minutes. After stirring being stopped, the supernatant liquid was removed by decantation, the mixture was washed with 50 ml of n-decane for four times, and thus obtained supported catalyst was reslurried in 100 ml of n-decane to yield a solid catalyst component (β) as a catalyst suspension.

Example 1

[Polymerization]

A 1000 ml-autoclave which had been sufficiently purged with nitrogen was charged with 500 ml of n-heptane, and 0.25 ml (0.25 mmol) of triisobutylaluminum at a concentration of 1 mol/liter and 3.85 ml of the solid catalyst component (β) obtained in Synthetic Example 1 (corresponding to 0.003 mmol in terms of Zr atoms) were introduced. The autoclave was pressurized with an ethylene.hydrogen mix gas having a hydrogen content of 2.53 vol % to a pressure of 8.0 kg/cm² G, and polymerization was initiated at 80° C. The ethylene.hydrogen mix gas was added during polymerization to maintain at 8.0 kg/cm² G, and polymerization was carried out for 70 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 2.7 ml of 1-hexene were introduced, the autoclave was pressurized with an ethylene.hydrogen mix gas with a hydrogen content of 0.10 vol % to a pressure of 8.0 kg/cm² G, and polymerization was re-initiated at 80° C. The ethylene.hydrogen mix gas was added during polymerization to maintain at 8.0 kg/cm² G, and polymerization was carried out for 20.5 minutes. After completion of polymerization, pressure was removed, and the catalyst was deactivated by addition of methanol. The resulting polymer was filtered, washed and dried under vacuum at 80° C. for 12 hours to give 84.50 g of the polymer.

Figure 4:
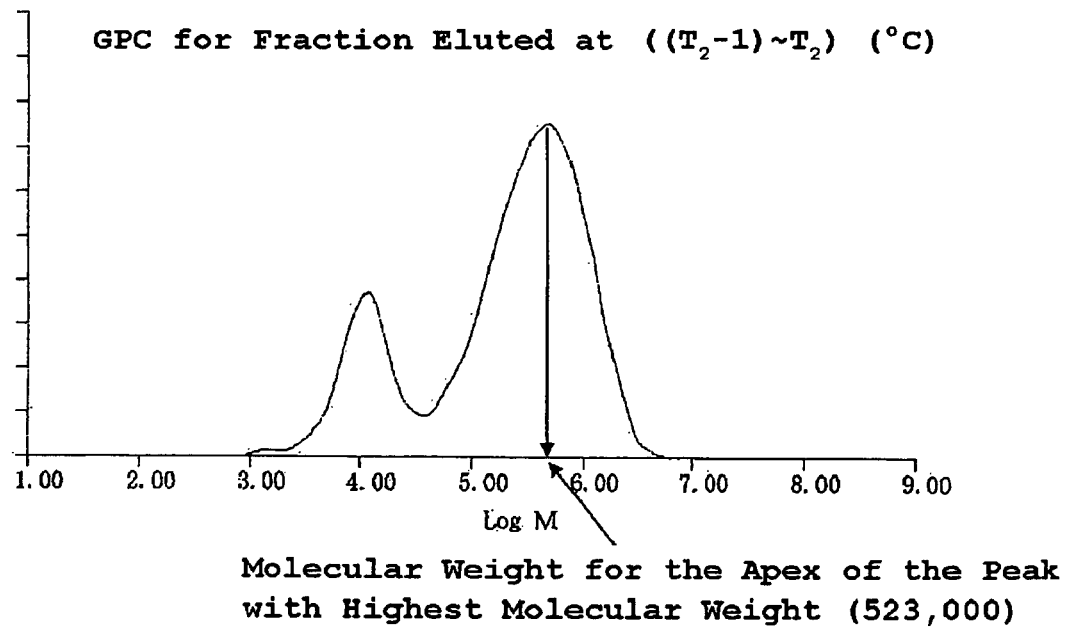
FIG. 4 is a GPC curve for the eluted components of the ethylene polymer obtained in Example 1, at peak temperatures [($T_2$–1) to $T_2$] (° C.).
Figure 5:
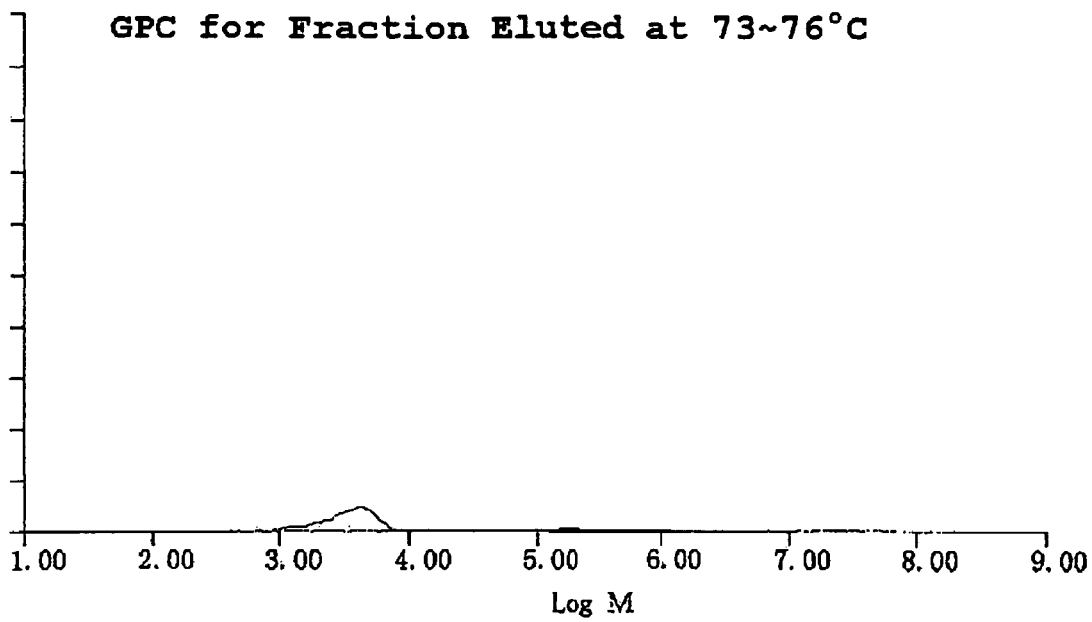
FIG. 5 is a GPC curve for the components of the ethylene polymer obtained in Example 1, which are eluted at 73 to 76 (° C.).
Figure 6:
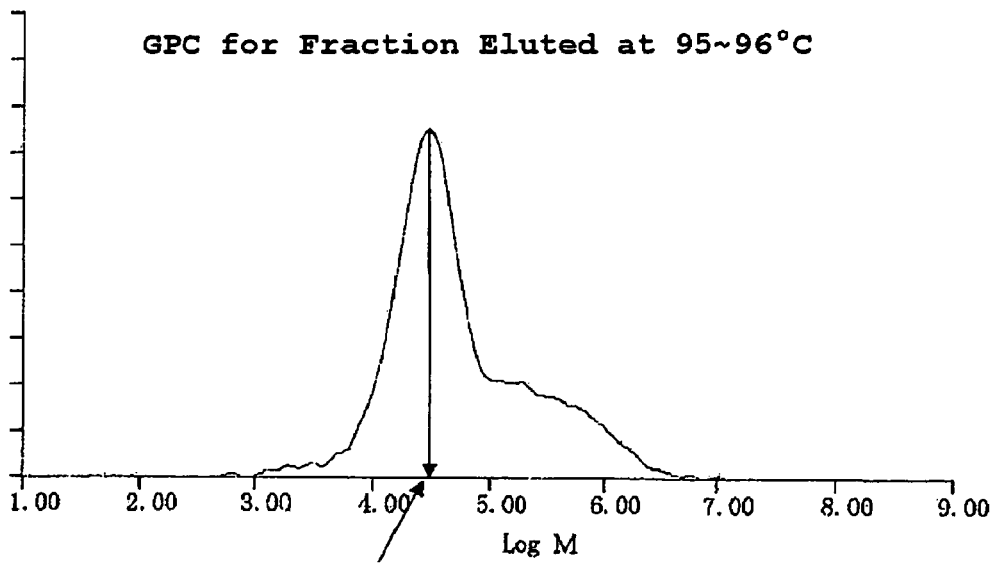
FIG. 6 is a GPC curve for the components of the ethylene polymer obtained in Example 1, which are eluted at 95 to 96 (° C.).

With respect to 100 parts by weight of this polymer particle, 0.1 part by weight of tri(2,4-di-t-butylphenyl) phosphate as a secondary anti-oxidizing agent, 0.1 part by weight of n-octadecyl-3-(4'-hydroxy-3',5'-di-t-butylphenyl) propionate as a heat-resistant stabilizer, and 0.05 part by weight of calcium stearate as a hydrochloric acid absorbent were mixed. Thereafter, using a Labo-Plastmil (batch-type twin screw melt-kneading apparatus) manufactured by Toyo Seiki Co., Ltd. set at 190° C., the resin in a feed amount of 40 g (apparatus batch volume=60 cm$^3$) was melt-kneaded at 50 rpm for 5 minutes, taken out of the apparatus, compressed into a sheet by a cold press set at 20° C., and cut into a suitable size to provide a sample for measurement. The results are presented in Tables 1 to 3 and Table 6. A contour diagram from cross fractionation chromatography (CFC) is given in FIG. 1; a three-dimensional chart (bird's eye view) viewed from the lower temperature side is given in FIG. 2; a three-dimensional chart (bird's eye view) viewed from the higher temperature side is given in FIG. 3; a GPC curve for the component eluted at peak temperature ($T_2$) (° C.) is given in FIG. 4; a GPC curve for the components eluted at 73 to 76 (° C.) is given in FIG. 5; and a GPC curve for the components eluted at 95 to 96 (° C.) is given in FIG. 6. In the polarized microscopic observation, no crystalline structure continuous over more than 10 μm is present. Further, it is found that this sample has extremely high tensile fatigue strength at 80° C. as compared with the samples used in the Comparative Examples (see FIG. 33).

Example 2

[Polymerization]

A 1000 ml-autoclave which had been sufficiently purged with nitrogen was charged with 500 ml of n-heptane, and 0.25 ml (0.25 mmol) of triisobutylaluminum at a concentration of 1 mol/liter and 3.90 ml of the solid catalyst component (β) obtained in Synthetic Example 1 (corresponding to 0.00304 mmol in terms of Zr atoms) were introduced. The autoclave was pressurized with an ethylene.hydrogen mix gas having a hydrogen content of 2.53 vol % to a pressure of 8.0 kg/cm$^2$ G, and polymerization was initiated at 80° C. The ethylene.hydrogen mix gas was added during polymerization to maintain at 8.0 kg/cm$^2$ G, and polymerization was carried out for 63 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 2.7 ml of 1-hexene were introduced, the autoclave was pressurized with an ethylene.hydrogen mix gas with a hydrogen content of 0.15 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 20.5 minutes. After completion of polymerization, pressure was removed, and the catalyst was deactivated by addition of methanol. The resulting polymer was filtered, washed and dried under vacuum at 80° C. for 12 hours to give 84.50 g of the polymer.

With respect to 100 parts by weight of this polymer particle, the same secondary anti-oxidizing agent, heat-resistant stabilizer, and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as used in Example 1, taken out of the apparatus, compressed into a sheet by a cold press set at 20° C., and cut into a suitable size to provide a sample for measurement. Also, this sample was used to prepare a pressed sheet, and properties thereof were measured. The results are presented in Tables 1 to 3 and Table 6. In the polarized microscopic observation, no crystalline structure continuous over more than 10 μm is present. Further, it is found that this sample has extremely high tensile fatigue strength at 80° C. as compared with the samples used in the Comparative Examples (see FIG. 33).

Synthetic Example 2

[Preparation of Supported Catalyst]

In a reactor which had been sufficiently purged with nitrogen, 19.60 mmol (in terms of aluminum) of the solid catalyst component (α) synthesized in Synthetic Example 1 and suspended in toluene was added, and under stirring, 2 liters (74.76 mmol) of a solution of diphenylmethylene(cyclopentadienyl)(2,7-di-t-butylfluorenyl)zirconium dichloride at a concentration of 37.38 mmol/liter was added to the suspension at room temperature (20 to 25° C.), the resulting mixture being stirred for another 60 minutes. After stirring being stopped, the supernatant liquid was removed by decantation, the mixture was washed with 40 liters of n-hexane for two times, and thus obtained supported catalyst was reslurried in 25 liters of n-hexane to yield a solid catalyst component (γ) as a catalyst suspension.

[Preparation of Solid Catalyst Component (δ) by Prepolymerization of Solid Catalyst Component (γ)]

To a reactor equipped with a stirrer, 15.8 liters of purified n-hexane and the above-mentioned solid catalyst component (γ) were introduced under a nitrogen atmosphere, then 5 mol of triisobutylaluminum was added under stirring, and prepolymerization was carried out with ethylene in an amount such that 3 g of polyethylene is produced per gram of the solid component in 4 hours. The polymerization temperature was maintained at 20 to 25° C. After completion of polymerization, stirring was stopped, the supernatant liquid was removed by decantation, the solids were washed with 35 liters of n-hexane for 4 times, and thus obtained supported catalyst was suspended in 20 liters of n-hexane to give a solid catalyst component (δ) as a catalyst suspension.

Comparative Example 1

[Polymerization]

To a first polymerization bath, the following components were continuously supplied: 50 liters/hr of hexane, 0.15 mmol/hr (in terms of Zr atoms) of the solid catalyst component (δ) obtained in Synthetic Example 2, 20 mmol/hr of triethylaluminum, 5.0 kg/hr of ethylene, and 65 N-liters/hr of hydrogen. Meanwhile, polymerization was carried out under the conditions such as polymerization temperature of 85° C., reaction pressure of 8.5 kg/cm$^2$ G and average residence time of 2.5 hr, while continuously withdrawing the content of the polymerization bath so that the liquid level in the polymerization bath would be maintained constant. The content continuously withdrawn from the first polymerization bath was subjected to substantial removal of unreacted ethylene and hydrogen in a flash drum maintained at an internal pressure of 0.2 kg/cm$^2$ G and at 65° C.

Then, the content was continuously supplied to a second polymerization bath, together with 20 liters/hr of hexane, 4.0 kg/hr of ethylene, 0.2 N-liter/hr of hydrogen and 450 g/hr of 1-hexene, and polymerization was continued under the conditions such as polymerization temperature of 70° C., reaction pressure of 7 kg/cm² G and average residence time of 1.5 hr.

Also for the second polymerization bath, the content of the polymerization bath was continuously withdrawn so that the liquid level in the polymerization bath would be maintained constant. The content was subjected to removal of hexane and unreacted monomer by a solvent separation unit, and dried to give the polymer. Further, in this Comparative Example 1, supply of methanol to the content as described in Example 3 as described later was not done.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 60 g/min and at 100 rpm using a 20 mmφ single screw extruder (L/D=28, full flight screw, compression ratio=3, mesh 60/100/60) manufactured by Thermoplastics Inc., set at 230° C. Further, a pressed sheet was prepared using this sample to measure the properties. The results are presented in Tables 1 to 3 and Table 6. In the polarized microscopic observation, no crystalline structure continuous over more than 10 μm is present.

Figure 7:
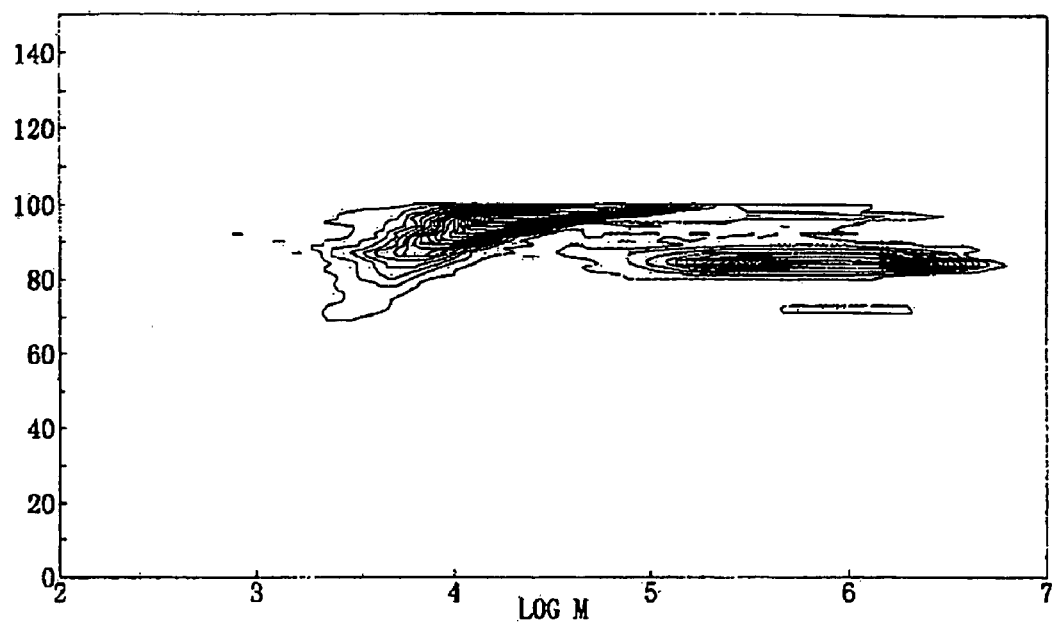
FIG. 7 is a CFC contour diagram for the ethylene polymer obtained in Comparative Example 1.
Figure 8:
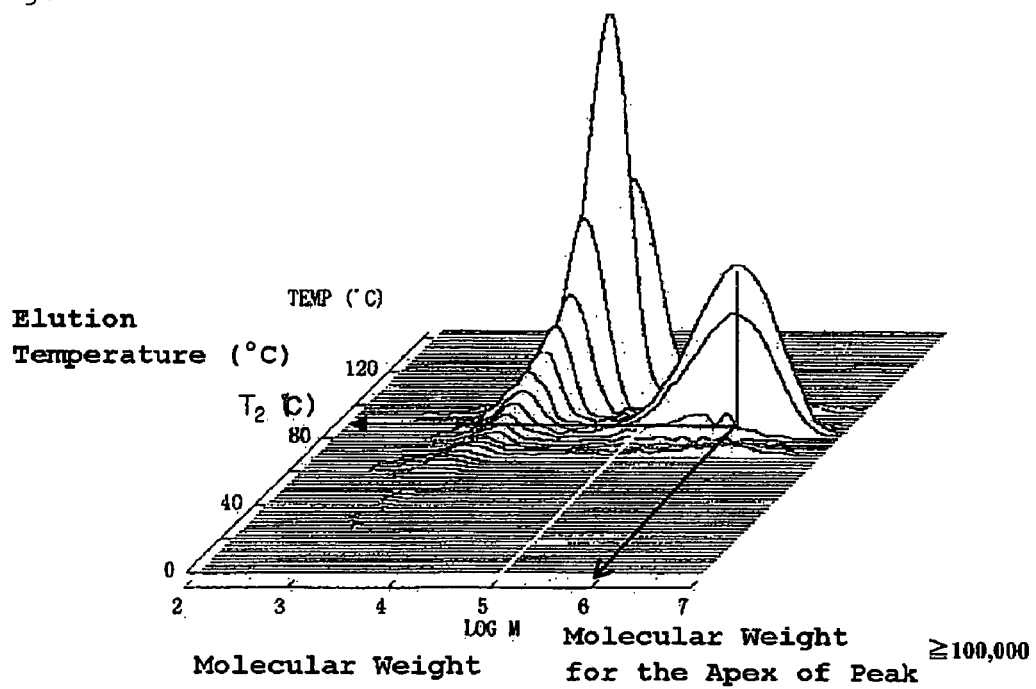
FIG. 8 is a three-dimensional GPC chart (bird's eye view) with $T_2$, as viewed from the lower temperature side, for the ethylene polymer obtained in Comparative Example 1.
Figure 9:
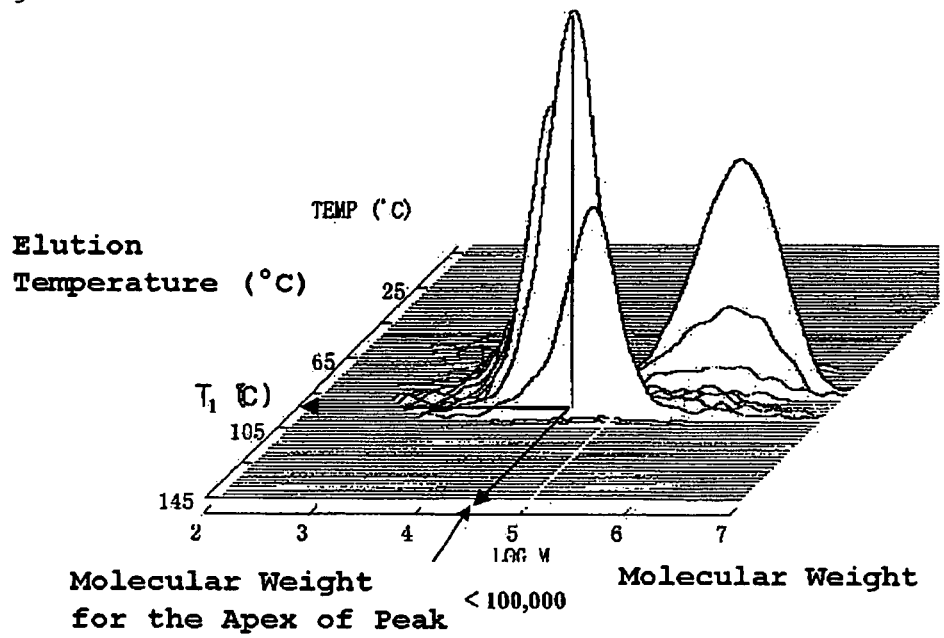
FIG. 9 is a three-dimensional GPC chart (bird's eye view) with $T_1$, as viewed from the higher temperature side, for the ethylene polymer obtained in Comparative Example 1.
Figure 10:
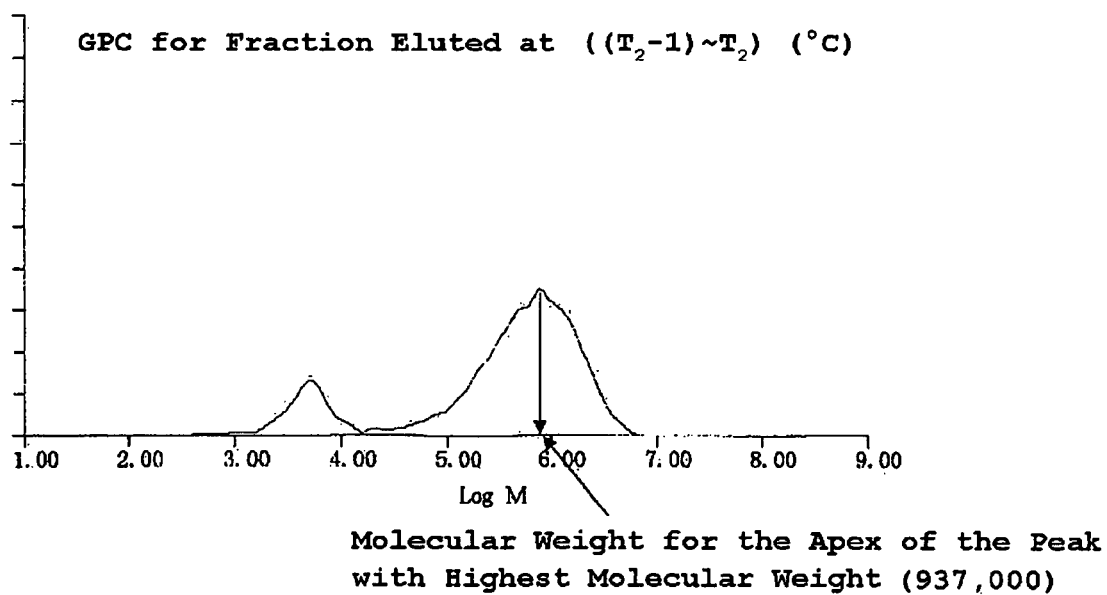
FIG. 10 is a GPC curve for the eluted components of the ethylene polymer obtained in Comparative Example 1, at peak temperatures [$(T_2-1)$ to $T_2$] (° C.).
Figure 11:
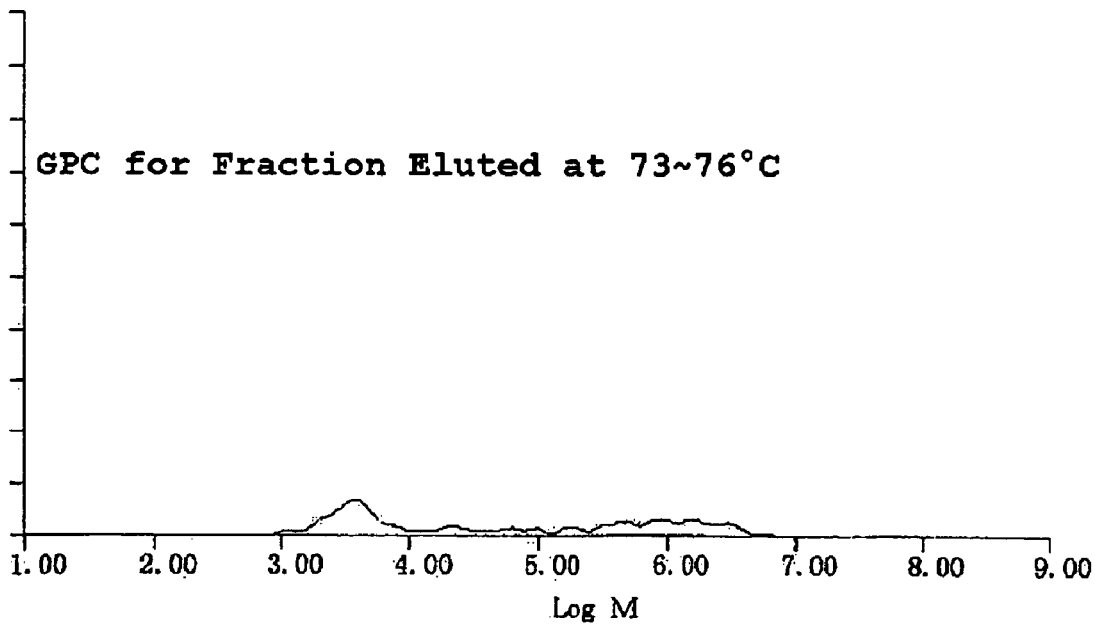
FIG. 11 is a GPC curve for the components of the ethylene polymer obtained in Comparative Example 1, which are eluted at 73 to 76 (° C.).
Figure 12:
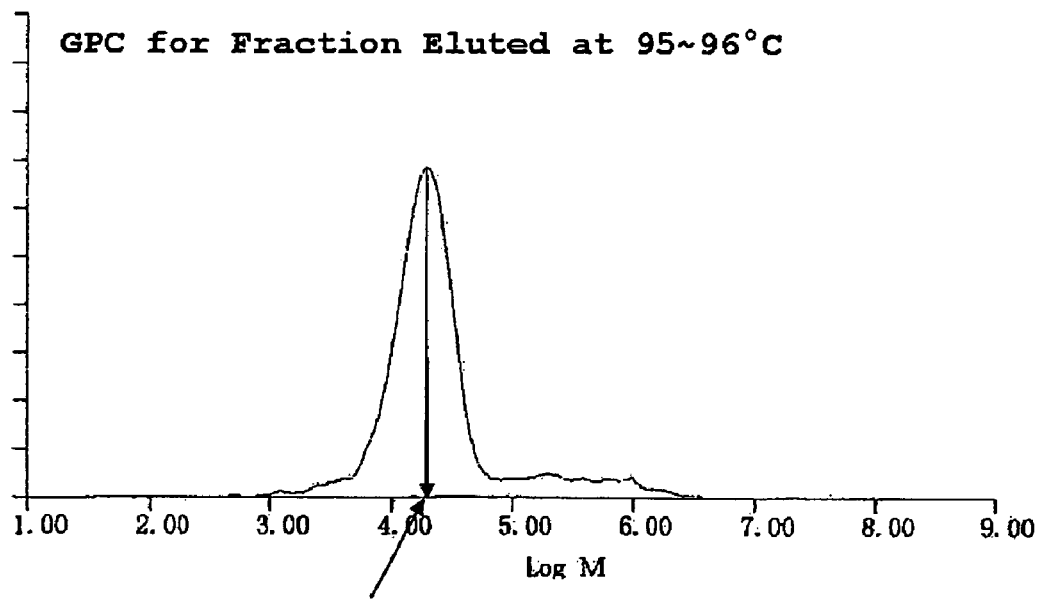
FIG. 12 is a GPC curve for the components of the ethylene polymer obtained in Comparative Example 1, which are eluted at 95 to 96 (° C.).
Figure 13:
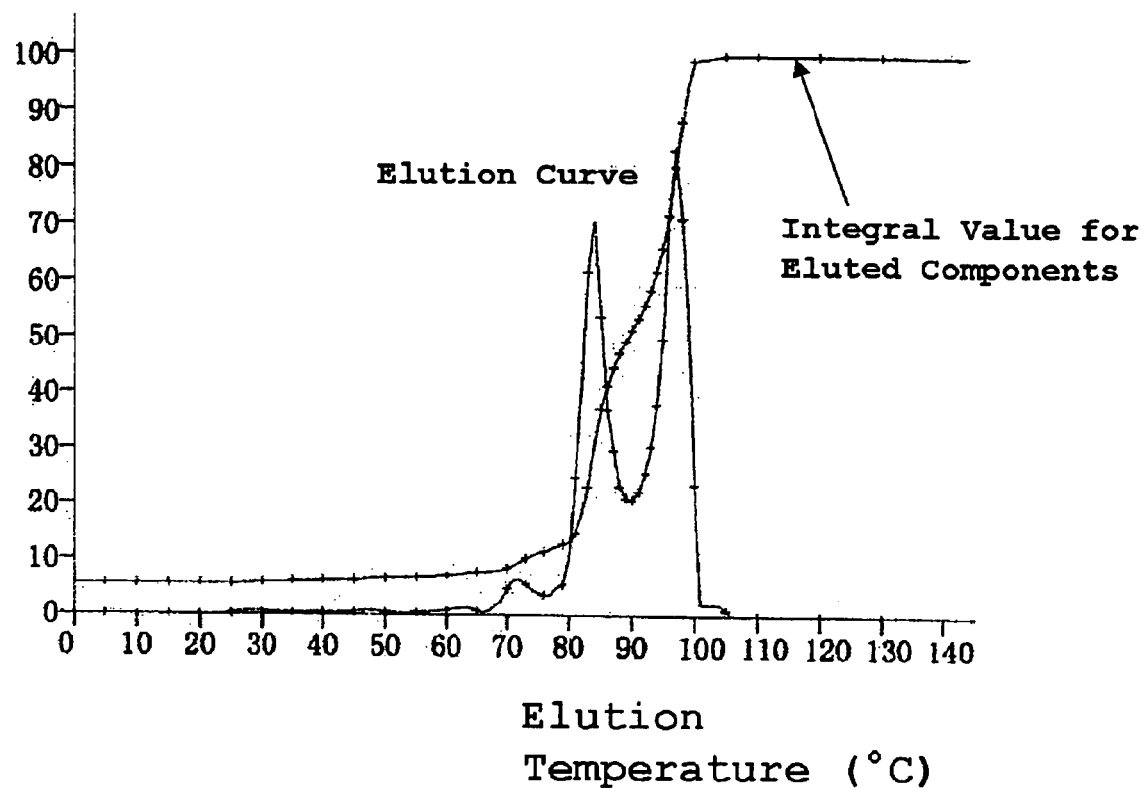
FIG. 13 is a graph indicating the elution curve and the integral value for the amounts of the components of the ethylene polymer obtained in Comparative Example 1, which are eluted at 0 to 145 (° C.).

The contour diagram for CFC fractionation is given in FIG. 7; a three-dimensional chart (bird's eye view) viewed from the lower temperature side is given in FIG. 8; a three-dimensional chart (bird's eye view) viewed from the higher temperature side is given in FIG. 9; a GPC curve for the component eluted at peak temperature ($T_2$) (° C.) is given in FIG. 10; a GPC curve for the components eluted at 73 to 76 (° C.) is given in FIG. 11; and a GPC curve for the components eluted at 95 to 96 (° C.) is given in FIG. 12. Further, FIG. 13 represents a projection (elution curves) in the y-z plane for the eluted components and the integral value of the amounts of the eluted components (100 area % in total), where Log(M) is taken as the x-axis, Temp(° C.) is taken as the y-axis and the vertical axis is taken as the z axis in the bird's eye view (FIG. 8 or FIG. 9).

Figure 33:
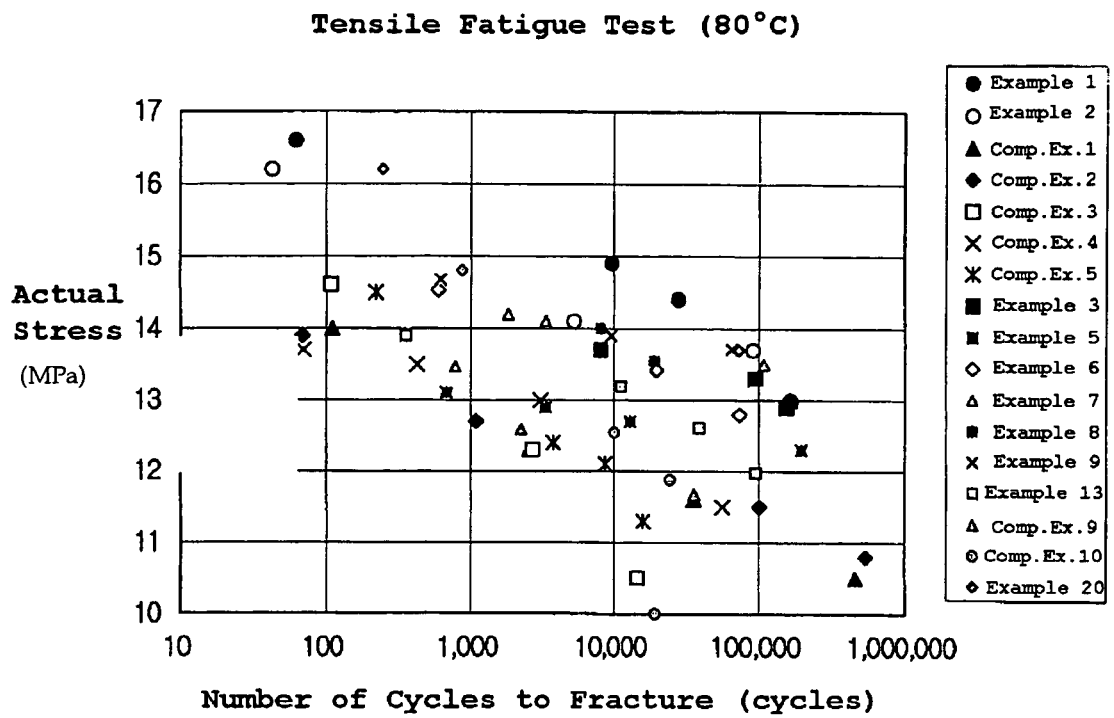
FIG. 33 is a chart indicating the comparison of results of the tensile fatigue test at 80° C. for Examples and Comparative Examples.

As shown in FIG. 33, the tensile fatigue strength at 80° C. of this sample is not very high.

Comparative Example 2

With respect to 100 parts by weight of the polymer particle obtained in Comparative Example 1, the same secondary anti-oxidizing agent, heat-resistant stabilizer and hydrochloric acid absorbent as those used in Example 1 were mixed in the same amounts. Thereafter, a sample for measurement was prepared by granulation at a resin extrusion amount of 22 g/min and at 100 rpm using a twin screw extruder BT-30 (30 mmφ, L/D=46, co-rotation, four kneading zones) manufactured by Placo Co., Ltd., set at a temperature of 240° C. Also, a pressed sheet was prepared using the sample to measure the properties. The results are presented in Tables 1 to 3 and Table 6. In the polarized microscopic observation, no crystalline structure continuous over more than 10 μm is present. When compared with Comparative Example 1, this sample has higher smoothness and slightly higher tensile fatigue strength at 80° C., but when compared with Example 1, its tensile fatigue strength at 80° C. is lower (see FIG. 33).

Comparative Example 3

Figure 34:
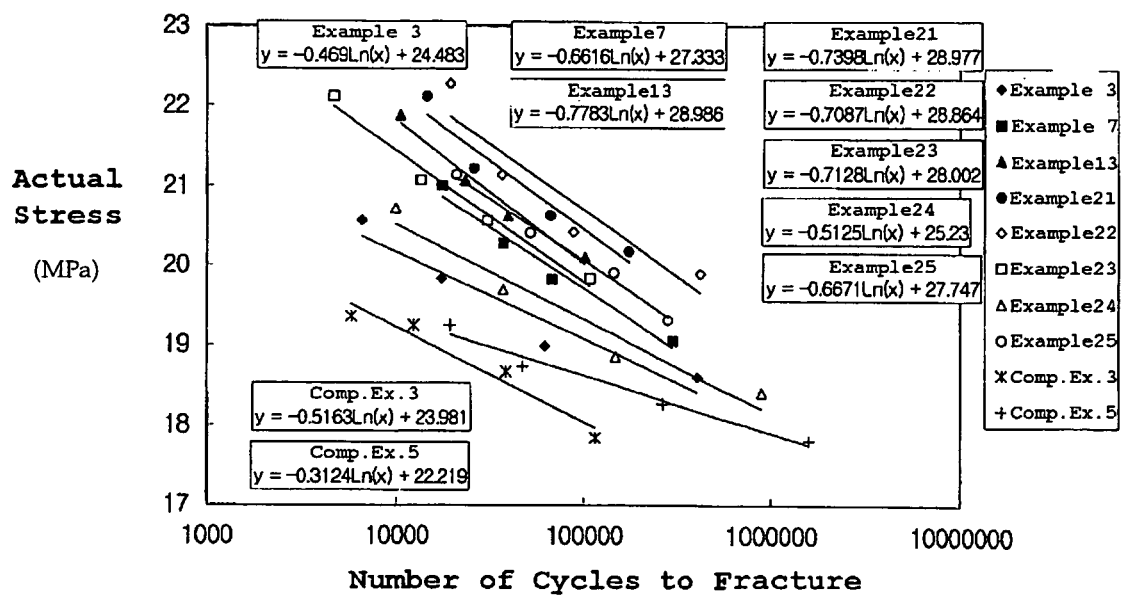
FIG. 34 is a chart indicating the comparison of results of the tensile fatigue test at 23° C. for Examples and Comparative Examples.

The pellets of product HI-ZEX 7700 M manufactured by Mitsui Chemical Co., Ltd. were used as the sample for measurement. The co-monomer was 1-butene. A pressed sheet was prepared using the sample to measure the properties. The results are presented in Tables 1 to 3 and Tables 6 to 8. In the polarized microscopic observation at 100 magnifications, no crystalline structure continuous over more than 10 μm is present. As shown in FIG. 33, it is found that this sample has lower fatigue strength than the samples of Examples in the measurement of tensile fatigue at 80° C. Further, as shown in FIG. 34, the sample has lower strength than the samples of other Examples in the measurement of tensile fatigue at 23° C.

Comparative Example 4

Using the catalyst used in Example 1 described in the publication of JP-A NO. 2002-53615, an ethylene homopolymer having [η]=0.72 dl/g and an ethylene.1-butene copolymer having [η]=5.2 dl/g and the content of 1-butene=1.7 mol % were obtained by slurry polymerization at 80° C. These were mixed in a ratio of 49/51 (weight ratio), dissolved in para-xylene at 130° C. to a concentration of 10 g/1,000 ml, stirred for 3 hours and stood for 1 hour. The mixture was precipitated in 3,000 ml of acetone at 20° C., filtered through a glass filter, dried under vacuum all day and night at 60° C., and then melt-kneaded using a Labo-Plastimil to yield a sample for measurement. Further, a pressed sheet was prepared using the sample to measure the properties. The results are presented in Table 1 and Table 6.

Comparative Example 5

Figure 14:
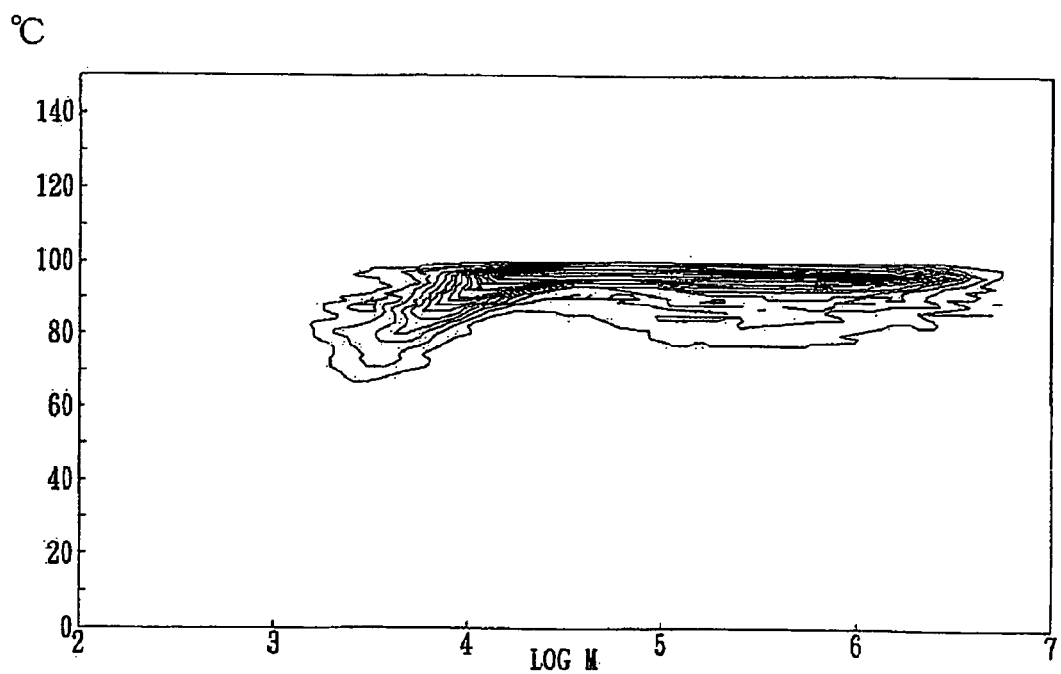
FIG. 14 is a CFC contour diagram for the ethylene polymer obtained in Comparative Example 5.
Figure 15:
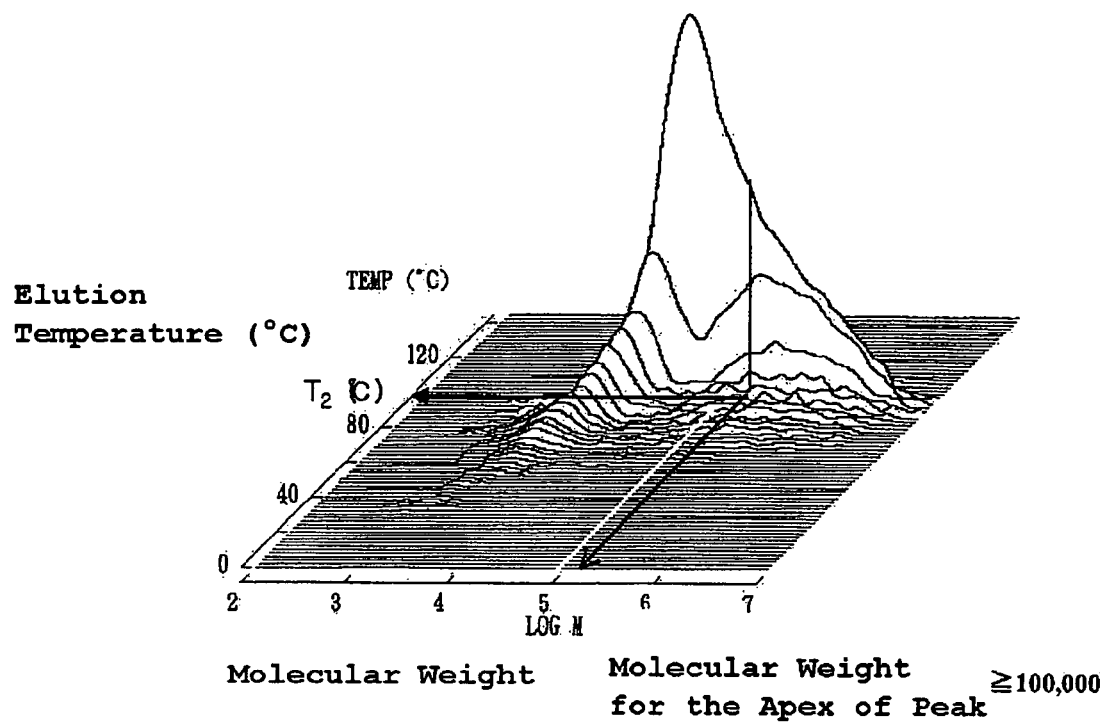
FIG. 15 is a three-dimensional GPC chart (bird's eye view) with $T_2$, as viewed from the lower temperature side, for the ethylene polymer obtained in Comparative Example 5.
Figure 16:
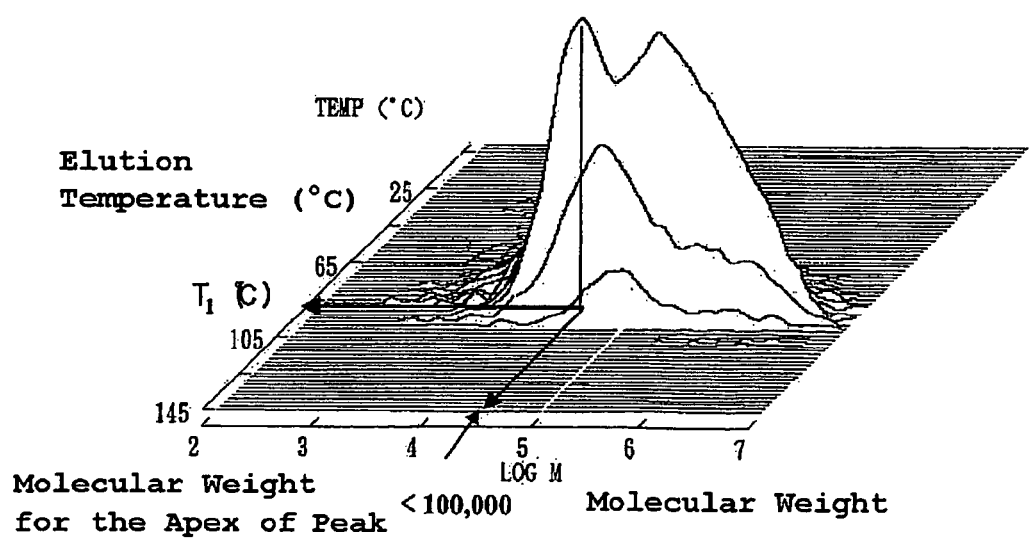
FIG. 16 is three-dimensional GPC chart (bird's eye view) with $T_1$, as viewed from the higher temperature side, for the ethylene polymer obtained in Comparative Example 5.
Figure 17:
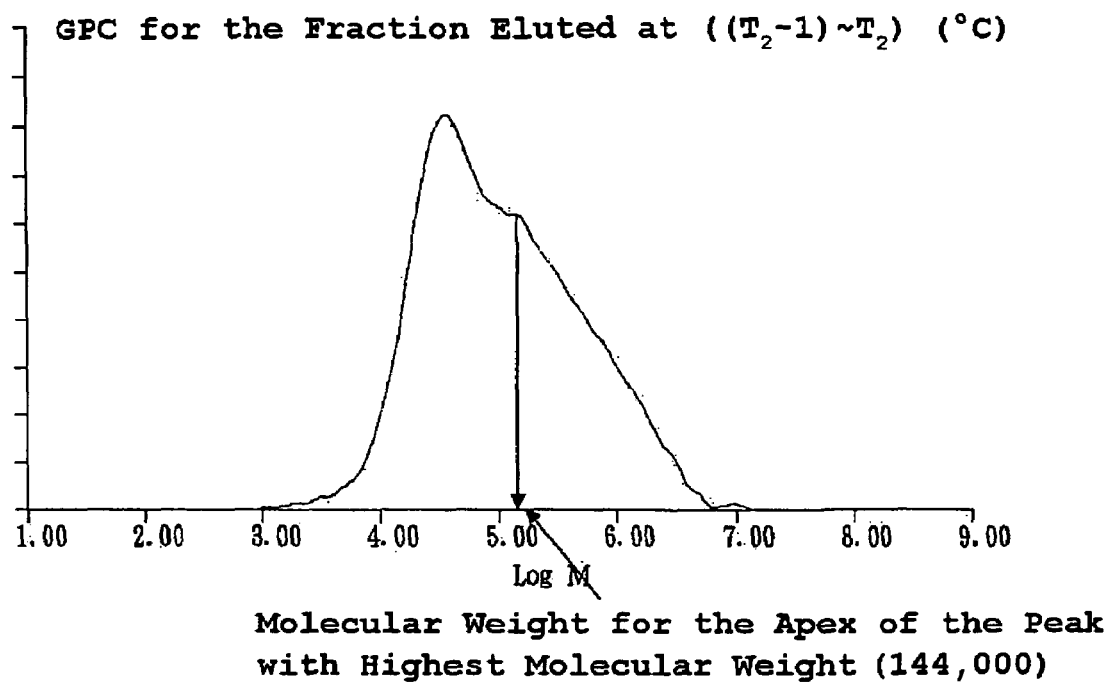
FIG. 17 is a GPC curve for the eluted components of the ethylene polymer obtained in Comparative Example 5 at peak temperatures [$(T_2-1)$ to $T_2$] (° C.).
Figure 18:
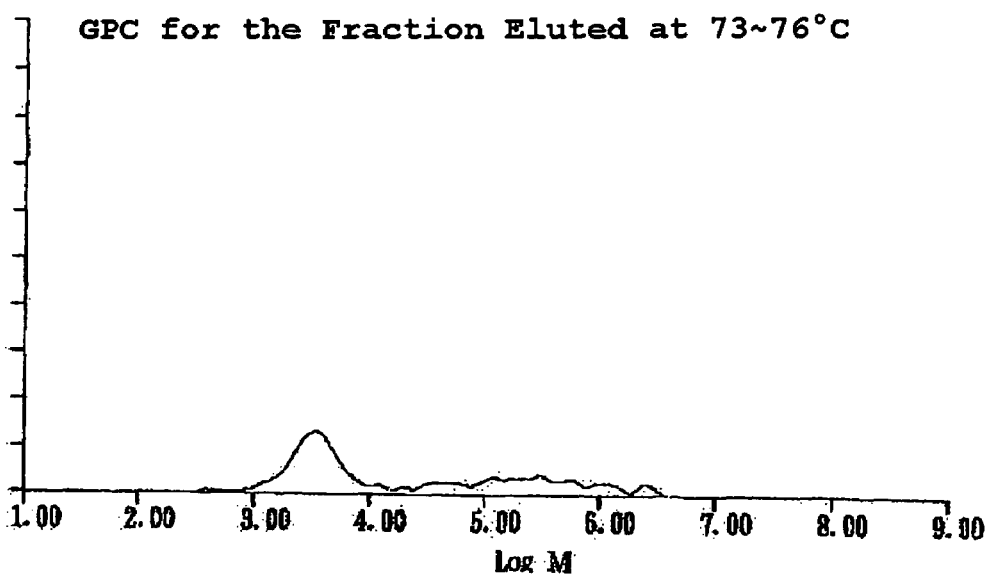
FIG. 18 is a GPC curve for the components of the ethylene polymer obtained in Comparative Example 5, which are eluted at 73 to 76 (° C.).
Figure 19:
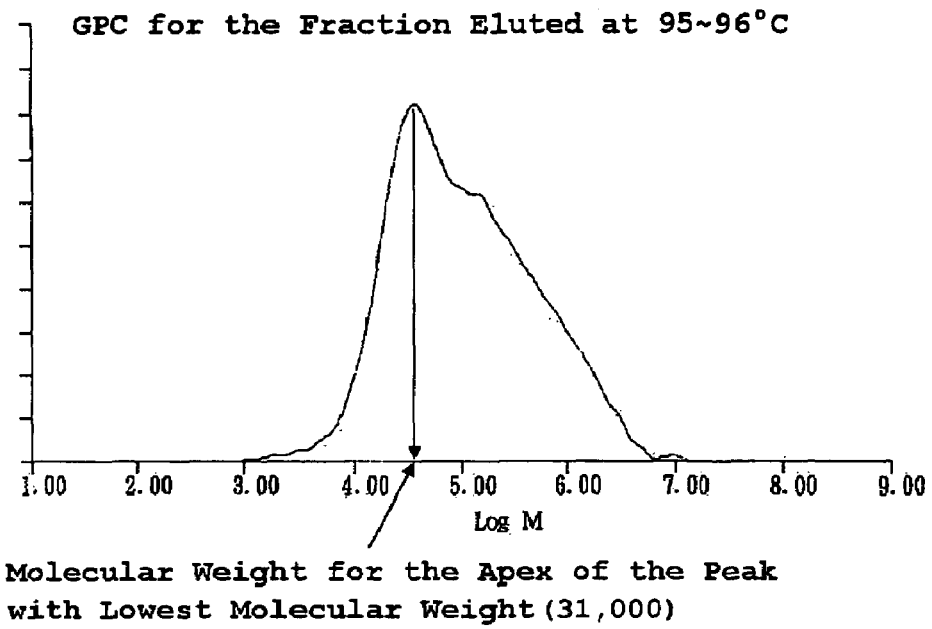
FIG. 19 is a GPC curve for the components of the ethylene polymer obtained in Comparative Example 5, which are eluted at 95 to 96 (° C.).

The pellets of the HDPE product (product name: Hostalen, reference name CRP100) manufactured by Basell Corp. were used as the sample for measurement. The co-monomer was 1-butene. A pressed sheet was prepared using the sample to measure the properties. The results are presented in Tables 1 to 3 and Tables 6 to 8. The contour diagram obtained from CFC fractionation is presented in FIG. 14; a three-dimensional chart (bird's eye view) viewed from the lower temperature side is presented in FIG. 15; a three-dimensional chart (bird's eye view) viewed from the higher temperature side is presented in FIG. 16; a GPC curve for the component eluted at peak temperature ($T_2$) (° C.) is presented in FIG. 17; a GPC curve for the components eluted at 73 to 76 (° C.) is presented in FIG. 18, and a GPC curve for the components eluted at 95 to 96 (° C.) is presented in FIG. 19. In addition, it is defined herein as $T_1=T_2$. In the polarized microscopic observation, no crystalline structure continuous over more than 10 μm is present. As shown in FIG. 33, it is found in the test to measure the tensile fatigue at 80° C. of this sample that the sample has lower fatigue strength than the samples of Examples. Further, as shown in FIG. 34, the sample has lower strength than the samples of other Examples in the measurement of tensile fatigue at 23° C.

Example 3

[Polymerization]

To a first polymerization bath, the following components were continuously supplied: 45 liters/hr of hexane, 0.11 mmol/hr (in terms of Zr atoms) of the solid catalyst component (δ) obtained in Synthetic Example 2, 20 mmol/hr of triethylaluminum, 5.0 kg/hr of ethylene and 57 N-liters/hr of hydrogen. Meanwhile, polymerization was carried out under the conditions such as polymerization temperature of 85° C., reaction pressure 8.5 kg/cm² G and average residence time of 2.5 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.2 kg/cm$^2$ G and 65° C.

Thereafter, the content was continuously supplied to the second polymerization, together with 35 liters/hr of hexane, 4.0 kg/hr of ethylene, 0.2 N-liter/hr of hydrogen and 130 g/hr of 1-hexene, and polymerization was continued under the conditions such as polymerization temperature 80° C., reaction pressure of 4.5 kg/cm$^2$ G and average residence time of 1.2 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared using a twin screw extruder BT-30 manufactured by Placo Co., Ltd. under the same conditions of the set temperature, the amount of extruded resin and the rotation speed as in Comparative Example 2. Further, a pressed sheet was prepared using this sample to measure the properties. The results are presented in Tables 1 to 3 and Tables 6 to 8.

Figure 20:
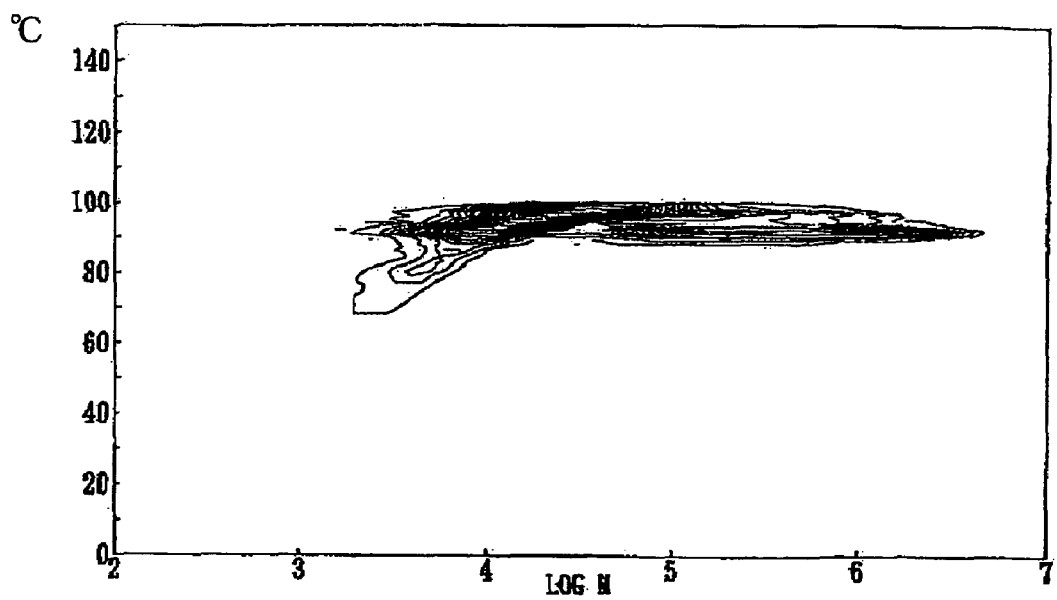
FIG. 20 is a CFC contour diagram for the ethylene polymer obtained in Example 3.
Figure 21:
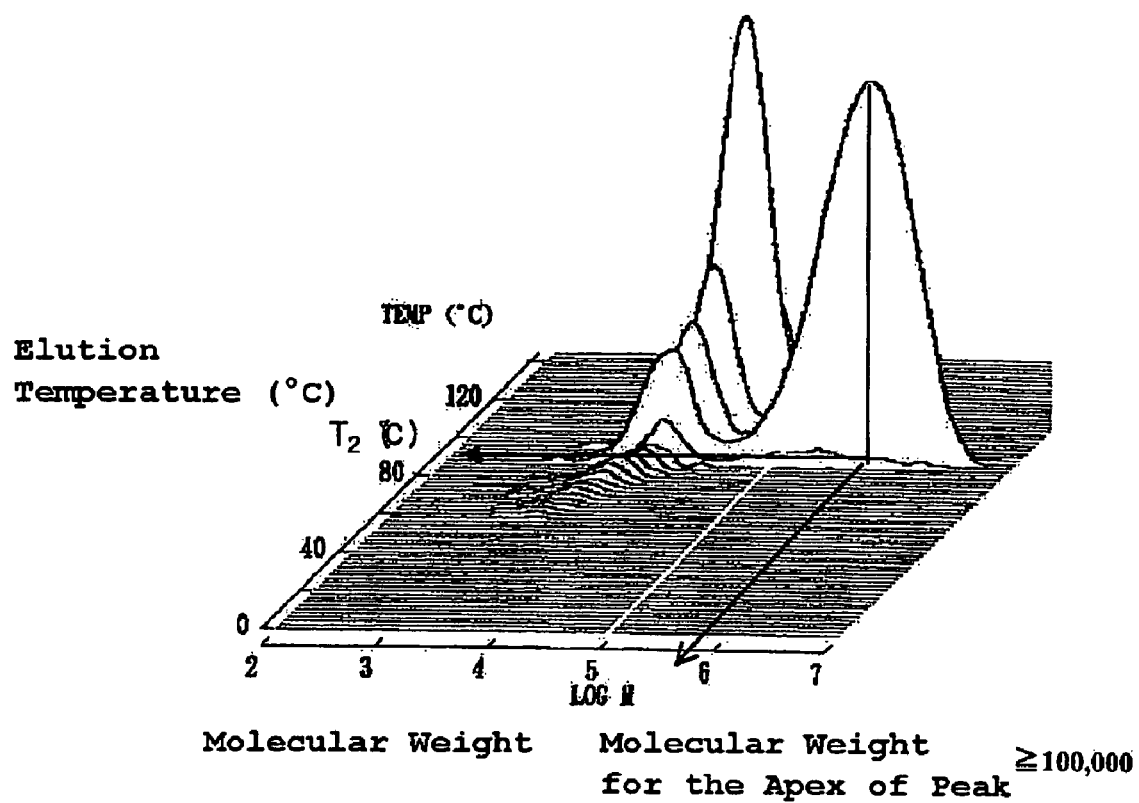
FIG. 21 is a three-dimensional GPC chart (bird's eye view) with $T_2$, as viewed from the lower temperature side, for the ethylene polymer obtained in Example 3.
Figure 22:
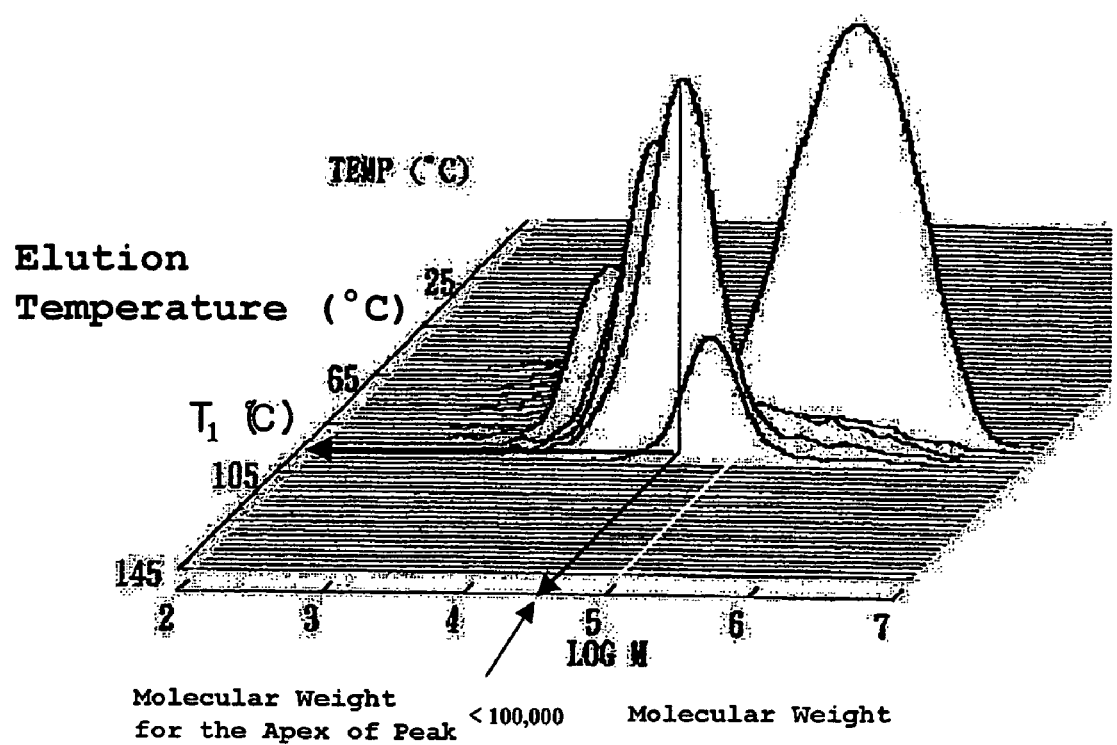
FIG. 22 is three-dimensional GPC chart (bird's eye view) with $T_1$, as viewed from the higher temperature side for the ethylene polymer obtained in Example 3.
Figure 23:
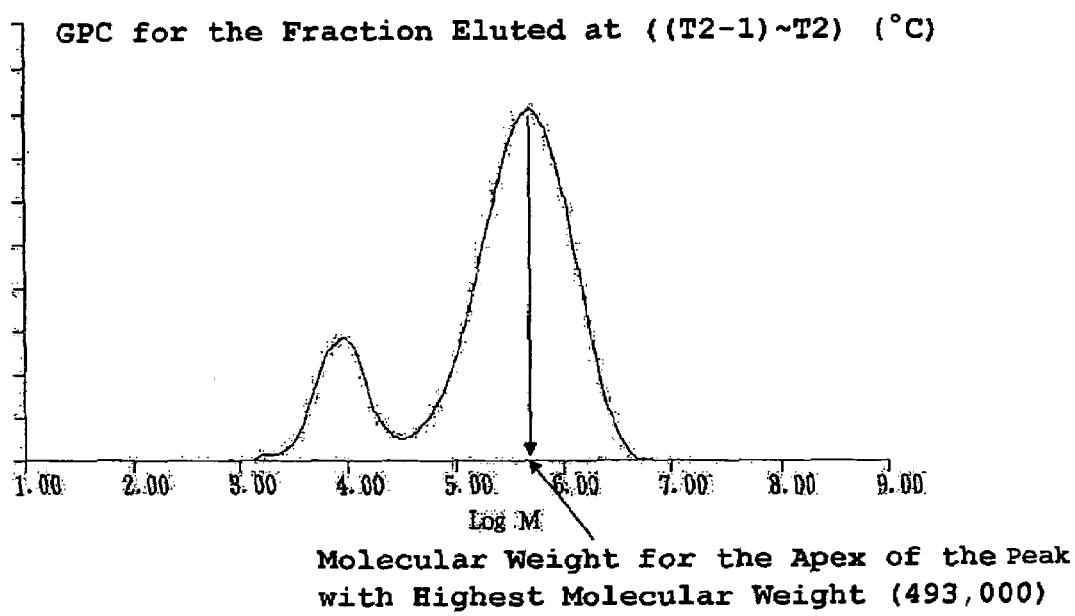
FIG. 23 is a GPC curve for the eluted components of the ethylene polymer obtained in Example 3 at peak temperatures [$(T_2-1)$ to $T_2$] (° C.).
Figure 24:
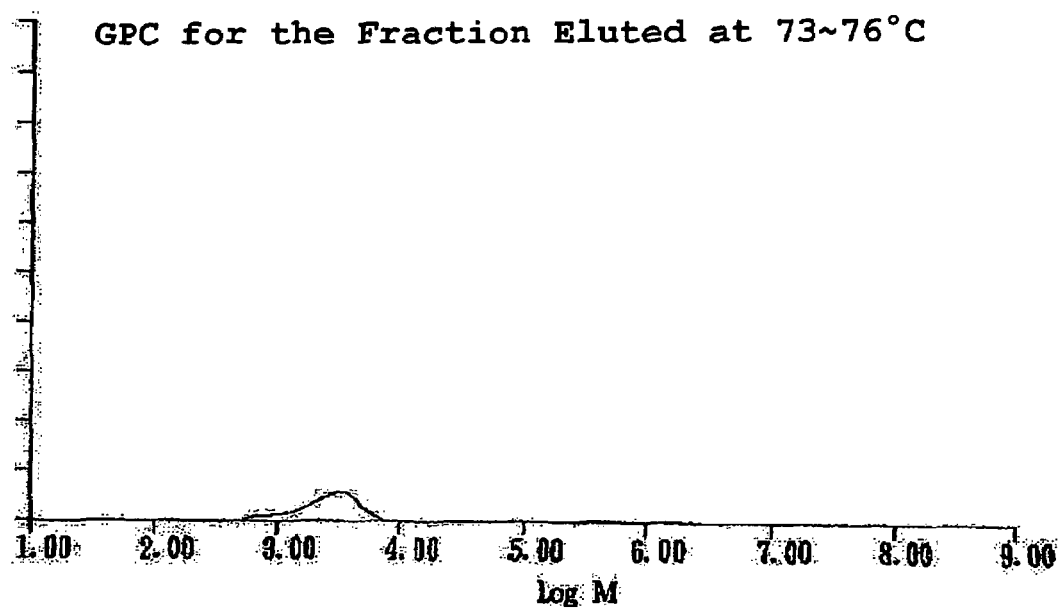
FIG. 24 is a GPC curve for the components of the ethylene polymer obtained in Example 3, which are eluted at 73 to 76 (° C.).
Figure 25:
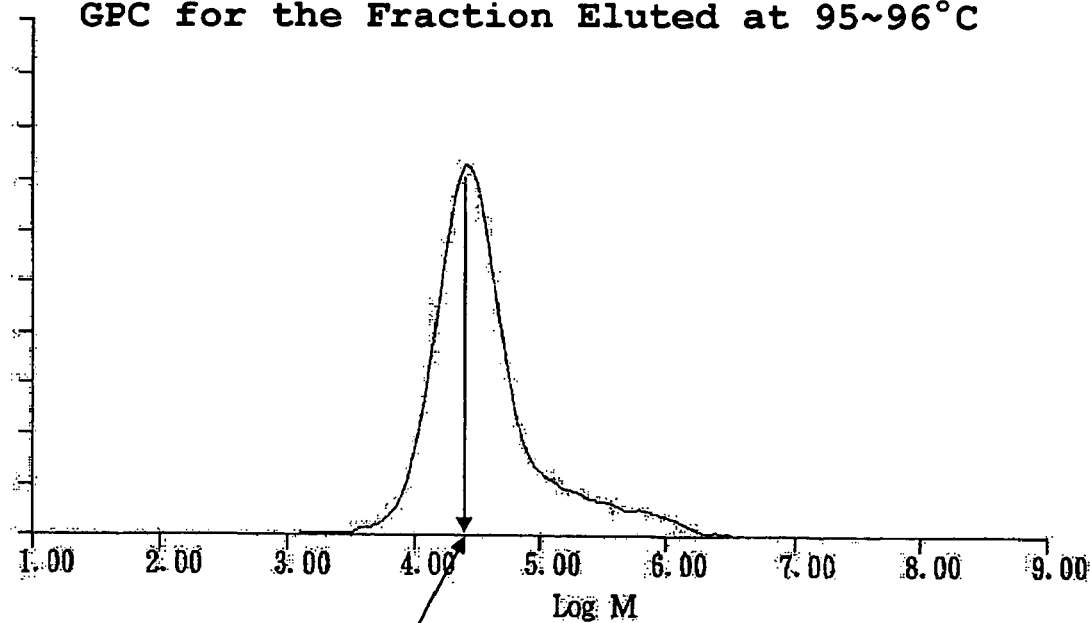
FIG. 25 is a GPC curve for the components of the ethylene polymer obtained in Example 3, which are eluted at 95 to 96 (° C.).
Figure 26:
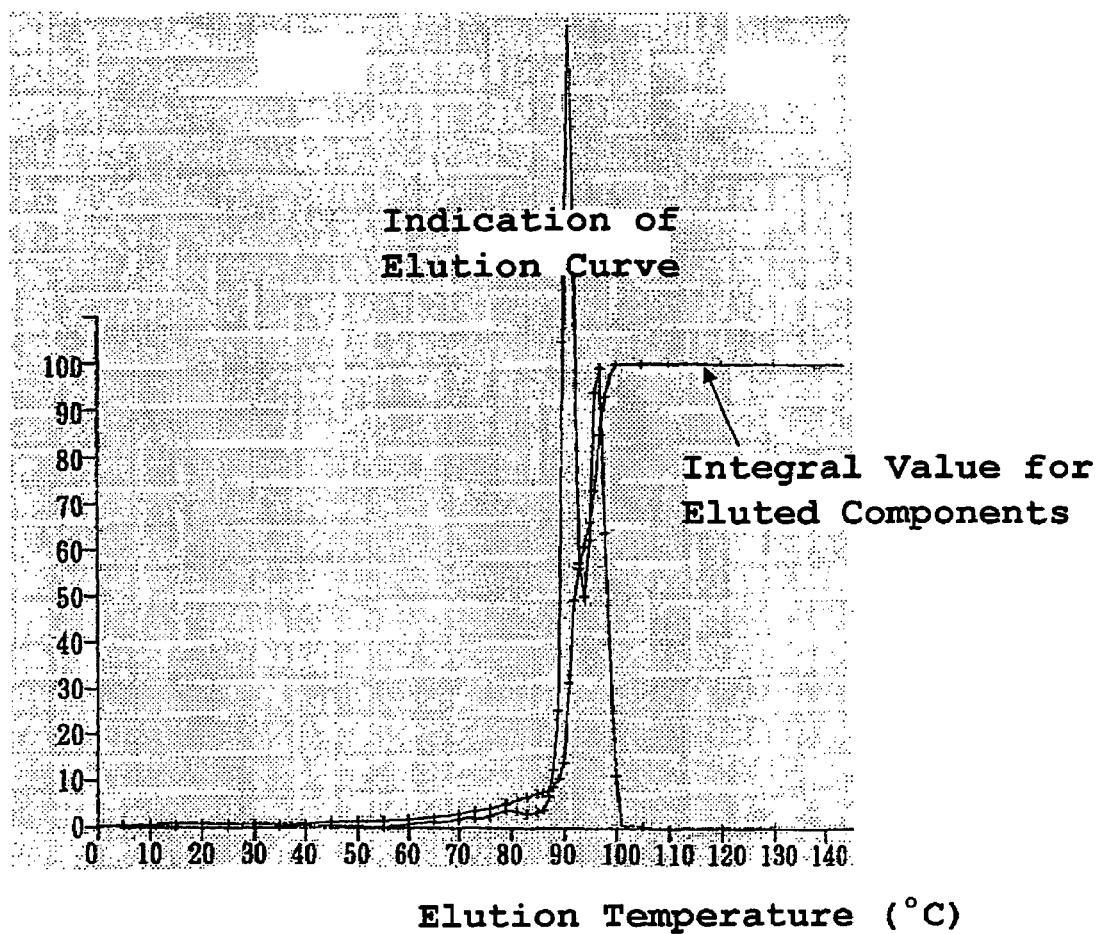
FIG. 26 is a graph indicating the elution curve and the integral value for the amounts of the components of the ethylene polymer obtained in Example 3, which are eluted at 0 to 145 (° C.).
Figure 27:
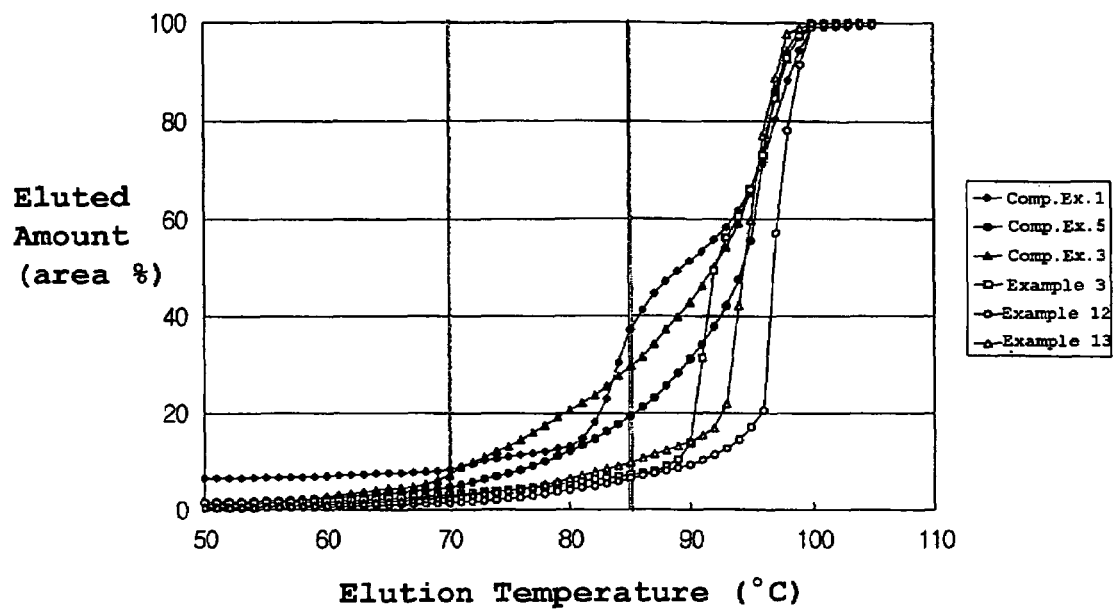
FIG. 27 is a diagram indicating the accumulated concentrations (total=100%) of the amounts of eluted components as obtained in CFC measurement of several Examples and Comparative Examples.

A contour diagram for CFC fractionation is presented in FIG. 20; a three-dimensional chart (bird's eye view) viewed from the lower temperature side is presented in FIG. 21; a three-dimensional chart (bird's eye view) viewed from the higher temperature side is presented in FIG. 22; a GPC curve for the component eluted at peak temperature ($T_2$) (° C.) is presented in FIG. 23; a GPC curve for the components eluted at 73 to 76 (° C.) is presented in FIG. 24; and a GPC curve for the components eluted at 95 to 96 (° C.) is presented in FIG. 25. Further, FIG. 26 represents a projection (elution curves) in the y-z plane for the eluted components and the integral value of the amounts of the eluted components (100 area % in total), where Log(M) is taken as the x-axis, Temp(° C.) as the y-axis and the vertical axis as the z axis in the bird's eye view (FIG. 21 or FIG. 22). FIG. 27 represents only the integral value of the amount of the eluted components (100 area % in total). FIG. 27 also illustrates on the ethylene polymers obtained (or used) in Comparative Examples 1, 3 and 5 described above and Examples 12 and 13 to be described later.

In the polarized microscopic observation of the ethylene polymer obtained in the present Example 3, no crystalline structure continuous over more than 10 μm is present. As shown in FIG. 33, it is found that this sample had higher fatigue strength in the test for tensile fatigue measurement at 80° C., as compared with the polymers in Comparative Examples. Also, as shown in FIG. 34, the polymer has higher strength in the tensile fatigue measurement at 23° C., as compared with the polymers other Comparative Examples.

Example 4

[Polymerization]

To a first polymerization bath, the following components were continuously supplied: 45 liters/hr of hexane, 0.11 mmol/hr (in terms of Zr atoms) of the solid catalyst component (δ) obtained in Synthetic Example 2, 20 mmol/hr of triethylaluminum, 7.0 kg/hr of ethylene, and hydrogen at 125 N-liters/hr. Meanwhile, polymerization was carried out under the conditions such as polymerization temperature of 85° C., reaction pressure of 8.5 kg/cm$^2$ G and average residence time of 2.5 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.2 kg/cm$^2$ G and at 65° C.

Then, the content was continuously supplied to a second polymerization bath, together with 35 liters/hr of hexane, 3.0 kg/hr of ethylene, 0.07 N-liter/hr of hydrogen and 30 g/hr of 1-hexene, and polymerization was continued under the conditions of polymerization temperature of 80° C., reaction pressure of 4.5 kg/cm$^2$ G and average residence time of 0.8 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as used in Example 1, taken out of the apparatus, compressed into a sheet by a cold press set at 20° C., and cut into a suitable size to provide a sample for measurement. Also, this sample was used to prepare a pressed sheet, and properties thereof were measured. The results are presented in Tables 1 to 4. In the polarized microscopic observation, no crystalline structure over more than 10 μm is present.

Comparative Example 6

The pellets of product HI-ZEX 6200 B manufactured by Mitsui Chemical Co., Ltd. were used as the sample for measurement. The co-monomer was 1-butene. A pressed sheet was prepared using the sample to measure the properties. The results are presented in Tables 1 to 5. In the polarized microscopic observation, no crystalline structure continuous over more than 10 μm is present. It can be seen that when compared with Example 4, this sample is inferior in the balance between toughness and the ESCR property.

Synthetic Example 3

[Preparation of Supported Catalyst]

In a reactor which had been sufficiently purged with nitrogen, 9.50 mmol (in terms of aluminum) of the solid catalyst component (α) synthesized in Synthetic Example 1 and suspended in toluene was added, and under stirring, 12.6 milliliters (0.038 mmol) of a 3 mmol/liter solution of di(p-tolyl) methylene(cyclopentadienyl) (octamethyloctahydrodibenzofluorenyl) zirconium dichloride was added to the suspension at room temperature (20 to 25° C.), the resulting mixture being stirred for 60 minutes. After stirring being stopped, the supernatant liquid was removed by decantation, the mixture was washed with 50 ml of n-pentane for 4 times, and thus obtained supported catalyst was reslurried in 50 ml of n-pentane to yield a solid catalyst component (θ) as a catalyst suspension.

[Preparation of Solid Catalyst Component (φ) by Prepolymerization of Solid Catalyst Component (θ)]

To a reactor equipped with a stirrer, the above-mentioned solid catalyst component (θ) was introduced under a nitrogen atmosphere, then 1.92 mmol of triisobutylaluminum was added under stirring, and prepolymerization was carried out with ethylene in an amount such that 3 g of polyethylene is produced per gram of the solid component in 1 hour. The polymerization temperature was maintained at 25° C. After completion of polymerization, stirring was stopped, the supernatant liquid was removed by decantation, the solids were washed with 50 milliliters of n-pentane for 4 times, and thus obtained supported catalyst was suspended in 100 milliliters of n-pentane to give a solid catalyst component (φ) as a catalyst suspension.

Example 5

[Polymerization]

A 1000 ml-autoclave which had been sufficiently purged with nitrogen was charged with 500 ml of n-heptane, and 0.25 ml (0.25 mmol) of triisobutylaluminum at a concentration of 1 mol/liter and 6.50 ml of the solid catalyst component (φ) obtained in Synthetic Example 3 (corresponding to 0.0018 mmol in terms of Zr atoms) were introduced. The autoclave was pressurized with an ethylene.hydrogen mix gas having a hydrogen content of 2.50 vol % to a pressure of 8.0 kg/cm$^2$ G, and polymerization was initiated at 80° C. The ethylene.hydrogen mix gas was added during polymerization to maintain at 8.0 kg/cm$^2$ G, and polymerization was carried out for 70.5 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 20.0 ml of 1-octene were introduced, the autoclave was pressurized with an ethylene.hydrogen mix gas with a hydrogen content of 0.021 vol % to a pressure of 8.0 kg/cm$^2$ G, and polymerization was re-initiated at 65° C. The ethylene.hydrogen mix gas was added during polymerization to maintain at 8.0 kg/cm$^2$ G, and polymerization was carried out for 19.5 minutes. After completion of polymerization, pressure was removed, and the catalyst was deactivated by addition of methanol. The resulting polymer was filtered, washed and dried under vacuum at 80° C. for 12 hours to give 104.9 g of the polymer.

With respect to 100 parts by weight of this polymer particle, the same secondary anti-oxidizing agent, heat-resistant stabilizer, and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as used in Example 1, taken out of the apparatus, compressed into a sheet by a cold press set at 20° C., and cut into a suitable size to provide a sample for measurement. Also, this sample was used to prepare a pressed sheet, and properties thereof were measured. The results are presented in Tables 1 to 3 and Table 6. In the polarized microscopic observation, no crystalline structure continuous over more than 10 µm is present.

Example 6

[Polymerization]

To a first polymerization bath, the following components were continuously supplied: 45 liters/hr of hexane, 0.13 mmol/hr (in terms of Zr atoms) of the solid catalyst component (δ) obtained in Synthetic Example 2, 20 mmol/hr of triethylaluminum, 5.0 kg/hr of ethylene, and 57 N-liters/hr of hydrogen. Meanwhile, polymerization was carried out under the conditions such as polymerization temperature of 85° C., reaction pressure of 8.3 kg/cm$^2$ G and average residence time of 2.6 hr, while continuously withdrawing the content of the polymerization bath so that the liquid level in the polymerization bath would be maintained constant. The content continuously withdrawn from the first polymerization bath was subjected to substantial removal of unreacted ethylene and hydrogen in a flash drum maintained at an internal pressure of 0.35 kg/cm$^2$ G and at 60° C.

Then, the content was continuously supplied to a second polymerization bath, together with 35 liters/hr of hexane, 3.5 kg/hr of ethylene, 0.5 N-liter/hr of hydrogen and 220 g/hr of 1-hexene, and polymerization was continued under the conditions of polymerization temperature of 80° C., reaction pressure of 3.8 kg/cm$^2$ G and average residence time of 1.2 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

With respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 25 kg/hr and at a set temperature of 200° C. using a single screw extruder (screw diameter 65 mm, L/D=28, screen mesh 40/60/300×4/60/40) manufactured by Placo Co., Ltd. Further, a pressed sheet was prepared using this sample to measure the properties. The results are presented in Tables 1 to 3 and Table 6. In the polarized microscopic observation, no crystalline structure continuous over more than 10 µm is present. As shown in FIG. 33, this sample has higher fatigue strength than the sample used in the Comparative Examples in the tensile fatigue measurement at 80° C.

Example 7

[Polymerization]

To a first polymerization bath, the following components were continuously supplied: 45 liters/hr of hexane, 0.13 mmol/hr (in terms of Zr atoms) of the solid catalyst component (δ) obtained in Synthetic Example 2, 20 mmol/hr of triethylaluminum, 5.0 kg/hr of ethylene, and 55 N-liters/hr of hydrogen. Meanwhile, polymerization was carried out under the conditions such as polymerization temperature of 85° C., reaction pressure of 8.1 kg/cm² G and average residence time of 2.6 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.35 kg/cm² G and at 60° C.

Then, the content was continuously supplied to a second polymerization bath, together with 35 liters/hr of hexane, 3.0 kg/hr of ethylene, 0.5 N-liter/hr of hydrogen and 130 g/hr of 1-hexene, and polymerization was continued under the conditions of polymerization temperature of 80° C., reaction pressure of 3.9 kg/cm² G and average residence time of 1.2 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

With respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at the same set temperature and extruded resin amount as in Example 6 using a single screw extruder manufactured by Placo Co., Ltd. Further, a pressed sheet was prepared using this sample to measure the properties. The results are presented in Tables 1 to 3 and Tables 6 to 8. In the polarized microscopic observation, no crystalline structure continuous over more than 10 μm is present. As it can be seen from the results of tensile fatigue measurement at 80° C. shown in FIG. 33, this sample has higher fatigue strength than the samples used in the Comparative Examples.

Synthetic Example 4

[Preparation of Solid Catalyst Component]

Only for Synthetic Example 4, $SiO_2$ manufactured by Asahi Glass Co., Ltd. having an average particle size of 3 μm, a specific surface area of 800 m²/g and a pore volume of 1.0 cm³/g was used as silica.

A suspension was prepared from 9.0 kg of silica which had been dried at 200° C. for 3 hours and 60.7 liters of toluene, and 61.8 liters of a methylaluminoxane solution (3.03 mol/liter as Al) was added dropwise over 30 minutes. Then, the temperature of the mixture was elevated to 115° C. over 1.5 hours, and the mixture was allowed to react at that temperature for 4 hours. Subsequently, the reaction mixture was cooled to 60° C., and the supernatant liquid was removed by decantation. Thus obtained solid catalyst component was washed with toluene for three times and resuspended in toluene to yield a solid catalyst component (ε) (total volume 150 liters)

[Preparation of Supported Catalyst]

In a reactor which had been sufficiently purged with nitrogen, 9.58 mol (in terms of aluminum) of the solid catalyst component (ε) was added, and under stirring, 2 liters (24.84 mmol) of a 12.42 mmol/liter solution of di(p-tolyl)methylene (cyclopentadienyl) (octamethyloctahydrodibenzofluorenyl) zirconium dichloride was added to the suspension at room temperature (20 to 25° C.), the resulting mixture being stirred for another 60 minutes. After stirring being stopped, the supernatant liquid was removed by decantation, the mixture was washed with 40 liters of n-hexane for two times, and thus obtained supported catalyst was reslurried in 25 liters of n-hexane to yield a solid catalyst component (κ) as a catalyst suspension.

[Preparation of Solid Catalyst Component (λ) by Prepolymerization of Solid Catalyst Component (κ)]

To a reactor equipped with a stirrer, 21.9 liters of purified n-hexane and the above-mentioned solid catalyst component (κ) were introduced under a nitrogen atmosphere, then 1.7 mol of triisobutylaluminum was added under stirring, and prepolymerization was carried out with ethylene in an amount such that 3 g of polyethylene is produced per gram of the solid component in 2 hours. The polymerization temperature was maintained at 20 to 25° C. After completion of polymerization, stirring was stopped, the supernatant liquid was removed by decantation, the solids were washed with 40 liters of n-hexane for 3 times, and thus obtained supported catalyst was suspended in 20 liters of n-hexane to give a solid catalyst component (λ) as a catalyst suspension.

Example 8

[Polymerization]

To a first polymerization bath, the following components were continuously supplied: 45 liters/hr of hexane, 0.11 mmol/hr (in terms of Zr atoms) of the solid catalyst component (λ) obtained in Synthetic Example 4, 15 mmol/hr of triethylaluminum, 7.0 kg/hr of ethylene, and 105 N-liters/hr of hydrogen. Meanwhile, polymerization was carried out under the conditions such as polymerization temperature of 85° C., reaction pressure of 7.9 kg/cm² G and average residence time of 2.5 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.30 kg/cm² G and at 60° C.

Then, the content was continuously supplied to a second polymerization bath, together with 35 liters/hr of hexane, 4.0 kg/hr of ethylene, 2.0 N-liters/hr of hydrogen and 80 g/hr of 1-hexene, and polymerization was continued under the conditions of polymerization temperature of 80° C., reaction pressure of 2.5 kg/cm² G and average residence time of 1.1 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at the same set temperature and extruded resin amount as in Example 6 using a single screw extruder manufactured by Placo Co., Ltd. Further, a pressed sheet was prepared using this sample to measure the properties. The results are presented in Tables 1 to 3 and Table 6. In the polarized microscopic observation, no crystalline structure continuous over more than 10 μm is present. As it can be seen from the results of tensile fatigue measurement at 80° C. shown in FIG. 33, this sample has higher fatigue strength than the samples of the Comparative Examples.

Synthetic Example 5

[Preparation of Supported Catalyst]

In a reactor which had been sufficiently purged with nitrogen, 19.60 mol (in terms of aluminum) of the solid catalyst component (α) synthesized in Synthetic Example 1 and suspended in toluene was added, and under stirring, 2 liters (62.12 mmol) of a 31.06 mmol/liter solution of di(p-tolyl) methylene(cyclopentadienyl) (octamethyloctahydrodibenzofluorenyl) zirconium dichloride was added to the suspension at room temperature (20 to 25° C.), the resulting mixture being stirred for another 60 minutes. After stirring being stopped, the supernatant liquid was removed by decantation, the mixture was washed with 40 liters of n-hexane for 2 times, and thus obtained supported catalyst was reslurried in 25 liters of n-hexane to yield a solid catalyst component (τ) as a catalyst suspension.

[Preparation of Solid Catalyst Component (ω) by Prepolymerization of Solid Catalyst Component (τ)]

To a reactor equipped with a stirrer, 15.8 liters of purified n-hexane and the above-mentioned solid catalyst component (τ) were introduced under a nitrogen atmosphere, then 5 mol of triisobutylaluminum was added under stirring, and prepolymerization was carried out with ethylene in an amount such that 3 g of polyethylene is produced per gram of the solid component in 4 hours. The polymerization temperature was maintained at 20 to 25° C. After completion of polymerization, stirring was stopped, the supernatant liquid was removed by decantation, the solids were washed with 35 liters of n-hexane for 4 times, and thus obtained supported catalyst was suspended in 20 liters of n-hexane to give a solid catalyst component (ω) as a catalyst suspension.

Example 9

[Polymerization]

To a first polymerization bath, the following components were continuously supplied: 45 liters/hr of hexane, 0.14 mmol/hr (in terms of Zr atoms) of the solid catalyst component (ω) obtained in Synthetic Example 5, 20 mmol/hr of triethylaluminum, 7.0 kg/hr of ethylene, and 120 N-liters/hr of hydrogen. Meanwhile, polymerization was carried out under the conditions such as polymerization temperature of 85° C., reaction pressure of 7.9 kg/cm$^2$ G and average residence time of 2.6 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.30 kg/cm$^2$ G and at 60° C.

Then, the content was continuously supplied to a second polymerization bath, together with 35 liters/hr of hexane, 7.0 kg/hr of ethylene, 3.0 N-liters/hr of hydrogen and 100 g/hr of 1-hexene, and polymerization was continued under the conditions of polymerization temperature of 80° C., reaction pressure of 3.8 kg/cm$^2$ G and average residence time of 1.1 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at the same set temperature and extruded resin amount as in Example 6 using a single screw extruder manufactured by Placo Co., Ltd. Further, a pressed sheet was prepared using this sample to measure the properties. The results are presented in Tables 1 to 3 and Table 6. In the polarized microscopic observation, no crystalline structure continuous over more than 10 μm is present. As it can be seen from the results of tensile fatigue measurement at 80° C. shown in FIG. 33, this sample has higher fatigue strength than the samples of the Comparative Examples. Also, as shown in FIG. 34, this sample has higher strength than the samples of Comparative Examples in the tensile fatigue measurement at 23° C.

Example 10

[Polymerization]

A 1000 ml-autoclave which had been sufficiently purged with nitrogen was charged with 500 ml of n-heptane, and 0.25 ml (0.25 mmol) of triisobutylaluminum at a concentration of 1 mol/liter and 4.87 ml of the solid catalyst component (β) obtained in Synthetic Example 1 (corresponding to 0.0038 mmol in terms of Zr atoms) were introduced. The autoclave was pressurized with an ethylene.hydrogen mix gas having a hydrogen content of 2.50 vol % to a pressure of 8.0 kg/cm$^2$ G, and polymerization was initiated at 80° C. The ethylene.hydrogen mix gas was added during polymerization to maintain at 8.0 kg/cm$^2$ G, and polymerization was carried out for 54.5 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 1.0 ml of 1-hexene were introduced, the autoclave was pressurized with an ethylene.hydrogen mix gas with a hydrogen content of 0.10 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 15.75 minutes. After completion of polymerization, pressure was removed, and the catalyst was deactivated by addition of methanol. The resulting polymer was filtered, washed and dried under vacuum at 80° C. for 12 hours to give 102.50 g of the polymer.

With respect to 100 parts by weight of this polymer particle, the same secondary anti-oxidizing agent, heat-resistant stabilizer and hydrochloric acid absorbent as used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as used in Example 1, taken out of the apparatus, compressed into a sheet by a cold press set at 20° C., and cut into a suitable size to provide a sample for measurement. Further, a pressed sheet was prepared using this sample to measure the properties. The results are presented in Tables 1 to 4. In the polarized microscopic observation, no crystalline structure continuous over more than 10 μm is present. This sample has excellent toughness and ESCR property as compared with the samples of Comparative Examples.

Example 11

[Polymerization]

To a first polymerization bath, the following components were continuously supplied: 45 liters/hr of hexane, 0.11 mmol/hr (in terms of Zr atoms) of the solid catalyst component (δ) obtained in Synthetic Example 2, 20 mmol/hr of triethylaluminum, 6.0 kg/hr of ethylene, and 100 N-liters/hr of hydrogen. Meanwhile, polymerization was carried out under the conditions such as polymerization temperature of 85° C., reaction pressure of 8.5 kg/cm$^2$ G and average residence time of 2.5 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.20 kg/cm$^2$ G and at 65° C.

Then, the content was continuously supplied to a second polymerization bath, together with 35 liters/hr of hexane, 5.0 kg/hr of ethylene, 1.5 N-liters/hr of hydrogen and 55 g/hr of 1-hexene, and polymerization was continued under the conditions of polymerization temperature of 70° C., reaction pressure of 6.5 kg/cm$^2$ G and average residence time of 1.2 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 20 g/min and at 100 rpm using a twin screw extruder manufactured by Placo Co., Ltd., set at a temperature of 190° C. Further, a pressed sheet was prepared using this sample to measure the properties. The results are presented in Tables 1 to 5. In the polarized microscopic observation, no crystalline structure continuous over more than 10 μm is present. This sample has excellent toughness and ESCR property as compared with the samples of Comparative Examples. Also, it is found that the properties of the bottle molded product are superior to those of the samples of Comparative Examples.

Example 12

[Polymerization]

To a first polymerization bath, the following components were continuously supplied: 45 liters/hr of hexane, 0.08 mmol/hr (in terms of Zr atoms) of the solid catalyst component (ω) obtained in Synthetic Example 5, 20 mmol/hr of triethylaluminum, 7.0 kg/hr of ethylene, and 52 N-liters/hr of hydrogen. Meanwhile, polymerization was carried out under the conditions such as polymerization temperature of 85° C., reaction pressure of 7.3 kg/cm$^2$ G and average residence time of 2.6 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.30 kg/cm$^2$ G and at 60° C.

Then, the content was continuously supplied to a second polymerization bath, together with 43 liters/hr of hexane, 3.8 kg/hr of ethylene, 14.0 N-liters/hr of hydrogen and 20 g/hr of 1-hexene, and polymerization was continued under the conditions of polymerization temperature of 75° C., reaction pressure of 4.2 kg/cm$^2$ G and average residence time of 1.0 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

With respect to 100 parts by weight of the polymer particle, 0.20 part by weight of tri(2,4-di-t-butylphenyl)phosphate as a secondary anti-oxidizing agent, 0.20 part by weight of n-octadecyl-3-(4'-hydroxy-3',5'-di-t-butylphenyl)propionate as a heat-resistant stabilizer, and 0.15 part by weight of calcium stearate as a hydrochloric acid absorbent are mixed. Thereafter, a sample for measurement was prepared by granulation at the same set temperature and extruded resin amount as in Example 6 using a single screw extruder manufactured by Placo Co., Ltd. Further, a pressed sheet was prepared using this sample to measure the properties. The results are presented in Tables 1 to 4. Further, the sample was molded into a bottle, and its properties were measured, and the results are presented in Table 5. In the polarized microscopic observation, no crystalline structure continuous over more than 10 μm is present. The bottle molded product has excellent toughness as compared with the samples of Comparative Examples and excellent moldability as compared with the samples of other Examples.

Example 13

[Polymerization]

To the first polymerization bath, the following components were continuously supplied: 45 liters/hr of hexane, 0.13 mmol/hr (in terms of Zr atoms) of the solid catalyst component (ω) obtained in Synthetic Example 5, 20 mmol/hr of triethylaluminum, 5.0 kg/hr of ethylene, and 67 N-liters/hr of hydrogen. Meanwhile, polymerization was carried out under the conditions such as polymerization temperature of 85° C., reaction pressure of 7.4 kg/cm$^2$ G and average residence time of 2.7 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.30 kg/cm$^2$ G and at 60° C.

Then, the content was continuously supplied to a second polymerization bath, together with 43 liters/hr of hexane, 3.9 kg/hr of ethylene, 10.0 N-liters/hr of hydrogen and 110 g/hr of 1-hexene, and polymerization was continued under the conditions of polymerization temperature of 75° C., reaction pressure of 4.5 kg/cm$^2$ G and average residence time of 1.1 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at the same set temperature and extruded resin amount as in Example 6 using a single screw extruder manufactured by Placo Co., Ltd. Further, a pressed sheet was prepared using this sample to measure the properties. The results are presented in Tables 1 to 3 and Tables 6 to 8. In the polarized microscopic observation, no crystalline structure continuous over more than 10 μm is present. As it can be seen from the results of tensile fatigue measurement at 80° C. shown in FIG. 33, this sample has higher fatigue strength than the samples used in the Comparative Examples. Also, as shown in FIG. 34, the sample has higher strength than the samples of other Comparative Examples in the tensile fatigue measurement at 23° C.

Example 14

To the first polymerization bath, the following components were continuously supplied: 45 liters/hr of hexane, 0.24 mmol/hr (in terms of Zr atoms) of the solid catalyst component (δ) obtained in Synthetic Example 2, 20 mmol/hr of triethylaluminum, 7.0 kg/hr of ethylene, and 125 N-liters/hr of hydrogen. Meanwhile, polymerization was carried out under the conditions such as polymerization temperature of 85° C., reaction pressure of 8.5 kg/cm$^2$ G and average residence time of 2.5 hr, while continuously withdrawing the content of the polymerization bath so that the liquid level in the polymerization bath would be maintained constant.

The content continuously withdrawn from the first polymerization bath was subjected to substantial removal of unreacted ethylene and hydrogen in a flash drum maintained at an internal pressure of 0.2 kg/cm$^2$ G and at 65° C.

Then, the content was continuously supplied to a second polymerization bath, together with 35 liters/hr of hexane, 4.0 kg/hr of ethylene, 1.0 N-liter/hr of hydrogen and 50 g/hr of 1-hexene, and polymerization was continued under the conditions of polymerization temperature of 80° C., reaction pressure of 2.8 kg/cm$^2$ G and average residence time of 1.2 hr.

Also for the second polymerization bath, the content of the polymerization bath was continuously withdrawn so that the liquid level in the polymerization bath would be maintained constant. In order to prevent unwanted polymerization such as generation of a polymer containing a large proportion of 1-hexene, methanol was supplied to the content withdrawn from the second polymerization bath at a rate of 2 liters/hr to deactivate the catalyst for polymerization. Then, the content was subjected to removal of hexane and unreacted monomer in a solvent separation unit and dried to give the polymer.

Next, with respect to 100 parts by weight of the particulate ethylene polymer, the same secondary anti-oxidizing agent, heat-resistant stabilizer and hydrochloric acid absorbent as used in Example 1 were mixed in the same parts by weight. Thereafter, a sample for measurement was prepared by granulation using a twin screw extruder BT-30 manufactured by Placo Co., Ltd. under the same conditions of the set temperature, the amount of extruded resin and the rotation speed as in Example 11. In the polarized microscopic observation of 100 magnifications, no crystalline structure continuous over more than 10 μm is present. A pressed sheet was prepared using this sample to measure the properties. The results are presented in Tables 1 to 4. Also, the sample was molded into a bottle, and its properties were measured, and the results are presented in Table 5.

Example 15

With respect to 100 parts by weight of the polymer particle obtained in Example 4, the same secondary anti-oxidizing agent, heat-resistant stabilizer and hydrochloric acid absorbent as used in Example 1 were mixed in the same parts by weight. Thereafter, a sample for measurement was prepared by granulation using a twin screw extruder BT-30 manufactured by Placo Co., Ltd. under the same conditions of the set temperature, the amount of extruded resin and the rotation speed as in Example 11. A pressed sheet was prepared using this sample to measure the properties. The results are presented in Tables 1 to 4. In the polarized microscopic observation, no crystalline structure continuous over more than 10 μm is present. In the polarized microscopic observation of 100 magnifications, no crystalline structure continuous over more than 10 μm is present. A pressed sheet was prepared using this sample to measure the properties. The results are presented in Tables 1 to 5. Also, the sample was molded into a bottle, and its properties were measured, and the results are presented in Table 5.

Example 16

A 1000 ml-autoclave which had been sufficiently purged with nitrogen was charged with 500 ml of n-heptane, and 0.25 ml (0.25 mmol) of triisobutylaluminum at a concentration of 1 mol/liter and 6.70 ml of the solid catalyst component (β) obtained in Synthetic Example 1 (corresponding to 0.0038 mmol in terms of Zr atoms) were introduced. The autoclave was pressurized with an ethylene.hydrogen mix gas having a hydrogen content of 2.50 vol % to a pressure of 8.0 kg/cm$^2$ G, and polymerization was initiated at 80° C. The ethylene.hydrogen mix gas was added during polymerization to maintain at 8.0 kg/cm$^2$ G, and polymerization was carried out for 65 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 1.5 ml of 1-hexene were introduced, the autoclave was pressurized with an ethylene.hydrogen mix gas with a hydrogen content of 0.10 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 10.5 minutes. After completion of polymerization, pressure was removed, and the catalyst was deactivated by addition of methanol. The resulting polymer was filtered, washed and dried under vacuum at 80° C. for 12 hours to give 97.80 g of the polymer.

With respect to 100 parts by weight of this polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 µm is present. The sample is soluble in decane at 140° C. Also, a pressed sheet was prepared using this sample to measure the properties. The results are presented in Tables 1 to 4. The sample has excellent toughness and ESCR property as compared with the samples of Comparative Examples.

Example 17

With respect to 100 parts by weight of the polymer particle obtained in Example 14, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 µm is present. The sample is soluble in decane at 140° C. Also, a pressed sheet was prepared using this sample to measure the properties. The results are presented in Tables 1 to 4. The sample has excellent toughness and ESCR property as compared with the samples of Comparative Examples.

Comparative Example 7

The pellets of product HI-ZEX 3000 B manufactured by Mitsui Chemical Co., Ltd. were used to prepare a pressed sheet, and its properties were measured. The results are presented in Tables 1 to 4. The sample is inferior in toughness to the samples of Examples and has not very good ESCR property.

Example 18

A 1000 ml-autoclave which had been sufficiently purged with nitrogen was charged with 500 ml of n-heptane, and 0.25 ml (0.25 mmol) of triisobutylaluminum at a concentration of 1 mol/liter and 8.00 ml of the solid catalyst component (β) obtained in Synthetic Example 1 (corresponding to 0.0045 mmol in terms of Zr atoms) were introduced. The autoclave was pressurized with an ethylene.hydrogen mix gas having a hydrogen content of 2.53 vol % to a pressure of 8.0 kg/cm$^2$ G, and polymerization was initiated at 80° C. The ethylene.hydrogen mix gas was added during polymerization to maintain at 8.0 kg/cm$^2$ G, and polymerization was carried out for 80 minutes. After polymerization, pressure was removed, and the autoclave was purged with nitrogen to remove the ethylene.hydrogen mix gas.

To this autoclave, 0.25 ml (0.25 mmol) of triisobutylaluminum at a concentration of 1 mol/liter and 0.4 ml of 1-hexene were introduced, the autoclave was pressurized with an ethylene.hydrogen mix gas with a hydrogen content of 0.10 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 12.75 minutes. After completion of polymerization, pressure was removed, and the catalyst was deactivated by addition of methanol. The resulting polymer was filtered, washed and dried under vacuum at 80° C. for 12 hours to give 110.70 g of the polymer.

Next, with respect to 100 parts by weight of the polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 µm is present. The sample is soluble in decane at 140° C. Also, a pressed sheet was prepared using this sample to measure the properties. The results are presented in Tables 1 to 4. The sample has excellent toughness as compared with the samples of Comparative Examples.

Example 19

With respect to 100 parts by weight of the polymer particle obtained in Example 4, the same secondary anti-oxidizing agent, heat-resistant stabilizer and hydrochloric acid absorbent as those used in Example 1 were mixed in the same parts by weight. Thereafter, a sample for measurement was prepared by granulation at a resin extrusion amount of 60 g/min and at 100 rpm using a 20 mmφ single screw extruder manufactured by Thermoplastics Inc., set at 190° C. In the polarized microscopic observation, no crystalline structure continuous over more than 10 µm is present. The sample is soluble in decane at 140° C. Also, a pressed sheet was prepared using this sample to measure the properties. The results are presented in Tables 1 to 4. The sample has lower smoothness than the sample of Example 4, and thus has lower ESCR property.

Comparative Example 8

The pellets of product Novatec HD HB332R manufactured by Japan Polyethylene Corp. were used to prepare a pressed sheet, and its properties were measured. The results are presented in Tables 1 to 4. The sample is inferior in toughness and ESCR property to the samples of Examples.

Comparative Example 9

With respect to 100 parts by weight of the polymer particle obtained in Example 3, the same secondary anti-oxidizing agent, heat-resistant stabilizer and hydrochloric acid absorbent as those used in Example 1 were mixed in the same parts by weight. Thereafter, a sample for measurement was prepared by granulation using a 20 mmφ single screw extruder manufactured by Thermoplastics Inc. under the same conditions of the set temperature, the amount of extruded resin and the rotation speed as those used in Comparative Example 1. In the polarized microscopic observation, no crystalline structure continuous over more than 10 µm is present. The sample is soluble in decane at 140° C. Also, a pressed sheet was prepared using this sample to measure the properties. The results are presented in Tables 1 to 3 and Table 6. The sample has lower smoothness than the sample of Example 3, and it is found from the results of the tensile fatigue measurement at 80° C. as shown in FIG. 33 that the sample has lower fatigue strength than the samples of Comparative Examples. Furthermore, the fractured surface of the sample after the tensile fatigue measurement underwent fracture without substantial elongation.

Synthetic Example 6

[Preparation of Solid Catalyst Component (π) by Prepolymerization of Solid Catalyst Component (β)]

Into a three-necked glass reactor of 200 ml equipped with a stirrer, 28 ml of purified hexane, 2 ml (2 mmol) of triisobutylaluminum and the solid catalyst component (β) synthesized in the above Synthetic Example 1 (corresponding to 0.03 mmol of Zr atoms) were introduced under a nitrogen atmosphere, and prepolymerization was carried out with ethylene in an amount such that 3 g polyethylene can be produced per gram of the solid component in one hour. The polymerization temperature was maintained at 20° C. After completion of polymerization, the reactor was purged with nitrogen, and the prepolymerization catalyst was filtered under a nitrogen atmosphere through a glass filter sufficiently purged with nitrogen, washed with purified hexane for 3 times, subsequently suspended in about 100 ml of purified decane, and transferred as the entirety to a catalyst bottle, thus the solid catalyst component (π) being obtained.

Comparative Example 10

[Polymerization]

A 1000 ml-autoclave which had been sufficiently purged with nitrogen was charged with 100 ml of n-heptane, and 0.5 ml (0.5 mmol) of triisobutylaluminum at a concentration of 1 mol/liter and 10.0 ml of the solid catalyst component (π) obtained in Synthetic Example 6 (corresponding to 0.003 mmol in terms of Zr atoms) were introduced. The autoclave was pressurized with hydrogen to 1.6 kg/cm$^2$ G and then with ethylene to 8.0 kg/cm$^2$ G, and polymerization was initiated at 80° C. The ethylene was added during polymerization to maintain at 8.0 kg/cm$^2$ G, and polymerization was carried out for 40 minutes. After polymerization, pressure was removed, and the autoclave was purged with nitrogen to remove ethylene and hydrogen.

To this autoclave, 0.25 ml (0.25 mmol) of triisobutylaluminum at a concentration of 1 mol/liter and 1.5 ml of 1-hexene were introduced, the autoclave was pressurized with an ethylene.hydrogen mix gas with a hydrogen content of 0.0990 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 50 minutes. After completion of polymerization, pressure was removed, and the catalyst was deactivated by addition of methanol. The resulting polymer was filtered, washed and dried under vacuum at 80° C. for 12 hours to give 150.2 g of the polymer.

With respect to 100 parts by weight of the polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 μm is present. The sample is soluble in decane at 140° C. Also, a pressed sheet was prepared using this sample to measure the properties. The results are presented in Tables 1 to 3 and Table 6. As it can be seen from the results of the tensile fatigue measurement at 80° C. as shown in FIG. 33, this polymer has lower fatigue strength compared with the polymers described in Examples. Further, the fractured surface of the specimen after the tensile fatigue measurement was fractured without substantial elongation.

Example 20

[Polymerization]

A 1000 ml-autoclave which had been sufficiently purged with nitrogen was charged with 500 ml of n-heptane, and 0.5 ml (0.5 mmol) of triisobutylaluminum at a concentration of 1 mol/liter and 7.0 ml of the solid catalyst component (π) obtained in Synthetic Example 6 (corresponding to 0.00214 mmol in terms of Zr atoms) were introduced. The autoclave was pressurized with hydrogen to 1.6 kg/cm$^2$ G and then with ethylene to 8.0 kg/cm$^2$ G, and polymerization was initiated at 80° C. The ethylene was added during polymerization to maintain at 8.0 kg/cm$^2$ G, and polymerization was carried out for 50 minutes. After polymerization, pressure was removed, and the autoclave was purged with nitrogen to remove ethylene and hydrogen.

To this autoclave, 0.25 ml (0.25 mmol) of triisobutylaluminum at a concentration of 1 mol/liter and 2.7 ml of 1-hexene were introduced, the autoclave was pressurized with an ethylene.hydrogen mix gas with a hydrogen content of 0.0994 vol % to a pressure of 8.0 kg/cm$^2$ G, and polymerization was re-initiated at 80° C. The ethylene.hydrogen mix gas was added during polymerization to maintain at 8.0 kg/cm$^2$ G, and polymerization was carried out for 70 minutes. After completion of polymerization, pressure was removed, and the catalyst was deactivated by addition of methanol. The resulting polymer was filtered, washed and dried under vacuum at 80° C. for 12 hours to give 90.2 g of the polymer.

With respect to 100 parts by weight of the polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 μm is present. The sample is soluble in decane at 140° C. Also, a pressed sheet was prepared using this sample to measure the properties. The results are presented in Tables 1 to 3 and Table 6. As it is clear from the results of the tensile fatigue measurement at 80° C. as shown in FIG. 33, this sample has higher fatigue strength compared with the samples described in Comparative Examples. Further, the fractured surface of the specimen after the tensile fatigue measurement was fractured without substantial elongation.

Example 21

A polymerization vessel which has been sufficiently dried and purged with nitrogen was charged with 1200 liters of hexane, and 650 mmol of triisobutylaluminum was introduced. Then, the polymerization vessel was pressurized with ethylene and depressurized three times repeatedly in order to remove nitrogen in the vessel. The vessel was heated to elevate the temperature inside to 70° C., while it was pressurized to 0.50 MPa with ethylene and further pressurized with hydrogen until the hydrogen concentration at the gas phase part reached 29 mol %. The solid catalyst component (ω) obtained in Synthetic Example 5 was introduced in an amount of 1.6 mmol in terms of Zr atoms, and at the same time, ethylene and hydrogen were fed at the rates of 30 Nm$^3$/hr and 0.2 Nm$^3$/hr, respectively, to initiate polymerization at 80° C. After the beginning of continuous supply of ethylene, when the accumulated feed amount of ethylene reached 52 Nm$^3$, pressure was removed, while the supply of ethylene and hydrogen was stopped. Ethylene and hydrogen were removed by purging with nitrogen, and the temperature inside the system was lowered to 55° C. After the removal of ethylene and hydrogen inside the system, the system was heated to 70° C. again, 1.95 liters of 1-hexene was added, and then the system was pressurized with ethylene to 0.35 MPa. Ethylene and hydrogen were fed at the rates of 24 Nm$^3$/hr and 1.0 N-liter/hr, respectively, and polymerization was re-initiated to 80° C. After beginning of continuous supply of ethylene, when the accumulated feed amount of ethylene reached 28 Nm$^3$, the supply of ethylene and hydrogen was stopped, and at the same time the polymerization slurry was transferred rapidly to another vessel. Pressure was removed, ethylene and hydrogen were removed by purging with nitrogen, and the catalyst was deactivated by feeding methanol at 20 N-liters/hr for 1 hour. At this time, the temperature inside the system was maintained at 60° C.

The polymer was separated from hexane by filtration, washed with an excess of hexane, and dried for 3 hours. The amount of thus obtained polymer was 102.5 kg.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 25 kg/hr and at a set temperature of 200° C. using a single screw extruder (screw diameter 65 mm, L/D=28, screen mesh #300×4) manufactured by Placo Co., Ltd. In the polarized microscopic observation, no crystalline structure continuous over more than 10 μm is present. The sample was soluble at 140° C. Further, a pressed sheet was prepared using this sample to measure the properties. The results are presented in Tables 1 to 3 and Tables 7 to 8. As it can be seen from the results of the tensile fatigue measurement at 23° C. as shown in FIG. 34, this sample has higher strength than the samples used in Comparative Examples.

Example 22

A polymerization vessel which has been sufficiently dried and purged with nitrogen was charged with 1200 liters of hexane, and 650 mmol of triisobutylaluminum was introduced. Then, the polymerization vessel was pressurized with ethylene and depressurized three times repeatedly in order to remove nitrogen in the vessel. The vessel was heated to elevate the temperature inside to 70° C., while it was pressurized to 0.50 MPa with ethylene and further pressurized with hydrogen until the hydrogen concentration at the gas phase part reached 28 mol %. The solid catalyst component (ω) obtained in Synthetic Example 5 was introduced in an amount of 1.6 mmol in terms of Zr atoms, and at the same time, ethylene and hydrogen were fed at the rates of 32 Nm$^3$/hr and 0.2 Nm$^3$/hr, respectively, to initiate polymerization at 80° C. After the beginning of continuous supply of ethylene, when the accumulated feed amount of ethylene reached 52 Nm$^3$, pressure was removed, while the supply of ethylene and hydrogen was stopped. Ethylene and hydrogen were removed by purging with nitrogen, and the temperature inside the system was lowered to 55° C. After the removal of ethylene and hydrogen inside the system, the system was heated to 70° C. again, 1.95 liters of 1-hexene was added, and then the system was pressurized with ethylene to 0.35 MPa. Ethylene and hydrogen were fed at the rates of 26 Nm$^3$/hr and 1.1 N-liters/hr, respectively, and polymerization was re-initiated to 80° C. After beginning of continuous supply of ethylene, when the accumulated feed amount of ethylene reached 23 Nm$^3$, the supply of ethylene and hydrogen was stopped, and at the same time the polymerization slurry was transferred rapidly to another vessel. Pressure was removed, ethylene and hydrogen were removed by purging with nitrogen, and the catalyst was deactivated by feeding methanol at 20 N-liters/hr for 1 hour. At this time, the temperature inside the system was maintained at 60° C.

The polymer was separated from hexane by filtration, washed with an excess of hexane, and dried for 3 hours. The amount of thus obtained polymer was 99.5 kg.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 25 kg/hr and at a set temperature of 200° C. using a single screw extruder (screw diameter 65 mm, L/D=28, screen mesh #300×4) manufactured by Placo Co., Ltd. In the polarized microscopic observation, no crystalline structure continuous over more than 10 μm is present. The sample was soluble at 140° C. Further, a pressed sheet was prepared using this sample to measure the properties. The results are presented in Tables 1 to 3 and Tables 7 to 8. As it can be seen from the results of the tensile fatigue measurement at 23° C. as shown in FIG. 34, this sample has higher strength than the samples used in Comparative Examples.

Example 23

A polymerization vessel which has been sufficiently dried and purged with nitrogen was charged with 1200 liters of hexane, and 650 mmol of triisobutylaluminum was introduced. Then, the polymerization vessel was pressurized with ethylene and depressurized three times repeatedly in order to remove nitrogen in the vessel. The vessel was heated to elevate the inside temperature to 70° C., while it was pressurized to 0.50 MPa with ethylene and further pressurized with hydrogen until the hydrogen concentration at the gas phase part reached 29 mol %. The solid catalyst component (ω) obtained in Synthetic Example 5 was introduced in an amount of 1.6 mmol in terms of Zr atoms, and at the same time, ethylene and hydrogen were fed at the rates of 32 Nm$^3$/hr and 0.1 Nm$^3$/hr, respectively, to initiate polymerization at 80° C. After the beginning of continuous supply of ethylene, when the accumulated feed amount of ethylene reached 40 Nm$^3$, pressure was removed, while the supply of ethylene and hydrogen was stopped. Ethylene and hydrogen were removed by purging with nitrogen, and the temperature inside the system was lowered to 55° C. After the removal of ethylene and hydrogen inside the system, the system was heated to 70° C. again, 1.39 liters of 1-hexene was added, and then the system was pressurized with ethylene to 0.35 MPa. Ethylene and hydrogen were fed at the rates of 26 Nm$^3$/hr and 3.2 N-liters/hr, respectively, and polymerization was re-initiated to 80° C. After beginning of continuous supply of ethylene, when the accumulated feed amount of ethylene reached 33 Nm$^3$, the supply of ethylene and hydrogen was stopped, and at the same time the polymerization slurry was transferred rapidly to another vessel. Pressure was removed, ethylene and hydrogen were removed by purging with nitrogen, and the catalyst was deactivated by feeding methanol at 20 N-liters/hr for 1 hour. At this time, the temperature inside the system was maintained at 60° C.

The polymer was separated from hexane by filtration, washed with an excess of hexane, and dried for 3 hours. The amount of thus obtained polymer was 91.0 kg.

Next, with respect to 100 parts by weight of the polymer particle, the same secondary anti-oxidizing agent, heat-resistant stabilizer and hydrochloric acid absorbent as used in Example 1 were mixed in the same parts by weight. Thereafter, a sample for measurement was prepared by granulation at a resin extrusion amount of 25 kg/hr and at a set temperature of 200° C. using a single screw extruder (screw diameter 65 mm, L/D=28, screen mesh #300×4) manufactured by Placo Co., Ltd. In the polarized microscopic observation, no crystalline structure continuous over more than 10 µm is present. The sample was soluble at 140° C. Further, a pressed sheet was prepared using this sample to measure the properties. The results are presented in Tables 1 to 3 and Tables 7 to 8. As it can be seen from the results of the tensile fatigue measurement at 23° C. as shown in FIG. 34, this sample has higher strength than the samples used in Comparative Examples.

Synthetic Example 7

[Preparation of Supported Catalyst]

In a glove box, 0.18 g of di(p-tolyl)methylene(cyclopentadienyl) (octamethyloctahydrodibenzofluorenyl) zirconium dichloride was weighed into a four-necked 1-liter flask. The flask was taken out of the glove box, and 46 ml of toluene and 140 ml of a toluene slurry of MAO/SiO$_2$ (solids content 8.82 g) were added therein with stirring for 30 minutes under a nitrogen atmosphere, thus supporting being carried out. Thus obtained di(p-tolyl)methylene(cyclopentadienyl)(octamethyloctahydrodibenzofluorenyl) zirconium dichloride/MAO/SiO$_2$/toluene slurry was substituted with n-heptane to 99%, to obtain a final slurry amount of 450 ml, thus the solid catalyst component (σ) being prepared. Furthermore, this procedure was carried out at room temperature.

Example 24

[Ethylene Polymerization]

An autoclave equipped with a stirrer having a capacity of 200 liters was charged with 86.5 liters of heptane, 90 mmol of triisobutylaluminum and 9 g of the solid catalyst component (σ) obtained in the above. Polymerization was carried out while the internal temperature and pressure were maintained at 80° C. and 0.6 MPa/G, respectively, by introducing ethylene and hydrogen. The amount of charged ethylene was 13.7 kg.

Subsequently, pressure was removed until the pressure inside the polymerization vessel became 0 MPa/G, and the polymerization vessel was purged with nitrogen in order to remove hydrogen inside the vessel.

Next, 340 ml of 1-hexene was introduced. Polymerization was carried out while maintaining the internal temperature at 65° C. and maintaining the internal pressure at 0.5 MPa/G by introducing ethylene and hydrogen. The amount of charged ethylene was 9.0 kg.

The entire amount of thus obtained polyethylene slurry was transferred to an autoclave equipped with a stirrer having a capacity of 500 liters, and the catalyst was deactivated by introducing 10.7 ml of methanol. This slurry was transferred to a filter dryer equipped with a stirrer, filtered and vacuum-dried at 85° C. for 6 hours to yield polyethylene powders.

Next, with 100 parts by weight of this polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 µm is present. The sample is soluble in decane at 140° C. Also, a pressed sheet was prepared using this sample to measure the properties. The results are presented in Tables 1 to 3 and Tables 7 to 8. As it can be seen from the results of the tensile fatigue measurement at 23° C. as shown in FIG. 34, this sample has higher strength than the samples used in Comparative Examples.

Example 25

[Ethylene Polymerization]

An autoclave equipped with a stirrer having a capacity of 200 liters was charged with 86.5 liters of heptane, 90 mmol of triisobutylaluminum and 9 g of the solid catalyst component (σ) prepared in Synthetic Example 7. Polymerization was carried out while the internal temperature and pressure were maintained at 80° C. and 0.6 MPa/G, respectively, by introducing ethylene and hydrogen. The amount of charged ethylene was 13.7 kg.

Subsequently, pressure was removed until the pressure inside the polymerization vessel became 0 MPa/G, and the polymerization vessel was purged with nitrogen in order to remove hydrogen inside the vessel.

Next, 473 ml of 1-hexene was introduced. Polymerization was carried out while maintaining the internal temperature at 65° C. and maintaining the internal pressure at 0.5 MPa/G by introducing ethylene and hydrogen. The amount of charged ethylene was 9.0 kg.

The entire amount of thus obtained polyethylene slurry was transferred to an autoclave equipped with a stirrer having a capacity of 500 liters, and the catalyst was deactivated by introducing 10.7 ml of methanol. This slurry was transferred to a filter dryer equipped with a stirrer, filtered and vacuum-dried at 85° C. for 6 hours to yield polyethylene powders.

Next, with 100 parts by weight of this polymer particle, the same secondary anti-oxidizing agent, heat-resistant stabilizer and hydrochloric acid absorbent as those used in Example 1 were mixed in the same parts by weight. Thereafter, using a Labo-Plastmil manufactured by Toyo Seiki Co., Ltd., the resin was melt-kneaded under the same conditions of the set temperature, the resin feed amount, the rotation speed and the melting time as those used in Example 1, taken out of the apparatus, compressed into a sheet by a cold press set at 20° C., and cut into a suitable size to provide a sample for measurement. In the polarized microscopic observation, no crystalline structure continuous over more than 10 µm is present. The sample is soluble in decane at 140° C. Also, a pressed sheet was prepared using this sample to measure the properties. The results are presented in Tables 1 to 3 and Tables 7 to 8. As it can be seen from the results of the tensile fatigue measurement at 23° C. as shown in FIG. 34, this sample has higher strength than the samples used in Comparative Examples.

TABLE 1

| | [η] dl/g | Density kg/m³ | Mw/Mn | Comonomer | Amount of comonomer mol % | Methyl branch group/1000 C |
|---|---|---|---|---|---|---|
| Example 1 | 3.10 | 953 | 17.7 | 1-hexene | 0.33 | <0.08 |
| Example 2 | 2.75 | 954 | 16.0 | 1-hexene | 0.35 | <0.08 |
| Comp. Ex. 1 | 3.69 | 953 | 18.7 | 1-hexene | 0.60 | <0.08 |
| Comp. Ex. 2 | 3.69 | 953 | 18.7 | 1-hexene | 0.60 | <0.08 |
| Comp. Ex. 3 | 3.34 | 952 | 18.3 | 1-butene | 0.80 | 0.3 |
| Comp. Ex. 4 | 3.01 | 953 | 14.5 | 1-butene | 0.87 | <0.08 |
| Comp. Ex. 5 | 3.48 | 953 | 24.4 | 1-butene | — | — |
| Example 3 | 3.10 | 953 | 14.5 | 1-hexene | 0.29 | <0.08 |
| Example 4 | 2.10 | 968 | 17.1 | 1-hexene | 0.06 | <0.08 |
| Comp. Ex. 6 | 2.38 | 957 | 14.4 | 1-butene | 0.30 | 0.3 |
| Example 5 | 3.56 | 955 | 34.3 | 1-octene | 0.63 | <0.08 |
| Example 6 | 3.22 | 952 | 20.4 | 1-hexene | 0.43 | <0.08 |
| Example 7 | 3.11 | 957 | 17.1 | 1-hexene | 0.24 | <0.08 |
| Example 8 | 3.27 | 960 | 33.2 | 1-hexene | 0.22 | <0.08 |
| Example 9 | 3.26 | 953 | 27.1 | 1-hexene | 0.19 | <0.08 |
| Example 10 | 2.63 | 967 | 18.0 | 1-hexene | 0.05 | <0.08 |
| Example 11 | 2.62 | 964 | 15.4 | 1-hexene | 0.04 | <0.08 |
| Example 12 | 1.92 | 966 | 8.2 | 1-hexene | 0.02 | <0.08 |
| Example 13 | 3.21 | 958 | 18.3 | 1-hexene | 0.16 | <0.08 |
| Example 14 | 2.30 | 964 | 16.2 | 1-hexene | 0.10 | <0.08 |
| Example 15 | 2.10 | 968 | 17.1 | 1-hexene | 0.06 | <0.08 |
| Example 16 | 2.22 | 964 | 15.3 | 1-hexene | 0.16 | <0.08 |
| Example 17 | 2.30 | 964 | 16.2 | 1-hexene | 0.10 | <0.08 |
| Comp. Ex. 7 | 2.31 | 962 | 14.9 | 1-butene | — | — |
| Example 18 | 2.47 | 965 | 18.3 | 1-hexene | 0.05 | <0.08 |
| Example 19 | 2.10 | 968 | 17.1 | 1-hexene | 0.06 | <0.08 |
| Comp. Ex. 8 | 2.09 | 956 | 8.1 | 1-hexene | — | — |
| Comp. Ex. 9 | 3.10 | 953 | 14.5 | 1-hexene | 0.29 | <0.08 |
| Comp. Ex. 10 | 2.93 | 953 | 12.6 | 1-hexene | 0.19 | — |
| Example 20 | 3.14 | 955 | 19.5 | 1-hexene | 0.29 | <0.08 |
| Example 21 | 3.38 | 958 | 42.5 | 1-hexene | 0.29 | <0.08 |
| Example 22 | 3.36 | 961 | 39.6 | 1-hexene | 0.25 | <0.08 |
| Example 23 | 4.03 | 957 | 39.8 | 1-hexene | 0.30 | <0.08 |
| Example 24 | 3.47 | 959 | 22.7 | 1-hexene | 0.21 | <0.08 |
| Example 25 | 3.01 | 959 | 26.7 | 1-hexene | 0.34 | <0.08 |

Since the samples of Comparative Examples 5, 7 and 8 contained pigments, $^{13}C$-NMR measurement thereof was not performed.

TABLE 2

| | CFC | | | | | | |
|---|---|---|---|---|---|---|---|
| | Eluted at 73–76° C. Mw | Eluted at 70–85° C. $S_x/S_{total}$ | $T_1$ ° C. | $T_2$ ° C. | $T_1 - T_2$ ° C. | Eluted at $T_2$ ° C. Mol. Wt. for the apex of strongest peak | Eluted at 95 to 96° C. Mol. Wt. for the apex of strongest peak in the region of Mol. Wt. of less than 10,000 |
| Example 1 | 3,100 | 0.071 | 97 | 92 | 5 | 523,000 | 26,000 |
| Example 2 | 3,200 | — | 97 | 91 | 6 | 505,000 | 26,000 |
| Comp. Ex. 1 | 585,000 | 0.289 | 97 | 83 | 14 | 937,000 | 21,000 |
| Comp. Ex. 2 | 585,000 | 0.289 | 97 | 82 | 15 | 937,000 | 21,000 |
| Comp. Ex. 3 | 210,000 | 0.225 | 97 | 96 | 1 | 195,000 | 29,000 |
| Comp. Ex. 5 | 248,000 | 0.148 | 96 | 96 | 0 | 144,000 | 31,000 |
| Example 3 | 2,900 | 0.042 | 97 | 91 | 6 | 493,000 | 22,000 |
| Example 4 | 3,200 | — | 97 | 97 | 0 | 499,000 | 21,000 |
| Comp. Ex. 6 | 4,500 | 0.105 | 97 | 96 | 1 | 127,000 | 36,000 |
| Example 5 | 3,200 | — | 97 | 91 | 6 | 712,000 | 25,000 |
| Example 6 | 3,200 | — | 97 | 89 | 8 | 590,000 | 23,000 |
| Example 7 | 3,200 | — | 97 | 91 | 6 | 625,000 | 22,000 |
| Example 8 | 3,100 | — | 97 | 91 | 6 | 687,000 | 22,000 |
| Example 9 | 3,200 | — | 97 | 93 | 4 | 513,000 | 22,000 |
| Example 10 | 3,100 | — | 97 | 97 | 0 | 444,000 | 24,000 |
| Example 11 | 2,900 | 0.064 | 97 | 97 | 0 | 223,000 | 17,000 |
| Example 12 | 3,200 | 0.051 | 97 | 97 | 0 | 250,000 | 21,000 |

TABLE 2-continued

| | CFC | | | | | | |
|---|---|---|---|---|---|---|---|
| | Eluted at 73–76° C. Mw | Eluted at 70–85° C. $S_x/S_{total}$ | $T_1$ ° C. | $T_2$ ° C. | $T_1 - T_2$ ° C. | Eluted at $T_2$ ° C. Mol. Wt. for the apex of strongest peak | Eluted at 95 to 96° C. Mol. Wt. for the apex of strongest peak in the region of Mol. Wt. of less than 10,000 |
| Example 13 | 3,700 | 0.051 | 97 | 95 | 2 | 336,000 | 25,000 |
| Example 14 | 3,200 | 0.072 | 97 | 96 | 1 | 254,400 | 18,000 |
| Example 15 | 3,200 | — | 97 | 97 | 0 | 499,000 | 21,000 |
| Example 16 | — | — | — | — | — | — | — |
| Example 17 | 3,200 | — | 97 | 96 | 1 | 254,400 | 18,000 |
| Comp. Ex. 7 | — | — | — | — | — | — | — |
| Example 18 | — | — | — | — | — | — | — |
| Example 19 | 3,200 | — | 97 | 97 | 0 | 499,000 | 21,000 |
| Comp. Ex. 8 | — | — | — | — | — | — | — |
| Comp. Ex. 9 | 2,900 | — | 97 | 91 | 6 | 493,000 | 22,000 |
| Comp. Ex. 10 | — | — | — | — | — | — | — |
| Example 20 | — | — | — | — | — | — | — |
| Example 21 | 3,300 | — | 96 | 92 | 4 | 641,000 | 21,000 |
| Example 22 | 3,300 | — | 96 | 92 | 4 | 625,000 | 21,000 |
| Example 23 | 3,400 | — | 96 | 91 | 5 | 579,000 | 21,000 |
| Example 24 | 3,600 | 0.065 | 97 | 95 | 2 | 483,000 | 25,000 |
| Example 25 | 3,600 | — | 97 | 91 | 6 | 507,000 | 23,000 |

TABLE 3

| | Separation of Peak on the GPC Curve | | | | | R |
|---|---|---|---|---|---|---|
| | Lower Mol. Wt. Side | | | Higher Mol. Wt. Side | | |
| | $Mw_1$ | Mw/Mn | wt % | $Mw_2$ | Mw/Mn | µm |
| Example 1 | 21,300 | 2.7 | 52 | 418,000 | 2.7 | 15 |
| Example 2 | 22,500 | 2.8 | 54 | 362,000 | 2.8 | 12 |
| Comp. Ex. 1 | 20,000 | 2.1 | 59 | 627,000 | 2.2 | 55 |
| Comp. Ex. 2 | 20,000 | 2.1 | 59 | 627,000 | 2.2 | 12 |
| Comp. Ex. 3 | 27,800 | 5.2 | 51 | 384,000 | 5.4 | 15 |
| Comp. Ex. 5 | 37,300 | 5.4 | 51 | 586,000 | 6.9 | 12 |
| Example 3 | 27,600 | 2.0 | 58 | 416,000 | 1.9 | 17 |
| Example 4 | 18,600 | 2.3 | 71 | 539,000 | 2.3 | 15 |
| Comp. Ex. 6 | 46,300 | 5.3 | 76 | 556,000 | 5.2 | 12 |
| Example 5 | 18,200 | 2.3 | 64 | 637,000 | 2.3 | 11 |
| Example 6 | 27,800 | 2.0 | 60 | 517,000 | 2.0 | 17 |
| Example 7 | 27,800 | 2.1 | 64 | 547,000 | 2.1 | 17 |
| Example 8 | 18,500 | 2.0 | 68 | 610,000 | 2.0 | 16 |
| Example 9 | 21,200 | 2.6 | 53 | 408,000 | 2.5 | 8 |
| Example 10 | 21,800 | 2.8 | 69 | 393,000 | 1.9 | 10 |
| Example 11 | 20,800 | 2.1 | 61 | 381,000 | 2.1 | 12 |
| Example 12 | 35,600 | 2.2 | 69 | 287,000 | 2.2 | 10 |
| Example 13 | 26,300 | 2.1 | 60 | 461,000 | 2.1 | 11 |
| Example 14 | 17,100 | 2.0 | 66 | 404,000 | 2.0 | 15 |
| Example 15 | 18,600 | 2.3 | 71 | 539,000 | 2.3 | 14 |
| Example 16 | 21,500 | 3.0 | 68 | 340,000 | 1.9 | 9 |
| Example 17 | 18,600 | 2.3 | 71 | 539,000 | 2.3 | 15 |
| Comp. Ex. 7 | 46,600 | 6.4 | 81 | 647,000 | 5.6 | 11 |
| Example 18 | 18,900 | 2.8 | 60 | 366,000 | 2.8 | 8 |
| Example 19 | 18,600 | 2.3 | 71 | 539,000 | 2.3 | 83 |
| Comp. Ex. 8 | 49,800 | 3.1 | 82 | 352,000 | 2.9 | — |
| Comp. Ex. 9 | 27,600 | 2.0 | 58 | 416,000 | 1.9 | 110 |
| Comp. Ex. 10 | 24,000 | 2.4 | 47 | 301,000 | 2.4 | 11 |
| Example 20 | 25,300 | 2.5 | 57 | 450,000 | 2.1 | 10 |
| Example 21 | 10,700 | 2.2 | 57 | 564,000 | 3.0 | 12 |
| Example 22 | 11,900 | 2.1 | 60 | 532,000 | 2.7 | 8 |
| Example 23 | 12,200 | 2.2 | 52 | 474,000 | 2.7 | 19 |
| Example 24 | 26,300 | 2.7 | 63 | 508,000 | 1.7 | 6 |
| Example 25 | 16,400 | 2.7 | 62 | 443,000 | 1.8 | 7 |

TABLE 4

|  | Flexural Modulus MPa | ESCR Property hr | tan δ | Thickness ratio of pinched part (a/b) |
|---|---|---|---|---|
| Example 4 | 1,670 | 233 | 0.40 | 0.60 |
| Comp. Ex. 6 | 1,250 | 300 | 0.69 | 1.00 |
| Example 10 | 1,580 | 554 | 0.40 | — |
| Example 11 | 1,500 | 227 | 0.43 | 0.40 |
| Example 12 | 1,500 | 12 | 0.75 | 1.00 |
| Example 14 | 1,500 | >600 | 0.41 | 0.45 |
| Example 15 | 1,670 | >600 | 0.40 | 0.60 |
| Example 16 | 1,560 | >600 | — | — |
| Example 17 | 1,650 | >600 | 0.40 | — |
| Comp. Ex. 7 | 1,450 | 21 | 0.79 | 1.00 |
| Example 18 | 1,670 | 62 | 0.51 | — |
| Example 19 | 1,650 | 51 | 0.40 | 0.60 |
| Comp. Ex. 8 | 1,150 | 3 | 0.76 | — |

TABLE 5

|  | Buckling Strength (N) | ESCR Time to Fracture F50 (hr) |
|---|---|---|
| Comp. Ex. 6 | 340 | 100 |
| Example 11 | 390 | 100 |
| Example 12 | 380 | 25 |
| Example 14 | 380 | >500 |
| Example 15 | 450 | >500 |

TABLE 6

|  | Tensile Fatigue at 80° C. | | | | | | | |
|---|---|---|---|---|---|---|---|---|
|  | Stress MPa | No. of Cycles cycles | Stress MPa | No. of Cycles cycles | Stress MPa | No. of Cycles cycles | Stress MPa | No. of Cycles cycles |
| Example 1 | 13.0 | 163,990 | 14.4 | 28,880 | 14.9 | 9,727 | 16.6 | 62 |
| Example 2 | — | — | 13.7 | 91,880 | 14.1 | 5,213 | 16.2 | 43 |
| Comp. Ex. 1 | 10.5 | 458,020 | 11.6 | 36,680 | 12.3 | 2,540 | 14.0 | 110 |
| Comp. Ex. 2 | 10.8 | 538,490 | 11.5 | 101,030 | 12.7 | 1,085 | 13.9 | 69 |
| Comp. Ex. 3 | — | — | 10.5 | 14,690 | 12.3 | 2,690 | 14.6 | 108 |
| Comp. Ex. 4 | 11.5 | 56,839 | 13.0 | 3,054 | 13.5 | 429 | 13.7 | 70 |
| Comp. Ex. 5 | 11.3 | 16,260 | 12.1 | 8,675 | 12.4 | 3,731 | 14.5 | 220 |
| Example 3 | 12.9 | 155,246 | 13.3 | 94,685 | 13.7 | 8,060 | — | — |
| Example 5 | 12.3 | 194,918 | 12.7 | 13,094 | 12.9 | 3,300 | 13.1 | 680 |
| Example 6 | 13.5 | 108,184 | 14.1 | 3,314 | 14.2 | 1,818 | — | — |
| Example 7 | 12.8 | 74,110 | 13.4 | 20,359 | 14.5 | 599 | — | — |
| Example 8 | 13.0 | 170,239 | 13.6 | 19,613 | 14.0 | 8,064 | — | — |
| Example 9 | 13.7 | 65,746 | 13.9 | 9,657 | 14.7 | 623 | — | — |
| Example 13 | 12.0 | 94,819 | 12.6 | 39,958 | 13.2 | 11,284 | 13.9 | 358 |
| Comp. Ex. 9 | 11.7 | 36,906 | 12.6 | 2,230 | 13.5 | 782 | — | — |
| Comp. Ex. 10 | 9.1 | 43,126 | 10.0 | 19,759 | 11.9 | 25,311 | 12.5 | 10,122 |
| Example 20 | 13.7 | 73,484 | 14.8 | 869 | 16.2 | 245 | — | — |

TABLE 7

|  | Tensile Fatigue at 23° C. | | | | |
|---|---|---|---|---|---|
| Example 3 | Cycles to Fracture | 6563 | 17580 | 62070 | 419130 |
|  | Actual Stress | 20.56 | 19.83 | 18.99 | 18.6 |
| Example 7 | Cycles to Fracture | 17715 | 37405 | 67950 | 308500 |
|  | Actual Stress | 21 | 20.28 | 19.83 | 19.06 |
| Example 13 | Cycles to Fracture | 10508 | 23482 | 39692 | 101558 |
|  | Actual Stress | 21.88 | 21.07 | 20.63 | 20.11 |
| Example 21 | Cycles to Fracture | 14696 | 26090 | 66644 | 175108 |
|  | Actual Stress | 22.11 | 21.22 | 20.63 | 20.18 |
| Example 22 | Cycles to Fracture | 19635 | 36688 | 88478 | 434769 |
|  | Actual Stress | 22.27 | 21.14 | 20.42 | 19.9 |
| Example 23 | Cycles to Fracture | 4652 | 13622 | 30649 | 107677 |
|  | Actual Stress | 22.11 | 21.07 | 20.56 | 19.84 |
| Example 24 | Cycles to Fracture | 9870 | 37214 | 147598 | 891911 |
|  | Actual Stress | 20.72 | 19.7 | 18.86 | 18.41 |
| Example 25 | Cycles to Fracture | 21131 | 52038 | 145079 | 290351 |
|  | Actual Stress | 21.14 | 20.41 | 19.91 | 19.32 |
| Comp. Ex. 3 | Cycles to Fracture | 5754 | 12318 | 38630 | 115000 |
|  | Actual Stress | 19.36 | 19.25 | 18.67 | 17.84 |

TABLE 7-continued

| | | Tensile Fatigue at 23° C. | | | | |
|---|---|---|---|---|---|---|
| Comp. Ex. 5 | Cycles to Fracture | 19550 | 47205 | 271605 | 1580000 | |
| | Actual Stress | 19.25 | 18.73 | 18.27 | 17.81 | |

TABLE 8

| | Density kg/m³ | Claimed Lower Limit MPa | Claimed Upper Limit MPa | Actual Stress MPa | Cycles to Fracture (cycles) | Regression Expression |
|---|---|---|---|---|---|---|
| Example 3 | 953 | 19.5 | 21.8 | 20.2 | 10,000 | y = −0.4690Ln($\chi$) + 24.483 |
| Example 7 | 957 | 20.0 | 24.2 | 21.2 | 10,000 | y = −0.6616Ln($\chi$) + 27.333 |
| Example 13 | 958 | 20.1 | 24.8 | 21.8 | 10,000 | y = −0.7783Ln($\chi$) + 28.986 |
| Example 21 | 958 | 20.1 | 24.8 | 22.2 | 10,000 | y = −0.7398Ln($\chi$) + 28.977 |
| Example 22 | 961 | 20.5 | 26.6 | 22.3 | 10,000 | y = −0.7087Ln($\chi$) + 28.864 |
| Example 23 | 957 | 20.0 | 24.2 | 21.4 | 10,000 | y = −0.7128Ln($\chi$) + 28.002 |
| Example 24 | 959 | 20.2 | 25.4 | 20.5 | 10,000 | y = −0.5125Ln($\chi$) + 25.230 |
| Example 25 | 959 | 20.2 | 25.4 | 21.6 | 10,000 | y = −0.6671Ln($\chi$) + 27.747 |
| Comp. Ex. 3 | 952 | 19.4 | 21.2 | 19.2 | 10,000 | y = −0.5163Ln($\chi$) + 23.981 |
| Comp. Ex. 5 | 953 | 19.5 | 21.8 | 19.3 | 10,000 | y = −0.3124Ln($\chi$) + 22.219 |

INDUSTRIAL APPLICABILITY

The ethylene polymer of the invention provides a molded product which has excellent moldability and thus excellent mechanical strength and external appearance. The polymer imparts excellent properties when used in the ethylene polymer blow molded products and extrusion molded products such as pipes or other different forms according to the invention.

The invention claimed is:

1. An ethylene polymer containing 0.02 to 0.5 mol % of a constitutional unit derived from α-olefin having 6 to 10 carbon atoms, which satisfies at least either of the following requirements (1) and (2) with respect to cross fractionation chromatography (CFC):

(1) the weight average molecular weight (Mw) of the components eluted at 73 to 76° C. does not exceed 4,000; and
(2) the following relationship (Eq-1) is satisfied:

$$S_x/S_{total} \leq 0.1 \quad \text{(Eq-1)}$$

wherein $S_x$ is the sum of the total peak areas related to the components which are eluted at 70 to 85° C., and $S_{total}$ is the sum of the total peak areas related to the components which are eluted at 0 to 145° C.

2. The ethylene polymer according to claim 1, which satisfies the following requirements (2') to (7') simultaneously:

(2') the density (d) is in the range of 945 to 970 kg/m³;
(3') the intrinsic viscosity ([η]) as measured in decalin at 135° C. is in the range of 1.6 to 4.1 (dl/g);
(4') the ratio (Mw/Mn) of the weight average molecular weight (Mw) and the number average molecular weight (Mn) as measure by GPC is in the range of 5 to 70;

(5') with respect to cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), $(T_1 - T_2)$(° C.) is in the range of 0 to 11° C.;

(6') with respect to cross fractionation chromatography (CFC), the molecular weight for the apex of the strongest peak in the region corresponding to molecular weights of 100,000 or more is in the range of 200,000 to 800,000 on the GPC curve for the fraction eluted at $[(T_2-1)$ to $T_2]$ (° C.); and (7') with respect to cross fractionation chromatography (CFC), the molecular weight for the apex of the strongest peak in the region corresponding to molecular weights of 100,000 or less does not exceed 28,000 on the GPC curve for the components eluted at 95 to 96° C.

3. The ethylene polymer according to claim 2, wherein the number of methyl branch groups as measured by $^{13}$C-NMR is less than 0.1 per 1000 carbon atoms.

4. The ethylene polymer according to claim 3, wherein (1''') when the GPC curve is divided into two logarithmic normal distribution curves, the ratio (Mw/Mn) of the weight average molecular weight (Mw) and the number average molecular weight (Mn) for each divided curve is from 1.5 to 3.5, and the weight average molecular weight (Mw$_2$) for the divided curve representing the higher molecular weight portion is from 200,000 to 800,000; and (2''') the smoothness coefficient R as determined from the surface roughness of an extruded strand does not exceed 20 μm.

5. The ethylene polymer according to any one of claims 1 to 4, which satisfies the following requirements ($1_B$) to ($3_B$) simultaneously and which is suitably used in blow molded products:

($1_B$) the polymer contains 0.02 to 0.20 mol % of a constitutional unit derived from α-olefin having 6 to 10 carbon atoms;

($2_B$) the ratio (Mw/Mn) of the weight average molecular weight (Mw) and the number average molecular weight (Mn) as measured by GPC is in the range of 5 to 30; and ($3_B$) with respect to cross fractionation chromatography (CFC), when the elution temperature for the apex of the strongest peak in the region corresponding to molecular weights of less than 100,000 is taken as $T_1$ (° C.), and the elution temperature for the apex of the strongest peak in the region corresponding to molecular weights of 100,000 or more is taken as $T_2$ (° C.), ($T_1 - T_2$) (° C.) is in the range of 0 to 5° C.

6. The ethylene polymer according to claim 5, which satisfies that ($1_B'$) the flexural modulus as measured according to ASTM-D-790 at 23° C. is in the range of 1,500 to 1,800 MPa, and ($2_B'$) the environmental stress crack resistance ESCR (hr) at 50° C. as measured according to ASTM-D-1693 is 10 hours or longer before fracture; and which is suitably used in blow molded products.

7. The ethylene polymer according to claim 6, wherein tan δ (=loss modulus G"/storage modulus G') at 190° C. and at an angular frequency of 100 rad/sec as measured using a dynamic viscoelasticity measuring apparatus is from 0.7 to 0.9.

8. The ethylene polymer according to any one of claims 1 to 4, which satisfies the following requirements ($1_P$) and ($2_P$) simultaneously and which is suitably used in pipes:

($1_P$) the polymer contains 0.10 to 1.00 mol % of a constitutional unit derived from α-olefin having 6 to 10 carbon atoms; and ($2_P$) the ratio (Mw/Mn) of the weight average molecular weight (Mw) and the number average molecular weight (Mn) as measured by GPC is in the range of 11 to 70.

9. The ethylene polymer according to claim 8, which satisfies the following requirements ($1_P'$) and ($2_P'$) simultaneously:

($1_P'$) the actual stress obtained when it takes 10,000 cycles to specimen fracture due to the tensile fatigue property as measured at 80° C. according to JIS K-6744, is from 13 MPa to 17 MPa, and the actual stress obtained when it takes 100,000 cycles to fracture is from 12 to 16 MPa; and ($2_P'$) the actual stress (S) (MPa) and the density (d) obtained when it takes 10,000 cycles to fracture due to the tensile fatigue property as measured at 23° C. according to JIS K-7118, satisfy the following relationship (Eq-2):

$$(0.12d - 94.84) < S < (0.60d - 550.00) \quad \text{(Eq-2)};$$

and which is suitably used in pipes.

10. A blow molded product made of the ethylene polymer according to claim 6.

11. The blow molded product according to claim 10, which is a gasoline tank, an industrial chemical canister or a bottle.

12. A pipe or fitting made of the ethylene polymer according to claim 9.

13. The pipe or fitting according to claim 12, which is used in transfer of liquid such as tap water and the like.

14. An ethylene polymer containing 0.02 to 0.5 mol % of a constitutional unit derived from α-olefin having 6 to 10 carbon atoms, wherein the weight average molecular weight (Mw) of the components eluted at 73 to 76° C. does not exceed 4,000.

* * * * *